(12) United States Patent
Goyal et al.

(10) Patent No.: US 11,356,965 B2
(45) Date of Patent: Jun. 7, 2022

(54) BLUETOOTH VOICE LINK MIRRORING

(71) Applicant: QUALCOMM Incorporated, San Diego, CA (US)

(72) Inventors: Giriraj Goyal, Bangalore (IN); Vishal Agarwal, Ramnagar (IN); Nitin Raghavendra Kidiyoor, Bangalore (IN)

(73) Assignee: QUALCOMM INCORPORATED, San Diego, CA (US)

( * ) Notice: Subject to any disclaimer, the term of this patent is extended or adjusted under 35 U.S.C. 154(b) by 184 days.

(21) Appl. No.: 16/843,846

(22) Filed: Apr. 8, 2020

(65) Prior Publication Data

US 2020/0329443 A1    Oct. 15, 2020

(30) Foreign Application Priority Data

Apr. 12, 2019   (IN) .............................. 201941014861

(51) Int. Cl.

| | |
|---|---|
| *H04W 56/00* | (2009.01) |
| *H04W 4/80* | (2018.01) |
| *H04L 5/00* | (2006.01) |
| *H04L 43/12* | (2022.01) |
| *H04W 84/20* | (2009.01) |

(52) U.S. Cl.
CPC ......... *H04W 56/001* (2013.01); *H04L 5/0055* (2013.01); *H04L 43/12* (2013.01); *H04W 4/80* (2018.02); *H04W 84/20* (2013.01)

(58) Field of Classification Search
CPC ..... H04L 1/22; H04L 65/4076; H04L 1/1812; G06F 11/1004; H04W 28/044; H04W 72/0446; H04W 28/046
See application file for complete search history.

(56) References Cited

U.S. PATENT DOCUMENTS

| | | | |
|---|---|---|---|
| 2018/0084456 A1* | 3/2018 | Gostev | ................. H04W 84/18 |
| 2018/0084606 A1 | 3/2018 | Li et al. | |
| 2019/0230738 A1* | 7/2019 | Desai | .................... H04L 1/1887 |
| 2021/0112106 A1* | 4/2021 | McKenzie | ......... H04N 21/4302 |

OTHER PUBLICATIONS

International Search Report and Written Opinion—PCT/US2020/027480—ISAEPO—dated Jul. 3, 2020.

* cited by examiner

*Primary Examiner* — Iqbal Zaidi

(74) *Attorney, Agent, or Firm* — Muncy, Geissler, Olds & Lowe, P.C.

(57) ABSTRACT

Systems and methods for Bluetooth voice link shadowing are disclosed. A primary device may receive an eSCO packet from host device over master slot(s) of an enhanced synchronization connection oriented (eSCO) window within an interval of a host piconet shared between the host and primary devices. A secondary device may sniff for the eSCO packet also over master slot(s) of the eSCO window. When the primary device successfully receives the eSCO packet from the host, it may unconditionally relay the packet to the secondary device. Alternatively, it may conditionally relay the packet when the secondary device does not successfully sniff the packet. When the secondary device successfully sniffs the eSCO packet from the host, it may unconditionally relay the packet to the primary device. Alternatively, it may conditionally relay the packet when the primary device does not successfully receive the packet.

27 Claims, 29 Drawing Sheets

BLUETOOTH VOICE LINK MIRRORING

CROSS-REFERENCE TO RELATED APPLICATION

The present Application for Patent claims priority under 35 U.S.C. § 119 to Indian Patent Application No. 201941014861, entitled "BLUETOOTH VOICE LINK SHADOWING," filed Apr. 12, 2019, assigned to the assignee hereof, and expressly incorporated herein by reference in its entirety.

TECHNICAL FIELD

Aspects of this disclosure relate generally to wireless communication, and more particularly to Bluetooth voice link shadowing and the like.

BACKGROUND

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long-Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

Wireless devices increasingly communicate by using multiple networks simultaneously. Moreover, they may compete with other devices to access the medium. For example, a host device may communicate with a first device in accordance with a first network (for example, a short-range network like Bluetooth) while simultaneously communicating with a second device in accordance with a second network (for example, a mid-range network like WiFi). Meanwhile, a third device may be communicating in accordance with a third network, interfering with efforts of the host device to communicate on the first network and/or the second network.

When multiple networks are used simultaneously, coexistence issues arise. For example, the host device may be forced to communicate in bursts on the first network in order to avoid interfering with the second network and/or the third network. As a result, latency and bandwidth usage associated with the first network may increase. These improvements may be of special importance for time-critical communications, for example, those using classic Bluetooth Basic Rate/Enhanced Data Rate (BR/EDR) for operating in accordance with streaming audio protocols like Bluetooth's Advanced Audio Distribution Profile (A2DP). New techniques are needed for improving latency and reducing bandwidth usage. In a scenario of "a phone and two ear buds" for voice communication, new techniques are needed to enable the phone's voice data to be heard at both buds.

SUMMARY

This summary identifies features of some example aspects, and is not an exclusive or exhaustive description of the disclosed subject matter. Whether features or aspects are included in, or omitted from this summary is not intended as indicative of relative importance of such features. Additional features and aspects are described, and will become apparent to persons skilled in the art upon reading the following detailed description and viewing the drawings that form a part thereof.

An example method performed by a secondary device is disclosed. The method may comprise sniffing one or more master slots of an enhanced synchronization connection oriented (eSCO) window within an interval of a host piconet for an eSCO packet transmitted from a host device. The host piconet may be shared between the host and primary devices. The host and primary devices may respectively be master and slave of the host piconet. The eSCO window may comprise a reserved window and a retransmission window. The method may also comprise receiving a relay of the eSCO packet from the primary device over one or more slots of a primary/secondary (P/S) piconet when the eSCO packet has not been successfully sniffed from the host device. The P/S piconet may be shared between the primary and secondary devices. The primary device may be configured to receive the eSCO packet over the one or more master slots of the eSCO window.

An example method performed by a primary device is disclosed. The method may comprise listening on one or more master slots of an enhanced synchronization connection oriented (eSCO) window within an interval of a host piconet to receive an eSCO packet transmitted from a host device. The host piconet may be shared between the host and primary devices. The host and primary devices may respectively be master and slave of the host piconet. The eSCO window may comprise a reserved window and a retransmission window. The method may also comprise relaying the eSCO packet to a secondary device over one or more slots of a primary/secondary (P/S) piconet. The P/S piconet may be shared between the primary and secondary devices. The secondary device may be configured to sniff for the eSCO packet over the one or more master slots of the eSCO window.

An example secondary device is disclosed. The secondary device may comprise a transceiver system, a memory system, and a processing system communicably coupled to the transceiver system and/or the memory system. The transceiver system, the memory system, and/or the processing system may be configured to listen on one or more master slots of an enhanced synchronization connection oriented (eSCO) window within an interval of a host piconet to receive an eSCO packet transmitted from a host device. The host piconet may be shared between the host and primary devices. The host and primary devices may respectively be master and slave of the host piconet. The eSCO window may comprise a reserved window and a retransmission window. The transceiver system, the memory system, and/or the processing system may also be configured to receive a relay of the eSCO packet from the primary device over one or more slots of a primary/secondary (P/S) piconet when the eSCO packet has not been successfully sniffed from the host device. The P/S piconet may be shared between the primary and secondary devices. The primary device may be configured to receive the eSCO packet over the one or more master slots of the eSCO window.

An example primary device is disclosed. The primary device may comprise a transceiver system, a memory system, and a processing system communicably coupled to the transceiver system and/or the memory system. The transceiver system, the memory system, and/or the processing system may be configured to sniff one or more master slots of an enhanced synchronization connection oriented (eSCO) window within an interval of a host piconet for an eSCO packet transmitted from a host device. The host piconet may be shared between the host and primary devices. The host and primary devices may respectively be master and slave of the host piconet. The eSCO window may comprise a reserved window and a retransmission window. The transceiver system, the memory system, and/or the processing system may also be configured to relay the eSCO packet to a secondary device over one or more slots of a primary/secondary (P/S) piconet. The P/S piconet may be shared between the primary and secondary devices. The secondary device may be configured to sniff for the eSCO packet over the one or more master slots of the eSCO window.

Another example secondary device is disclosed. The secondary device may comprise means for sniffing one or more master slots of an enhanced synchronization connection oriented (eSCO) window within an interval of a host piconet for an eSCO packet transmitted from a host device. The host piconet may be shared between the host and primary devices. The host and primary devices may respectively be master and slave of the host piconet. The eSCO window may comprise a reserved window and a retransmission window. The secondary device may also comprise means for receiving a relay of the eSCO packet from the primary device over one or more slots of a primary/secondary (P/S) piconet when the eSCO packet has not been successfully sniffed from the host device. The P/S piconet may be shared between the primary and secondary devices. The primary device may be configured to receive the eSCO packet over the one or more master slots of the eSCO window.

Another example primary device is disclosed. The primary device may comprise means for listening on one or more master slots of an enhanced synchronization connection oriented (eSCO) window within an interval of a host piconet to receive an eSCO packet transmitted from a host device. The host piconet may be shared between the host and primary devices. The host and primary devices may respectively be master and slave of the host piconet. The eSCO window may comprise a reserved window and a retransmission window. The primary device may also comprise means for relaying the eSCO packet to a secondary device over one or more slots of a primary/secondary (P/S) piconet. The P/S piconet may be shared between the primary and secondary devices. The secondary device may be configured to sniff for the eSCO packet over the one or more master slots of the eSCO window.

An example non-transitory computer-readable medium storing computer-executable instructions for a secondary device is disclosed. The computer-executable instructions may comprise one or more instructions causing the secondary device to sniff one or more master slots of an enhanced synchronization connection oriented (eSCO) window within an interval of a host piconet for an eSCO packet transmitted from a host device. The host piconet may be shared between the host and primary devices. The host and primary devices may respectively be master and slave of the host piconet. The eSCO window may comprise a reserved window and a retransmission window. The computer-executable instructions may also comprise one or more instructions causing the secondary device to receive a relay of the eSCO packet from the primary device over one or more slots of a primary/secondary (P/S) piconet when the eSCO packet has not been successfully sniffed from the host device. The P/S piconet may be shared between the primary and secondary devices. The primary device may be configured to receive the eSCO packet over the one or more master slots of the eSCO window.

An example non-transitory computer-readable medium storing computer-executable instructions for a primary device is disclosed. The computer-executable instructions may comprise one or more instructions causing the primary device to sniff one or more master slots of an enhanced synchronization connection oriented (eSCO) window within an interval of a host piconet for an eSCO packet transmitted from a host device. The host piconet may be shared between the host and primary devices. The host and primary devices may respectively be master and slave of the host piconet. The eSCO window may comprise a reserved window and a retransmission window. The computer-executable instructions may also comprise one or more instructions causing the primary device to relay the eSCO packet to a secondary device over one or more slots of a primary/secondary (P/S) piconet. The P/S piconet may be shared between the primary and secondary devices. The secondary device may be configured to sniff for the eSCO packet over the one or more master slots of the eSCO window.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Aspects of the subject matter are provided in the following description and related drawings directed to specific examples of the disclosed subject matter. Alternates may be devised without departing from the scope of the disclosed subject matter. Additionally, well-known elements will not be described in detail or will be omitted so as not to obscure the relevant details.

Figure 1:
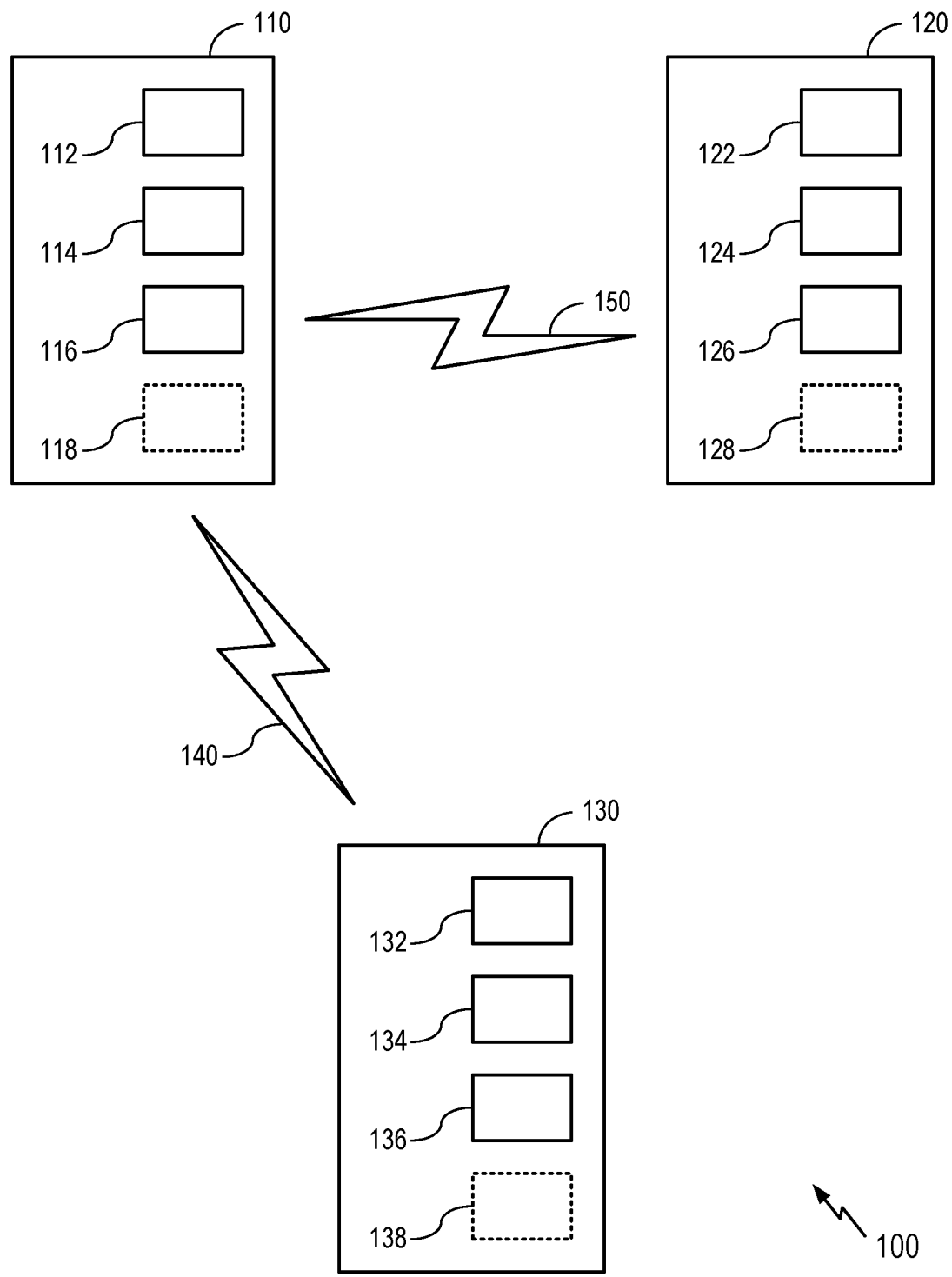
FIG. 1 generally illustrates a wireless environment that includes a primary device, a secondary device, and a host device.

FIG. 1 generally illustrates a wireless environment 100 that includes a primary device 110, a secondary device 120, and a host device 130. The primary device 110 and the host device 130 may establish a host piconet 140 to facilitate communication between the primary device 110 and the host device 130. In some implementations, the primary device 110 may be a master of the host piconet 140 (with the host device 130 as a slave), and in other implementations, the host device 130 may be the master of the host piconet 140 (with the primary device 110 as the slave). The host device 130 may be configured to transmit a series of data packets to the primary device 110 over the host piconet 140. If the primary device 110 receives a particular data packet, it may transmit an acknowledgement (ACK) to the host device 130. When the host device 130 receives the ACK, it may select a next data packet from the series for transmission. In this manner, the host device 130 may transmit each data packet in a series of data packets to the primary device 110. However, the host device 130 may also be obliged to coexist with other networks (not shown in FIG. 1). For example, the host device 130 may be required to observe a discontinuous transmission/reception scheme when communicating on the host piconet 140 in order to avoid undue interference with a nearby WiFi network. As a result, the primary device 110 may receive intermittent bursts of data packets from the host device 130. The bursts may arrive at unpredictable times, and may be punctuated by indefinite periods of reduced network activity.

The primary device 110 and the secondary device 120 may establish a primary/secondary (P/S) piconet 150 to facilitate communication within the wireless environment 100. It will be understood that there may be any number of secondary devices operating on the P/S piconet 150, but for brevity, the present disclosure will describe the behavior of a single secondary device, the secondary device 120. In some implementations, the primary device 110 may be a master of the P/S piconet 150 (with the secondary device 120 as a slave), and in other implementations, the secondary device 120 may be the master of the P/S piconet 150 (with the primary device 110 as the slave). In the present disclosure, communications between the primary device 110 and the secondary device 120 over the P/S piconet 150 may be broadly referred to as "synchronizations".

In one example of a synchronization, the primary device 110 may provide the secondary device 120 (over the P/S piconet 150) with host piconet configuration data relating to the host piconet 140. This host piconet configuration data may enable the secondary device 120 to 'eavesdrop' on the host piconet 140 without joining the host piconet 140 (sometimes referred to as "sniffing"). This may enable the secondary device 120 to receive one or more of the data packets that are transmitted from the host device 130 to the primary device 110. The host piconet configuration data may include a device address of a master of the host piconet 140 (i.e., the host device 130 or the primary device 110), a clock offset and a slot offset of the host piconet 140, a maximum packet size for communicating with the host device 130, a packet type table indicating a data rate of the host piconet 140, a channel map indicating frequencies used by the host piconet 140, a preferred data rate indicating an error coding scheme, a logical transport address of an asynchronous connection-oriented logical transport, synchronous connection-oriented logical transport, or enhanced synchronous connection-oriented logical transport between the host device and the primary device, any other suitable information, or any combination thereof. The secondary device 120, having been provided with the host piconet configuration data, may be enabled to determine a host piconet timing associated with the host piconet 140. For example, the host piconet configuration data may enable the secondary device 120 to identify transmissions from a master of the host piconet 140 and determine the host piconet timing based on the identified transmissions. Once the host piconet timing is determined, the secondary device 120 may be configured to listen to the host device 130 on the host piconet 140 in accordance with the determine host piconet timing.

As noted above, once the secondary device 120 is provided with the host piconet configuration data, the secondary device 120 may be capable of listening for data packets transmitted on the host piconet 140. However, it will be understood that the secondary device 120 may not send ACKs (a task which is left to the primary device 110). As a result, if the secondary device 120 misses a particular data packet, the host device 130 may proceed to the next without knowing that the secondary device 120 has missed the data packet.

Accordingly, the primary device 110 may be configured to synchronize with the secondary device 120 for the purpose of determining if any packets have been missed, identifying the missed packets (if there are any), and selectively relaying any missed data packets to the secondary device 120 (if necessary). Planned periodic synchronizations between the primary device 110 and the secondary device 120 may be complicated by the unpredictability of the bursts of data packets provided by the host device 130. The overall efficiency of the system depicted in FIG. 1 can be improved if the primary device 110 is configured to capture sudden bursts of data packets from the host device 130 while simultaneously meeting its obligations to the secondary device 120.

The primary device 110 may include a transceiver system 112, a memory system 114, a processing system 116, and optional other components 118. The transceiver system 112 may be configured to transmit and/or receive signals over the host piconet 140, the P/S piconet 150, and/or any other medium. The transceiver system 112 may be configured to operate in accordance with a Bluetooth protocol, a wireless land area network (WLAN) protocol, a wireless wide area network (WWAN) protocol, and/or any other suitable protocol. As an example, the transceiver system 112 may be configured to transmit and/or receive streaming audio data. The streaming audio data may be transmitted asynchronously using, for example, Bluetooth Basic Rate/Enhanced Data Rate (BR/EDR) protocol.

The memory system 114 may be configured to store data, instructions, or a combination thereof. The memory system 114 may comprise Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of non-transitory storage medium. As used herein the term "non-transitory" does not exclude any physical storage medium or memory and particularly does not exclude dynamic memory (e.g., RAM) but rather excludes only the interpretation that the medium can be construed as a transitory propagating signal.

The processing system 116 may be coupled to the transceiver system 112, the memory system 114, and the other components 118. The processing system 116 may be configured to perform operations in accordance with the instructions stored in the memory system 114. The processing system 116 may be configured to transmit commands to the other components of the primary device 110. The commands may be transceiver commands associated with tuning to a particular frequency, transmitting and receiving in accordance with a particular timing, or transferring data to or from the transceiver system 112. Additionally or alternatively, the commands may be memory commands associated with storing and/or retrieving data and/or instructions.

The other components 118 may include one or more user inputs, one or more user output, a battery, and/or any other suitable components. In accordance with aspects of the disclosure, the other components 118 may include a speaker configured to transmit an audio signal. In particular, the speaker may be configured to receive an electronic signal from within the primary device 110 and convert the electronic signal into an audio signal.

The secondary device 120 may include a transceiver system 122, a memory system 124, a processing system 126, and optional other components 128. The transceiver system 122, the memory system 124, the processing system 126, and the other components 128 may be analogous to the transceiver system 112, the memory system 114, the processing system 116, and the other components 118 included in the primary device 110. For brevity, further description of these components will be omitted.

In some implementations, the primary device 110 and the secondary device 120 may collectively be provided as wireless earbuds. For example, the wireless earbuds may be configured to play, into the ears of a listener, stereo sound comprising left and right audio streams. The primary device 110 may transmit the left audio stream while the secondary device 120 transmits the right audio stream, or vice-versa.

The host device 130 may include a transceiver system 132, a memory system 134, a processing system 136, and optional other components 138. The transceiver system 132, the memory system 134, the processing system 136, and the other components 138 may be analogous to the transceiver system 112, the memory system 114, the processing system 116, and the other components 118 included in the primary device 110. For brevity, further description of these components will be omitted. The host device 130 may comprise a set top box, a music player, a video player, an entertainment unit, a navigation device, a personal digital assistant (PDA), a fixed location data unit, a computer, a laptop, a tablet, a communications device, a mobile phone, or any other suitable device.

Certain conditions in the wireless environment 100 may prevent consistent transmission and/or reception of the data. Accordingly, new techniques are required for improving transmission of host data in a wireless environment analogous to the wireless environment 100. As noted above, to minimize latency and bandwidth usage, new techniques may meet two requirements. First, whenever the host device 130 is transmitting to the primary device 110, the secondary device 120 should be listening to that communication. This enables the secondary device 120 to, for example, receive data packets transmitted from the host device 130 to the primary device 110. Second, whenever the primary device 110 elects to communicate with the secondary device 120, the secondary device 120 should be available and listening to the primary device 110. This enables the primary device 110 and the secondary device 120 to flexibly and opportunistically exchange control signaling and/or missed packets as necessary. In accordance with aspects of the disclosure, the secondary device 120 meets these two requirements by observing an alternating listening pattern in which it listens to the primary device 110 and the host device 130 in alternating slot groups, occasionally interrupting the alternating listening pattern to synchronize with the primary device 110. The alternating listening patterns will be as will be discussed in greater detail below, with reference to FIG. 3.

Figure 2A:
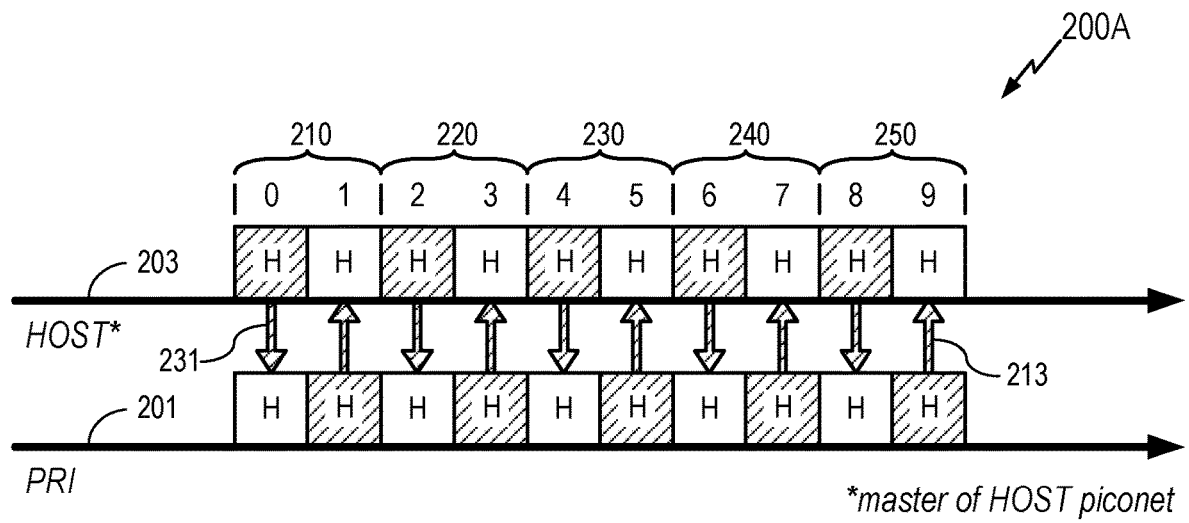
FIG. 2A generally illustrates a timing diagram of a host piconet shared by the host device and the primary device depicted in FIG. 1, in which the host device is master.
Figure 2B:
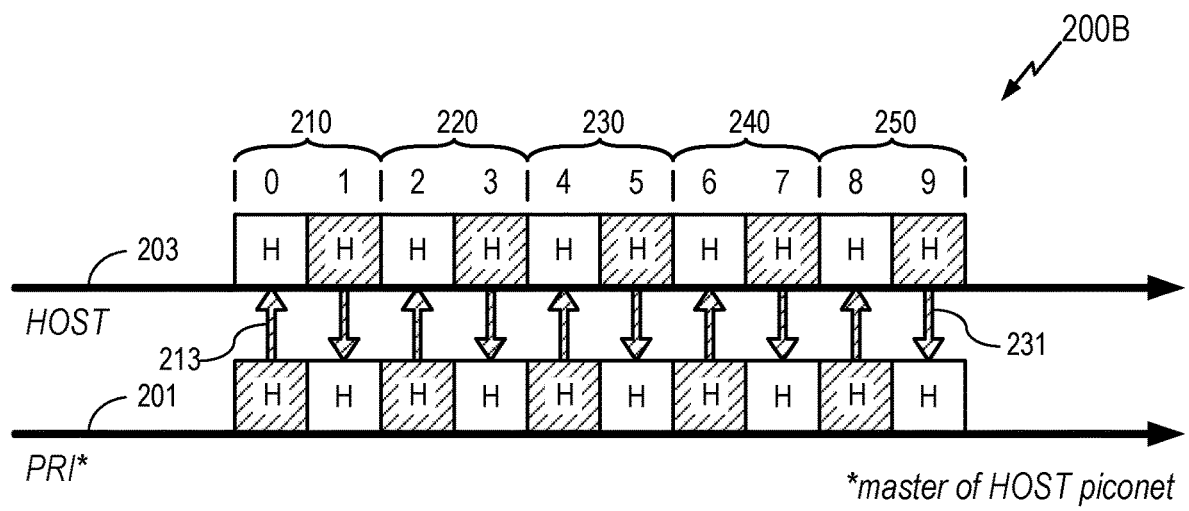
FIG. 2B generally illustrates a timing diagram of a host piconet shared by the host device and the primary device depicted in FIG. 1, in which the primary device is master.

FIGS. 2A-2B generally illustrate timing diagrams of the host piconet 140 shared by the host device 130 and the primary device 110. A piconet such as the host piconet 140 may have a master device and a slave device. In the scenario of FIG. 2A, the host device 130 is the master of the host piconet 140, whereas in FIG. 2B, the primary device 110 is the master of the host piconet 140. Although the following description is directed to the host piconet 140, it will be understood that other piconets described in the present disclosure (for example, the P/S piconet 150) may have similar features.

FIG. 2A generally illustrates a timing diagram 200A of the host piconet 140 shared by the host device 130 and the primary device 110 in which the host device 130 is master of a host piconet 140. The timing diagram 200A includes a host device timeline 203 and a primary device timeline 201. As will be discussed in greater detail below, the host piconet 140 may operate in accordance with a time-division duplexing (TDD) scheme in which a master device transmits for the duration of a particular group of consecutive time slots (hereinafter "slot group") while one or more slave devices receive. The roles may then reverse, such that in a subsequent slot group (for example, an immediately subsequent slot group), one of the one or more slave devices transmits while the master device receives. Each pair of consecutive slot groups, in which the master transmits and then the slave transmits, may be referred to as a "frame". In Bluetooth, for example, a single time slot may have a duration of six-hundred and twenty-five microseconds [625 µs], and a frame may have a duration of twelve-hundred and fifty microseconds [1250 µs]. A single slot group may occupy one, three, or five slots. Accordingly, a frame may occupy two, four, six, eight, or ten slots. For purposes of illustration, each slot group in the present example occupies one slot. However, it will be understood that the term slot group may refer to a duration that includes any suitable number of time slots.

The host device timeline 203 shows the transmission and reception pattern of the host device 130, whereas the primary device timeline 201 shows the transmission and reception pattern of the primary device 110. The host piconet 140 is established such that the slots of the TDD scheme (labeled '0' through '9' in FIG. 2A) are of uniform duration and alignment, known to both the host device 130 and the primary device 110. In the present example, each time slot corresponds to a single slot group, however this is merely an example since, as noted above, a slot group may include more than one slot.

The slots may be divided into pairs of consecutive slot groups (frames, as noted above). In the example of FIG. 2A, a first frame 210 includes a zeroth slot and a first slot (labeled '0' and '1'). Similarly, a second frame 220 includes slots '2' and '3', a third frame 230 includes slots '4' and '5', a fourth frame 240 includes slots '6' and '7', and a fifth frame 250 include slots '8' and '9'. Although only five frames are depicted in FIG. 2A, it will be understood that the transmission and reception pattern depicted in FIG. 2A may continue indefinitely.

As noted above, FIG. 2A depicts a scenario wherein the host device 130 is the master of the host piconet 140. As master, the host device 130 may have a host piconet transmission opportunity 231 in the first slot of each frame (each even-numbered slot in the present example). By contrast, the primary device 110 has an opportunity to transmit during a host piconet transmission opportunity 213 appearing in the last slot of each frame (each odd-numbered slot in the present example). Although only one of each is labeled in FIG. 2A, it will be understood that FIG. 2A depicts five instances of the host piconet transmission opportunity 231 and another five instances of the host piconet transmission opportunity 213.

FIG. 2B generally illustrates a timing diagram 200B of the host piconet 140 shared by the host device 130 and the primary device 110 in which the primary device 110 is master of the host piconet 140.

Like the timing diagram 200A, the timing diagram 200B depicts the host device timeline 203 and the primary device timeline 201. Moreover, the slots are labeled '0' through '9' and are grouped into five frames. Moreover, the host piconet transmission opportunity 213 is an opportunity for the primary device 110 to transmit to the host device 130 and the host piconet transmission opportunity 231 is an opportunity for the host device 130 to transmit to the primary device 110. However, by contrast to the scenario depicted in FIG. 2A, the primary device 110 is master of the host piconet 140. As a result, the host piconet transmission opportunity 213 (reserved for transmissions from the primary device 110 to the host device 130) occurs in the first slot of each frame (i.e., even-numbered slots in the present example) rather than the last slot of each frame (i.e., odd-numbered slots in the present example).

Although FIGS. 2A-2B are directed to example communications over the host piconet 140, it will be understood that a similar TDD scheme may be used for communications over the P/S piconet 150. In particular, a master of the P/S piconet 150 (which may be the primary device 110 or the secondary device 120) may transmit in a first slot group of a frame, and a slave may transmit in a second slot group of the frame.

Figure 3:
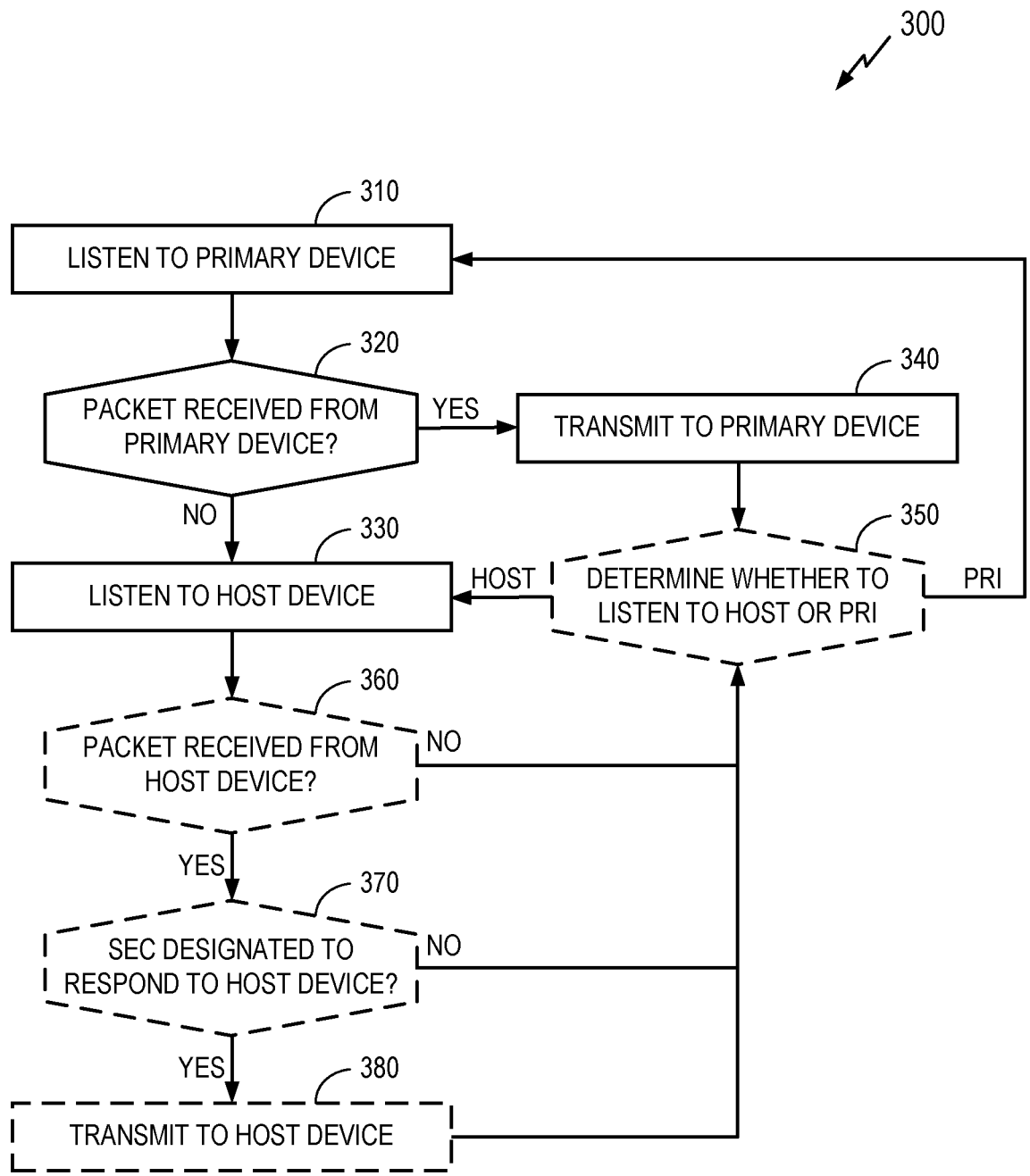
FIG. 3 generally illustrates a method performed by the secondary device depicted in FIG. 1.

FIG. 3 generally illustrates a method 300 performed by the secondary device 120. The method 300 depicted in FIG. 3 will be described as it would be performed by the secondary device 120 depicted in FIG. 1.

At 310, the secondary device 120 listens to the primary device 110 during a receiving slot group of the P/S piconet 150 shared between the primary device 110 and the secondary device 120. The listening at 310 may be performed by, for example, the transceiver system 122 depicted in FIG. 1. Accordingly, the transceiver system 122 may constitute means for listening to a primary device during a receiving slot group of a P/S piconet shared between the primary device and the secondary device. Moreover, the processing system 126 may be configured to operate the transceiver system 122 by executing code stored in the memory system 124. Accordingly, the memory system 124 may be a non-transitory computer-readable medium comprising code for listening to a primary device during a receiving slot group of a P/S piconet shared between the primary device and the secondary device.

As used herein, the term "receiving slot group" corresponds to the perspective of a particular device. For example, the listening at 310 is performed by the secondary device 120, therefore the "receiving slot group of the P/S piconet 150" corresponds to a slot group in the TDD scheme in which the secondary device 120 is configured to receive a data packet over the P/S piconet 150. If the secondary device 120 is a master of the P/S piconet 150, then the "receiving slot group" of the secondary device 120 is the second slot group of a frame, whereas if the secondary device 120 is a slave of the P/S piconet 150, then the "receiving slot group" of the secondary device 120 is the first slot group of the frame. This explanation is important because elsewhere in the field, the term "receiving slot group" may refer to the slot group in which the master of the P/S piconet 150 is configured to receive (i.e., always corresponding to the first slot group of a particular frame). Accordingly, it will be understood that in the method 300, the "receiving slot group" may be the first slot group of a particular frame or the second slot group of the particular frame, i.e., in whichever slot group the secondary device 120 is configured to receive over the P/S piconet 150, regardless of whether the secondary device 120 is a master or a slave of the P/S piconet 150.

At 320, the secondary device 120 determines based on the listening at 310 whether a packet is received from the primary device 110. If no packet is received at 310 ('no' at 320), then the method 300 proceeds to 330. If a packet is received at 310 ('yes' at 320), then the method 300 proceeds to 340. The determining at 320 may be performed by, for example, the memory system 124 and/or the processing system 126 depicted in FIG. 1. Accordingly, the memory system 124 and/or the processing system 126 may constitute means for determining based on the listening during the receiving slot group at 310 whether the primary device 110 is attempting to communicate with the secondary device 120. Moreover, the processing system 126 may be configured to perform the determining at 320 by executing code stored in the memory system 124. Accordingly, the memory system 124 may be a non-transitory computer-readable medium comprising code for determining based on the listening during the receiving slot group at 310 whether the primary device 110 is attempting to communicate with the secondary device 120.

At 330, the secondary device 120 listens to the host device 130 on the host piconet 140 during a transmitting slot group of the P/S piconet 150 in response to a determination at 320 that the primary device 110 is not attempting to communicate with the secondary device 120. The listening at 330 may enable the secondary device 120 to receive a data packet from the host device 130 (in the event that the host device 130 has transmitted a data packet). The listening at 330 may be performed by, for example, the transceiver system 122 depicted in FIG. 1. Accordingly, the transceiver system 122 may constitute means for listening to the host device 130 on the host piconet 140 during a transmitting slot group of the P/S piconet 150 in response to a determination at 320 that the primary device 110 is not attempting to communicate with the secondary device 120. Moreover, the processing system 126 may be configured to operate the transceiver system 122 by executing code stored in the memory system 124. Accordingly, the memory system 124 may be a non-transitory computer-readable medium comprising code for to the host device 130 on the host piconet 140 during a transmitting slot group of the P/S piconet 150 in response to a determination at 320 that the primary device 110 is not attempting to communicate with the secondary device 120.

As used herein, the term "transmitting slot group" is analogous to the term "receiving slot group" in that it corresponds to the perspective of a particular device. For example, the listening at 330 is performed by the secondary device 120, therefore the "transmitting slot group of the P/S piconet 150" corresponds to a slot group in the TDD scheme in which the secondary device 120 is configured to transmit a data packet over the P/S piconet 150. If the secondary device 120 is a master of the P/S piconet 150, then the "transmitting slot group" of the secondary device 120 is the first slot group of a frame, whereas if the secondary device 120 is a slave of the P/S piconet 150, then the "transmitting slot group" of the secondary device 120 is the second slot group of the frame.

At 340, the secondary device 120 transmits to the primary device 110 over the P/S piconet 150 during the transmitting slot group of the P/S piconet 150 in response to a determination at 320 that the primary device 110 is attempting to communicate with the secondary device 120. The transmitting at 340 may be performed by, for example, the transceiver system 122 depicted in FIG. 1. Accordingly, the transceiver system 122 may constitute means for transmitting to the primary device 110 over the P/S piconet 150 during the transmitting slot group of the P/S piconet 150 in response to a determination at 320 that the primary device 110 is attempting to communicate with the secondary device 120. Moreover, the processing system 126 may be configured to operate the transceiver system 122 by executing code stored in the memory system 124. Accordingly, the memory system 124 may be a non-transitory computer-readable medium comprising code for transmitting to the primary device 110 over the P/S piconet 150 during the transmitting slot group of the P/S piconet 150 in response to a determination at 320 that the primary device 110 is attempting to communicate with the secondary device 120.

At 350, the secondary device 120 optionally determines whether to listen to the host device 130 or the primary device 110. As will be discussed in greater detail below, the decision to listen to a particular device to may depend on a timing difference between the host piconet 140 and the P/S piconet 150, or any other suitable factor. If the secondary device 120 determines to listen to the host device 130 ('host' at 350), then the method 300 proceeds to the listening at 330, described above. If the secondary device 120 determines to listen to the primary device 110 ('pri' at 350), then the method 300 returns to the listening at 310, described above.

After listening at 330 to the host device 130, the secondary device 120 may optionally proceed to 360, 370, and 380. These optional blocks may correspond to a scenario in which the secondary device 120 is configured to occasionally, as needed, step into the shoes of the primary device 110. For example, as noted above, the primary device 110 is configured to transmit ACKs to the host device 130 every time a data packet is received. If the primary device 110 is low on battery, processing power, etc., it may determine that overall system efficiency and/or longevity is improved if secondary device 120 takes over responsibility for transmitting ACKs. The optional blocks at 360, 370, and 380, described below, correspond to a scenario in which the secondary device 120 is configured to take responsibility for such tasks.

At 360, the secondary device 120 determines whether a packet has been received from the host device 130. If a packet has been received from the host device 130 ('yes' at 360), then the method proceeds to 370. If a packet has not been received from the host device 130 ('no' at 360), then the method returns to the determining at 350.

At 370, the secondary device 120 determines whether the secondary device 120 is designated to respond to the host device 130. If the secondary device 120 is designated to respond to the host device 130 ('yes' at 370), then the method proceeds to 380. If the secondary device 120 is not designated to respond to the host device 130 ('no' at 370), then the method returns to the determining at 350. The determining at 370 may be based on designation information received from the primary device 110 over the P/S piconet 150. For example, if the designation information indicates that the secondary device 120 is designated to respond to the host device 130, then the secondary device 120 may determine at 370 that the secondary device 120 is designated to respond to the host device 130. If the designation information is not received, or the received designation information indicates that the secondary device 120 is not designated to respond to the host device 130, then the secondary device 120 may determine at 370 that the secondary device 120 is not designated to respond to the host device 130.

At 380, the secondary device 120 transmits to the host device 130. The transmitting at 380 may include, for example, transmitting of an ACK that acknowledges receipt of the data packet received from the host device 130 during the listening at 330.

It will be understood that performance of the method 300 depicted in FIG. 3 may result in the alternating listening pattern described above. In particular, the secondary device 120 may use a receiving slot group of the P/S piconet 150 to listen to the primary device 110, and then use an immediately subsequent transmitting slot group of the P/S piconet 150 to listen to the host device 130. This may continue indefinitely until a packet is received from the primary device 110 during a receiving slot group of the P/S piconet 150, indicating that there will be a synchronization (or at least an attempt to synchronize) between the primary device 110 and the secondary device 120 over the P/S piconet 150. In the event of a synchronization attempt, the secondary device 120 may temporarily abandon the alternating listening pattern and instead use the immediately subsequent transmitting slot of the P/S piconet 150 to provide a reply to the primary device 110.

In one example, a synchronization attempt may correspond to a process for selective relay of missed data packets. Accordingly, the synchronization may comprise transmitting to or receiving from the primary device 110 a selective relay information signal, wherein the selective relay information signal facilitates identification of one or more missed data packets that were transmitted by the host device and missed by the primary device 110 or the secondary device 120. Additionally or alternatively, the synchronization may comprise transmitting to or receiving from the primary device 110 (a) one or more missed data packets that were transmitted by the host device and missed by the primary device or the secondary device and/or (b) auxiliary information relating to the one or more missed data packets. Additionally or alternatively, the synchronization may comprise transmitting or receiving an ACK indicating that a packet has been received from the primary device 110 or a no-acknowledgement (NACK) indicating that the packet was received with errors. The selective relay may include any combination of the above, and may be carried out over a plurality of time slot groups. The plurality of time slot groups may be sequential, or alternatively, non-sequential, i.e., interrupted by an occasional return to the alternating listening pattern.

In another example, a synchronization attempt may correspond to a process for exchange of control data relating to one or more piconets. Accordingly, the synchronization may comprise receiving from the primary device updated host piconet configuration data facilitating continued listening to the host device. Additionally or alternatively, the synchronization may comprise transmitting to or receiving from the primary device updated P/S piconet configuration data facilitating continued communication over the P/S piconet. Additionally or alternatively, the synchronization may comprise transmitting to or receiving from the primary device handover information configured to enable the secondary device to switch from a master of the P/S piconet to a slave of the P/S piconet or vice-versa. Handover may comprise a mandatory step of switching the role of the primary device 110 and the secondary device 120. The switching may further result in a role switch for the master and the slave of the P/S piconet 150. The selective relay may include any combination of the above, and may be carried out over a plurality of time slot groups. The plurality of time slot groups may be sequential, or alternatively, non-sequential, i.e., interrupted by an occasional return to the alternating listening pattern.

Figure 4:
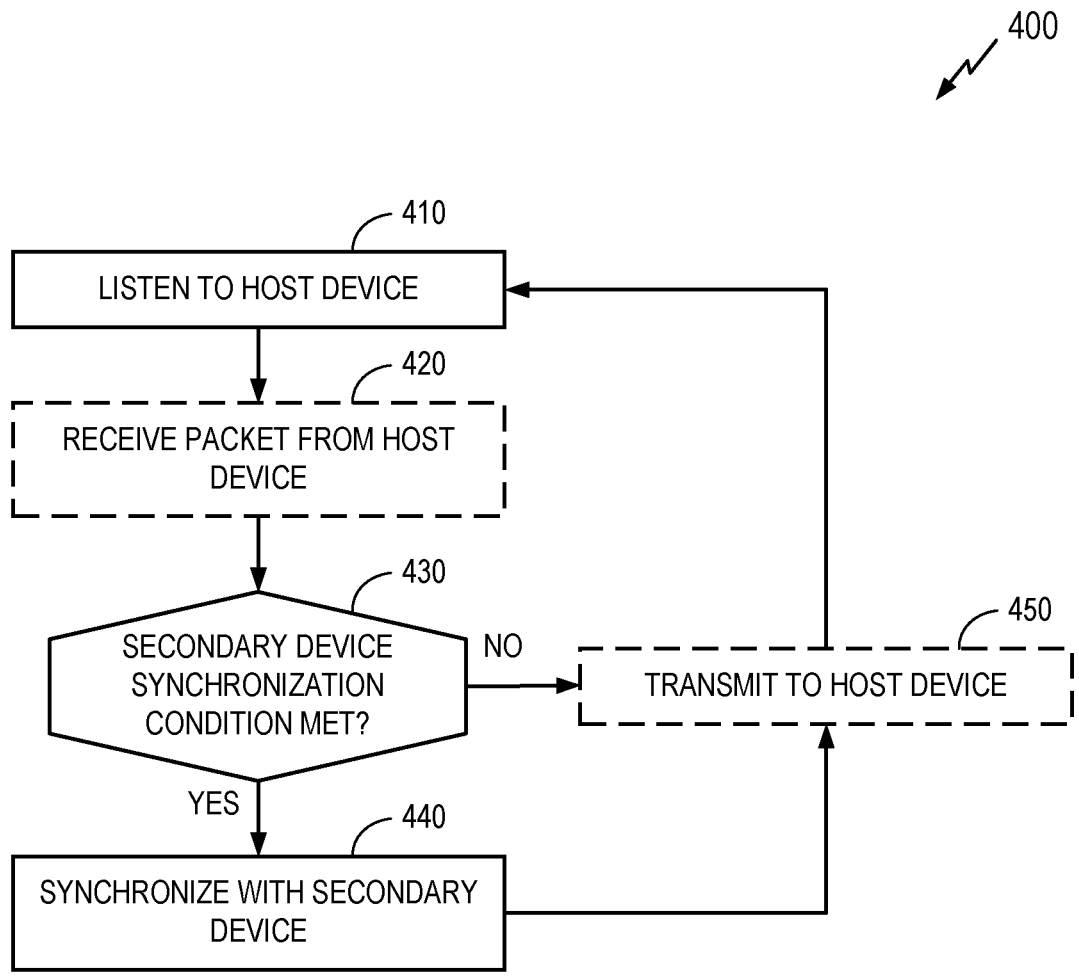
FIG. 4 generally illustrates a method performed by the primary device depicted in FIG. 1.

FIG. 4 generally illustrates a method 400 performed by the primary device 110. The method 400 depicted in FIG. 4 will be described as it would be performed by the primary device 110 depicted in FIG. 1. As noted above with respect to FIG. 3, the secondary device 120 may observe an alternating listening pattern until such time as the primary device 110 attempts to synchronize with the secondary device 120. The method 400 depicted in FIG. 4 relates to a decision by the primary device 110 as to whether to attempt to perform that synchronization.

At 410, the primary device 110 listens to the host device 130 during a receiving slot group of the host piconet 140. The listening at 410 may be performed by, for example, the transceiver system 112 depicted in FIG. 1. Accordingly, the transceiver system 112 may constitute means for listening to the host device 130 during a receiving slot group of the host piconet 140. Moreover, the processing system 116 may be configured to operate the transceiver system 112 by executing code stored in the memory system 114. Accordingly, the memory system 114 may be a non-transitory computer-readable medium comprising code for listening to the host device 130 during a receiving slot group of the host piconet 140.

At 420, the primary device 110 optionally receives a packet from the host device 130 during the listening at 410.

At 430, the primary device 110 determines whether a secondary device synchronization condition is met. If the secondary device synchronization condition is met ('yes' at 430), then the method proceeds to 440. If the secondary device synchronization condition is not met ('no' at 430), then the method proceeds to 450. Examples of the secondary device synchronization condition will be discussed in greater detail below. The determining at 430 may be performed by, for example, the memory system 114 and/or the processing system 116 depicted in FIG. 1. Accordingly, the memory system 114 and/or the processing system 116 may constitute means for determining whether a secondary device synchronization condition is met. Moreover, the processing system 116 may be configured to perform the determining at 430 by executing code stored in the memory system 114. Accordingly, the memory system 114 may be a non-transitory computer-readable medium comprising code for determining whether a secondary device synchronization condition is met.

At 440, the primary device 110 synchronizes with the secondary device 120. The synchronizing at 440 may be performed by, for example, the transceiver system 112, the memory system 114, and/or the processing system 116 depicted in FIG. 1. Accordingly, the transceiver system 112, the memory system 114, and/or the processing system 116 may constitute means for synchronizing with the secondary device 120. For example, the synchronizing may include transmitting or receiving communications using the transceiver system 112, retrieving any received communications from the transceiver system 112 using the memory system 114 and/or the processing system 116, and providing any transmitted communications to the transceiver system 112 using the memory system 114 and/or the processing system 116. Moreover, the processing system 116 may be configured to perform the synchronizing at 440 by executing code stored in the memory system 114. Accordingly, the memory system 114 may be a non-transitory computer-readable medium comprising code for synchronizing with the secondary device 120.

As noted above with respect to FIG. 3, a synchronization attempt may correspond to, for example, a process for selective relay of missed data packets and/or a process for exchange of control data relating to one or more piconets. For brevity, further description of these examples will be omitted.

At 450, the primary device 110 optionally transmits to the host device 130. The transmitting may comprise, for example, transmitting an ACK or NACK relating to a data packet that is received (or not received, or received with errors) during the listening at 410. The optional transmitting at 450 may be omitted if there is nothing to transmit. Moreover, the transmitting at 450 may also be omitted if the determining at 430 or the synchronizing at 440 completes at a time wherein the host device 130 is presently transmitting or (about to transmit) on the host piconet 140.

The secondary device synchronization condition that is the subject of the determining at 430 may be any condition that triggers a synchronization. As a first example, the secondary device synchronization condition may be a data packet reception condition relating to a number of data packets received from the host device 130, wherein the data packet reception condition is met if the number of data packets received from the host device 130 exceeds a data packet reception threshold. The number of data packets may be, for example, a number of data packets received since the last successful synchronization. Accordingly, having a large number of packets received since the last synchronization may indicate that the secondary device 120 is due for another synchronization.

As a second example, the secondary device synchronization condition may be a data readiness condition relating to whether a poll/null signal has been received from the host device, wherein the data readiness condition is met if the poll/null signal has been received. For example, the poll/null signal may be interpreted by the primary device 110 as an indicator that the host device 130 does not have further data at this time or is delaying further transmission of new packets for any suitable reason. Accordingly, the primary device 110 has an opportunity to synchronize with the secondary device 120 without necessarily missing any new packets from the host device 130.

As a third example, the secondary device synchronization condition may be a new control data condition relating to whether new control data has been generated or otherwise obtained by the primary device, wherein the new control data condition is met if new control data has been generated or otherwise obtained by the primary device. As noted above, the host piconet 140 may be established based on host piconet configuration data, and this host piconet configuration data is provided to the secondary device 120 by the primary device 110 so that the secondary device 120 can listen to the host device 130 on the host piconet 140. It will be understood that if the host piconet configuration data changes, it may be necessary for the primary device 110 to provide updated host piconet configuration data to the secondary device 120. Similarly, if a configuration of the P/S piconet 150 changes, it may be necessary for the primary device 110 to provide updated P/S piconet configuration data to the secondary device 120.

As a fourth example, the secondary device synchronization condition may be a handover request condition relating to whether the primary device seeks a handover to the secondary device or vice-versa, wherein the handover request condition is met if the primary device seeks the handover to the secondary device or vice-versa.

Figure 5:
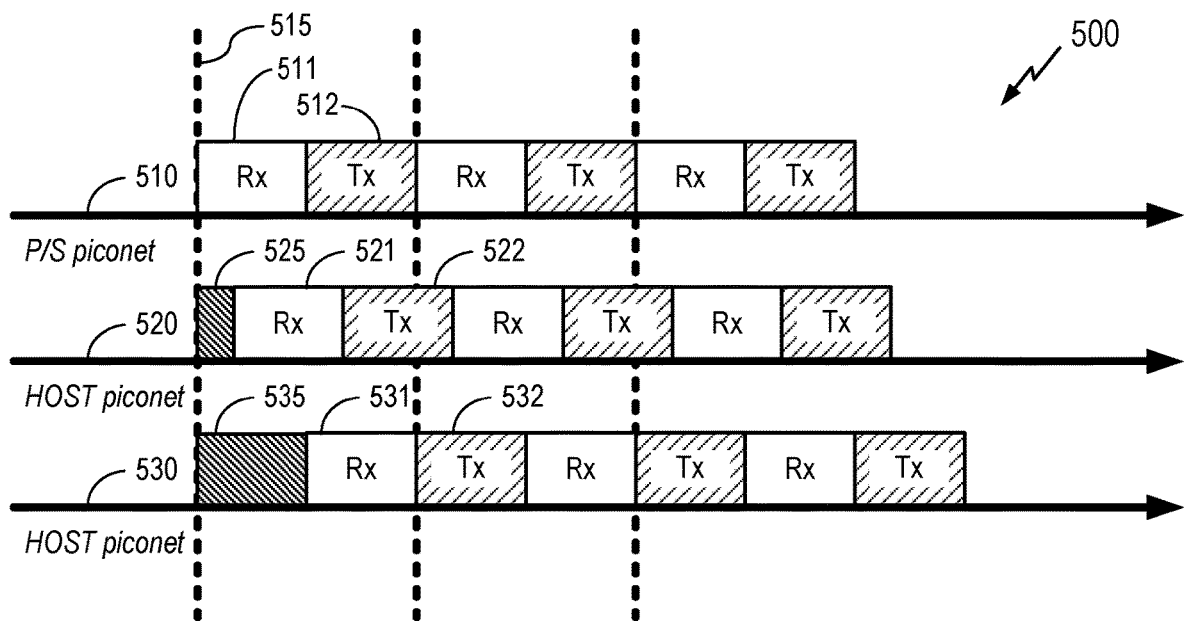
FIG. 5 generally illustrates a timing diagram for a first topology in which the primary device is a master of the P/S piconet and a slave of the host piconet.
Figure 6:
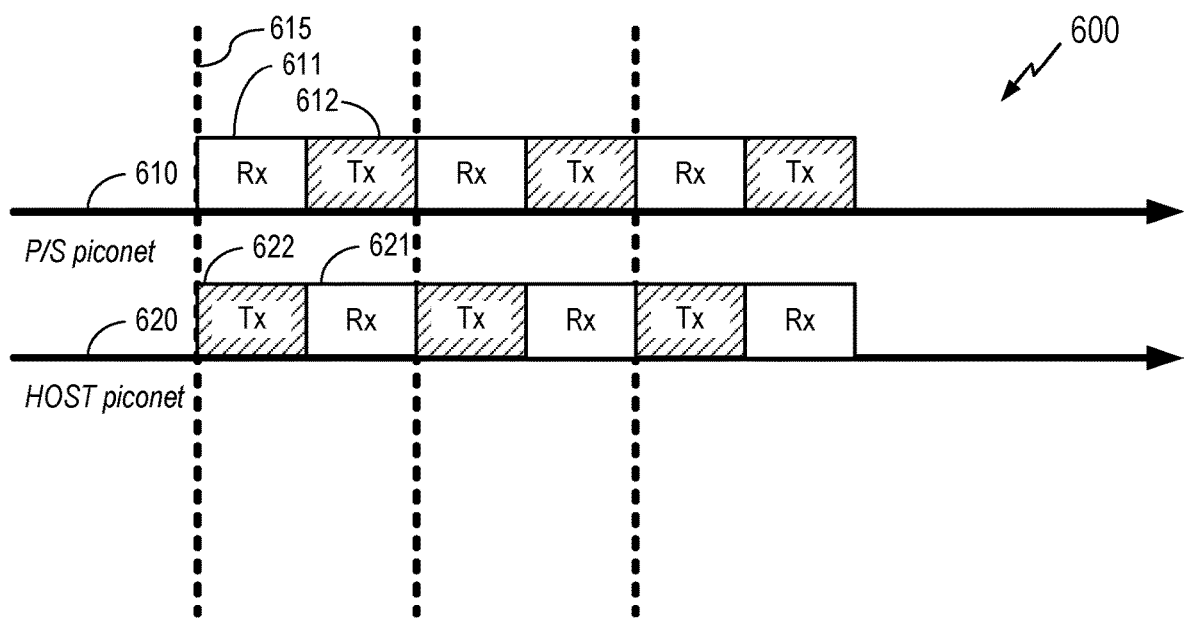
FIG. 6 generally illustrates a timing diagram for a second topology in which the primary device is master of both the P/S piconet and the host piconet.

FIGS. 5-8 depict various timing alignments relating to particular network topologies. FIGS. 5-6 relate to two topologies in which the primary device 110 is a master of the P/S piconet 150, whereas FIGS. 7-8 relate to two other topologies in which the secondary device 120 is the master of the P/S piconet 150.

Before proceeding to the details of FIGS. 5-8, a process for timing alignment will be described. As noted above, the primary device 110 and the host device 130 establish a host piconet 140 on which to communicate. The host piconet 140 has a particular host piconet timing that dictates which of the devices is transmitting and which of the devices is receiving at any given time. The master of the host piconet 140 may set, adjust, and/or maintain the host piconet timing. Adjustment and/or maintenance may be required if, for example, one or more of the clocks of the respective devices is keeping time imperfectly. Similarly, the P/S piconet 150 also has a particular P/S piconet timing that dictates which of the devices is transmitting and which of the devices is receiving at any given time. The master of the P/S piconet 150 may accordingly set, adjust, and/or maintain the P/S piconet timing.

It will be understood that for the method 300 and the method 400 to be performed successfully, the respective timings of the host piconet 140 and the P/S piconet 150 must be coordinated. In particular, when setting, adjusting, and/or maintaining the P/S piconet timing, the master of the P/S piconet 150 may calculate a slot-offset of the host piconet 140 with respect to the P/S piconet 150. The calculated slot-offset may correspond to a value or range of values. The corresponding value or range of values may differ for different topologies, as will be discussed in greater detail below.

FIG. 5 generally illustrates a timing diagram 500 for a first topology in which the primary device 110 is a master of the P/S piconet 150 and a slave of the host piconet 140. The timing diagram 500 shows, from the perspective of the secondary device 120, a relative alignment of the piconet timings of the host piconet 140 and the P/S piconet 150. In particular, the timing diagram 500 depicts a secondary device P/S piconet timeline 510, a secondary device host piconet timeline 520, and a secondary device host piconet timeline 530.

On the secondary device P/S piconet timeline 510, there is a receiving slot group 511 corresponding to a duration within the P/S piconet timing where the primary device 110 is transmitting on the P/S piconet 150. Elsewhere on the secondary device P/S piconet timeline 510 is a transmitting slot group 512 corresponding to a duration within the P/S piconet timing where the secondary device 120 is afforded an opportunity to transmit on the P/S piconet 150. Accordingly, each pair of slot groups (for example, the receiving slot group 511 and the transmitting slot group 512) may be separated from the next pair by a frame boundary 515. Because, in this scenario, the primary device 110 is a master of the P/S piconet 150, the first slot group in each frame is the receiving slot group 511 and the second slot group in each frame is the transmitting slot group 512. FIG. 5 depicts three frames, although it will be understood that the secondary device P/S piconet timeline 510 may continue in this manner indefinitely.

On the secondary device host piconet timeline 520, there is a receiving slot group 521 corresponding to a duration within the host piconet timing where the secondary device 120 is configured to listen to the host piconet 140, and potentially receive data from the host device 130. Elsewhere on the secondary device host piconet timeline 520 is a transmitting slot group 522 corresponding to a duration within the host piconet timing where the host device 130 is configured to listen to the host piconet 140. Because, in this scenario, the primary device 110 is a slave of the host piconet 140, the first slot group in each frame is the receiving slot group 521 and the second slot group in each frame is the transmitting slot group 522. As will be understood from the secondary device host piconet timeline 520, there is a minimum offset value 525 representing a minimum delay between the frame boundary 515 of the P/S piconet 150 and the beginning of the frame in the host piconet 140. The transmitting slot group 522 may be used by the secondary device 120 to transmit to the host device 130 if the primary device 110 has designated the secondary device 120 to do so. Otherwise, the transmitting slot group 522 may be used by the primary device 110 to respond to the secondary device 120 if it has received something from the host.

On the secondary device host piconet timeline 530, there is a receiving slot group 531 and a transmitting slot group 532 analogous to the receiving slot group 521 and the transmitting slot group 522 described above. As will be understood from the secondary device host piconet timeline 530, there is a maximum offset value 535 representing a maximum delay between the frame boundary 515 of the host piconet 140 and the beginning of the frame in the P/S piconet 150.

As noted above, in the scenario of FIG. 5, the primary device 110 is the master of the P/S piconet 150. Accordingly, the primary device 110 may be configured to calculate a slot-offset of the host piconet timing relative to the P/S piconet timing by selecting an offset value that is between the minimum offset value 525 depicted in FIG. 5 and the maximum offset value 535 depicted in FIG. 5. Once the slot-offset is calculated, the primary device 110 may be further configured to set, adjust, and/or maintain the P/S piconet timing based on the calculated slot-offset. In some implementations, the secondary device 120 (i.e., the slave of the P/S piconet 150) may simply follow the lead of the primary device 110. As a result, the secondary device 120 may observe a reception/transmission pattern on the host piconet 140 that begins later than the reception/transmission pattern depicted in the secondary device host piconet timeline 520 and earlier than the reception/transmission pattern depicted in the secondary device host piconet timeline 530 (i.e., between the minimum and maximum offsets).

The actual values of the minimum offset value 525 and the maximum offset value 535 may be calculated in any suitable manner. For example, the minimum offset value 525 may be equal to (X+Y) and the maximum offset value 535 may be equal to a duration of a single frame plus Z minus Y, wherein X is an amount of time required for the secondary device 120 to determine whether the primary device 110 is attempting to communicate with the secondary device 120, Y is a time required by the secondary device secondary device 120 to switch between the host piconet 140 and the P/S piconet 150, and Z is a minimum residual time left after transmitting a full-length data packet. Z may correspond to three values $Z_1$, $Z_3$, and $Z_5$, where $Z_1$ corresponds to a one-slot length, $Z_3$ corresponds to a three-slot length, and $Z_5$ corresponds to a five-slot length. In the case of $Z_1$, the value may be equal, for example, to 625 µs minus an amount of time required to receive a packet with a maximum payload length of one slot. In the case of $Z_3$, the value may be equal, for example, to 1875 µs minus an amount of time required to receive a packet with a maximum payload length of three slots. In the case of $Z_5$, the value may be equal, for example, to 3125 µs minus an amount of time required to receive a packet with a maximum payload length of five slots. In general terms, for a packet with a slot length of N, Z may be equal, for example, to N times 625 µs minus an amount of time required to receive a packet with a maximum payload length of N slots. The host piconet 140 may be configured to use all of one-slot packets, three-slot packets and five-slot packets or any combination of these. Accordingly, Z may be equal to Minimum($Z_{N1}$, $Z_{N2}$, . . . ) µs, where N1, N2, . . . are the packet type lengths which the host piconet 140 is configured to use. So, Z may be equal to a minimum of time left from packet slot length after receiving the maximum payload length packet corresponding to the packet slot length from all the packet slot lengths for which the host piconet 140 is configured. This maximum offset will allow secondary device 120 to complete a reception from the host device 130 and listen to the primary device 110 in the immediate next slot. As will be understood from FIG. 5, the host piconet timeline 530 is shifted such that with maximum offset 535, the host device 130 finishes its reception by the start of the transmitting slot group 532 so that it can listen to the primary device 110 in the transmitting slot group 532 unless it is designated to respond to the host device 130 for a packet received in the receiving slot group 531. If so, the secondary device 120 will transmit to the host device 130 in the transmitting slot group 532.

FIG. 6 generally illustrates a timing diagram 600 for a second topology in which the primary device 110 is master of both the P/S piconet 150 and the host piconet 140. In this scenario, the host piconet 140 and the P/S piconet 150 may be described as aligned, wherein the primary device 110 need not set or adjust anything to bring this alignment, since the two piconets may act as a single piconet. Like the timing diagram 500, the timing diagram 600 shows a relative alignment of the piconet timings of the host piconet 140 with respect to the P/S piconet 150 from the perspective of the secondary device 120. The timing diagram 600 includes a secondary device P/S piconet timeline 610 analogous to the secondary device P/S piconet timeline 510 and a secondary device P/S piconet timeline 620 analogous to the secondary device host piconet timeline 520. Moreover, the secondary device host piconet timeline 610 includes a receiving slot group 611 analogous to the receiving slot group 511, a transmitting slot group 612 analogous to the transmitting slot group 512, and a frame boundary 615 analogous to the frame boundary 515.

In FIG. 6, the receiving slot group 611 and the transmitting slot group 622 correspond to a transmission slot of the primary device 110, and a reception slot of both the secondary device 120 and the host device 130. The primary device 110 may send a packet to either device based on, for example, the method 400 depicted in FIG. 4. If the primary device 110 transmits a packet to the host device 130, then the host device 130 will respond back in the receiving slot group 621. And since the secondary device 120 did not hear anything from the primary device 110 in receiving slot group 611, it will sniff to the host device 130 in the transmitting slot group 612. If the primary device 110 transmits a packet to the secondary device 120 in the receiving slot group 611, then the secondary device 120 will respond back in the transmitting slot group 612.

The secondary device P/S piconet timeline 620 includes a receiving slot group 621 analogous to the receiving slot group 521 and a transmitting slot group 622 analogous to the transmitting slot group 522, however, in the scenario of FIG. 6 (in which the primary device 110 is a master rather than a slave of the host piconet 140) the transmitting slot group 622 precedes the receiving slot group 621 within the frame.

As will be understood from FIG. 6, there is no offset of the host piconet timing relative to the P/S piconet timing. Accordingly, the primary device 110 may be configured to calculate a slot-offset equal to zero in response to a determination that the primary device 110 is the master of both the host piconet 140 and the P/S piconet 150. Once the slot-offset is calculated, the primary device 110 may be further configured to set, adjust, and/or maintain the P/S piconet timing based on the calculated slot-offset. In some implementations, the secondary device 120 (i.e., the slave of the P/S piconet 150) may simply follow the lead of the primary device 110. As a result, the secondary device 120 may observe the reception/transmission pattern depicted on the secondary device host piconet timeline 620 of FIG. 6.

Figure 7:
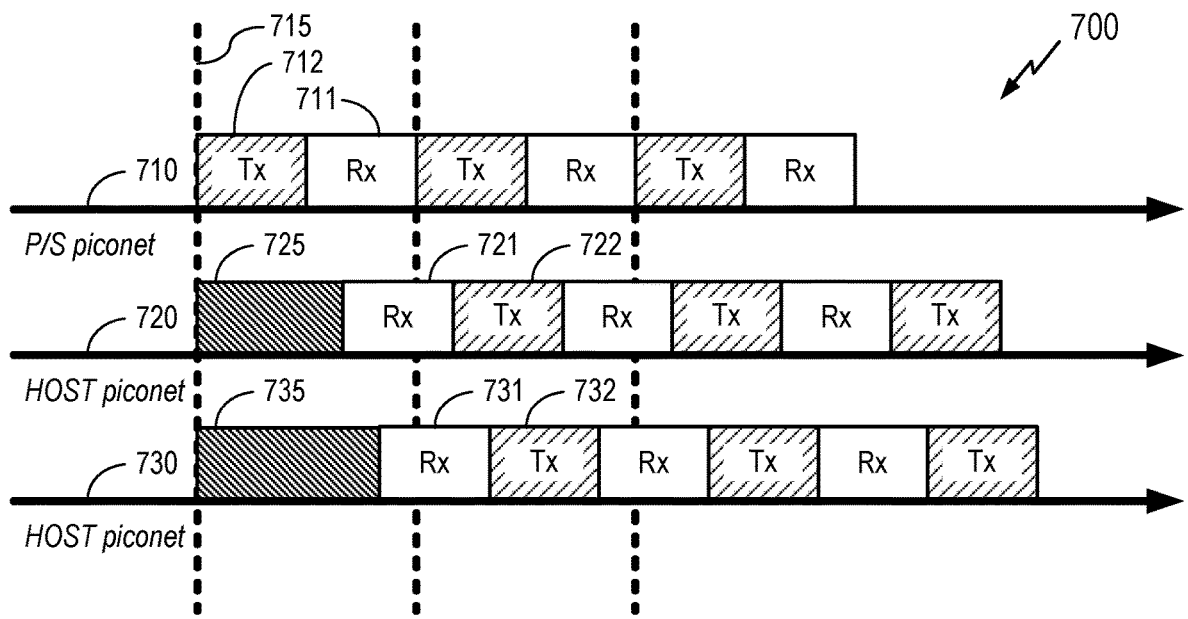
FIG. 7 generally illustrates a timing diagram for a third topology in which the secondary device is the master of the P/S piconet and the primary device is the slave of the host piconet.

FIG. 7 generally illustrates a timing diagram 700 for a third topology in which the secondary device 120 is the master of the P/S piconet 150 and the primary device 110 is the slave of the host piconet 140. Like the timing diagram 500, the timing diagram 700 depicts a relative alignment of the piconet timings of the host piconet 140 and the P/S piconet 150 from the perspective of the secondary device 120. The timing diagram 700 includes a secondary device P/S piconet timeline 710 analogous to the secondary device P/S piconet timeline 510 and a secondary device host piconet timeline 720 analogous to the secondary device host piconet timeline 520. Moreover, the secondary device host piconet timeline 710 includes a receiving slot group 711 analogous to the receiving slot group 511, a transmitting slot group 712 analogous to the transmitting slot group 512, and a frame boundary 715 analogous to the frame boundary 515.

The secondary device host piconet timeline 720 includes a receiving slot group 721 analogous to the receiving slot group 521, a transmitting slot group 722 analogous to the transmitting slot group 522, and a minimum offset value 725 analogous to the minimum offset value 525. The secondary device host piconet timeline 730 includes a receiving slot group 731 analogous to the receiving slot group 531, a transmitting slot group 732 analogous to the transmitting slot group 532, and a maximum offset value 735 analogous to the maximum offset value 535. The transmitting slot group 722 may be used by the secondary device 120 to transmit to the host device 130 if the primary device 110 has designated the secondary device 120 to do so. Otherwise, the transmitting slot group 722 may be used by the primary device 110 to respond to the secondary device 120 if it has received something from the host.

In the scenario of FIG. 5, the primary device 110 is the master of the P/S piconet 150. By contrast, in the scenario of FIG. 7, the secondary device 120 is the master of the P/S piconet 150. Accordingly, in the scenario of FIG. 7, the secondary device 120 may be configured to calculate a slot-offset of the host piconet timing relative to the P/S piconet timing by selecting an offset value that is between the minimum offset value 725 depicted in FIG. 7 and the maximum offset value 735 depicted in FIG. 7. Once the slot-offset is calculated, the secondary device 120 may be further configured to set, adjust, and/or maintain the P/S piconet timing based on the calculated slot-offset. As a result, the secondary device 120 may observe a reception/transmission pattern on the host piconet 140 that is later than the reception/transmission pattern depicted in the secondary device host piconet timeline 720 and earlier than the reception/transmission pattern depicted in the secondary device host piconet timeline 730. The actual values of the minimum offset value 725 and the maximum offset value 735 may be calculated in any suitable manner. For example, the minimum offset value 725 may be equal to a duration of a single slot group plus X+Y and the maximum offset value 735 may be equal to a duration of the single frame minus (X+Y), wherein X is an amount of time required for the secondary device 120 to determine whether the primary device 110 is attempting to communicate with the secondary device 120 and Y is a time required by the secondary device 120 to switch between the host piconet 140 and the P/S piconet 150.

Figure 8:
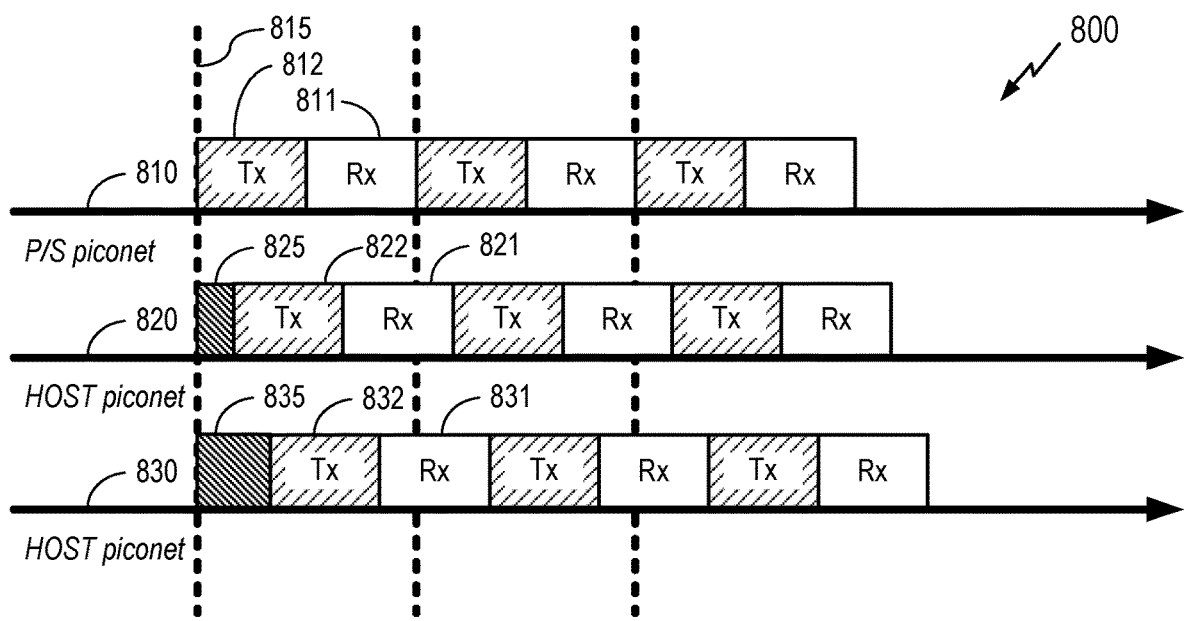
FIG. 8 generally illustrates a timing diagram for a fourth topology in which the secondary device is the master of the P/S piconet and the primary device is the master of the host piconet.

FIG. 8 generally illustrates a timing diagram 800 for a fourth topology in which the secondary device 120 is the master of the P/S piconet 150 and the primary device 110 is the master of the host piconet 140. Like the timing diagrams depicted in FIGS. 5-7, the timing diagram 800 depicts a relative alignment of the piconet timings of the host piconet 140 and the P/S piconet 150 from the perspective of the secondary device 120. The timing diagram 800 includes a secondary device P/S piconet timeline 810 analogous to the secondary device P/S piconet timeline 710 and a secondary device host piconet timeline 820 analogous to the secondary device host piconet timeline 720. Moreover, the secondary device host piconet timeline 810 includes a receiving slot group 811 analogous to the receiving slot group 711, a transmitting slot group 812 analogous to the transmitting slot group 712, and a frame boundary 815 analogous to the frame boundary 715.

The secondary device host piconet timeline 820 includes a receiving slot group 821 analogous to the receiving slot group 721, a transmitting slot group 822 analogous to the transmitting slot group 722, and a minimum offset value 825 analogous to the minimum offset value 725. The secondary device host piconet timeline 830 includes a receiving slot group 831 analogous to the receiving slot group 731, a transmitting slot group 832 analogous to the transmitting slot group 732, and a maximum offset value 835 analogous to the maximum offset value 735. However, unlike in FIG. 7 (corresponding to a scenario in which the primary device 110 is a slave of the host piconet 140), the transmitting slot group 822 and the transmitting slot group 832 precede the receiving slot group 821 and the receiving slot group 831, respectively. The transmitting slot group 822 may belong to the primary device 110 to speak to the host device 130. If a packet is sniffed by the secondary device 120 which is sent by the host device 130, and the secondary device 120 is designated to respond to the host device 130 for this packet, then the secondary device 120 will use the transmitting slot group 822 for transmitting to the host device 130.

Similar to the scenario of FIG. 7, the secondary device 120 in the scenario of FIG. 8 is the master of the P/S piconet 150. Accordingly, the secondary device 120 may be configured to calculate a slot-offset of the host piconet timing relative to the P/S piconet timing by selecting an offset value that is between the minimum offset value 825 depicted in FIG. 8 and the maximum offset value 835 depicted in FIG. 8. Once the slot-offset is calculated, the secondary device 120 may be further configured to set, adjust, and/or maintain the P/S piconet timing based on the calculated slot-offset. As a result, the secondary device 120 may observe a reception/transmission pattern on the host piconet 140 that is later than the reception/transmission pattern depicted in the secondary device host piconet timeline 820 and earlier than the reception/transmission pattern depicted in the secondary device host piconet timeline 830. The actual values of the minimum offset value 825 and the maximum offset value 835 may be calculated in any suitable manner. For example, the minimum offset value 825 may be equal to (X+Y) and the maximum offset value 835 may be equal to a duration of a single slot group minus (X+Y), wherein X is an amount of time required for the secondary device 120 to determine whether the primary device 110 is attempting to communicate with the secondary device 120 and Y is a time required by the secondary device 120 to switch between the host piconet 140 and the P/S piconet 150.

Recall from above that in a scenario of "a phone and two ear buds" (or simply "buds") for voice communication, it is desirable that the phone's voice data to be heard at both buds. One of the buds will be referred to as the primary bud, and the other will be referred to as the secondary bud. In this scenario, the phone and the primary bud may communicate with each other over a link (e.g., host piconet 140) to transfer phone's voice data to the primary bud. The secondary bud may listen in or "sniff" the host piconet for the voice data to enable the voice data to be heard at both buds.

More generally, it is proposed to enable a secondary device (e.g., secondary bud) to sniff data transmitted from a host device (e.g., phone) to a primary device (e.g., primary bud) over the link (e.g., host piconet) between the host and primary devices. In an aspect, the piconet and opportunistic sniffing described above may be used.

The phone's voice data may be packaged in one or more voice packets, and transferred one by one from the phone to the primary bud over corresponding one by one time intervals of the host piconet. An interval of the host piconet may comprise some number of slots/frames (e.g., 12 slots/6 frames). This number may be fixed or may vary interval to interval. Within an interval, a subset of the slots/frames (e.g., 4 or 6 slots/2 or 3 frames) may be used to transfer a voice packet. The combination of the reserved and retransmission slots/frames will be referred to as an enhanced synchronous connection-oriented (eSCO) window.

At this juncture, it may be helpful to provide a broad outline so that detailed description can be understood in proper context. One of the assumptions that may be made is that the primary bud's behavior with the phone is nothing out the ordinary, i.e., the phone transmits voice packets destined to the primary bud, which acknowledges the receipt or requests for retransmission when it does not detect the voice packets. The phone itself may be unaware of the secondary bud.

Then to enable phone's voice data to be heard at the secondary bud, it is proposed that the secondary bud sniff the host piconet in the eSCO window for the voice packets. This means that sniff criterion for the secondary bud in the eSCO window as well as exit criterion for the secondary bud from the eSCO will be described. It should be noted that in one or more aspects, little to no change is proposed regarding the primary bud's behavior with the phone in the eSCO window.

After the buds exit from the eSCO window, communication may take place between the primary and secondary buds. It should be noted that exiting from the eSCO window does NOT require that the entire duration of the eSCO window must pass before exiting. Exiting the eSCO window may be viewed as exiting from processing data transmitted from the phone within interval. Thus, if the primary and/or the secondary bud determines that the phone has no data to transmit as early as from the reserved window, then the buds may exit and communication between the primary and secondary buds as early as the retransmission window. Note that the primary and the secondary buds need not exit at the same time. The communication may be to address one or more of the following situations:

(1) Both the primary and secondary buds have correctly received the voice packet from the phone within the eSCO window;
(2) The primary bud has correctly received the voice packet within the eSCO window, but the secondary bud has not;
(3) The secondary bud has correctly received the voice packet within the eSCO window, but the primary bud has not; and
(4) Neither the primary nor the secondary bud has correctly received the voice packet from the phone within the eSCO window.

In situation (2), the communication may be for the primary bud to relay the packet to the secondary bud. In situation (3), the communication may be for the secondary bud to relay the packet to the primary bud. In both of these situations, the user experience may still be maintained (e.g., voice in both ears).

Situation (1) is of course the most desirable outcome. In situation (1), there may be little to no communication that takes place between the primary and secondary buds. If there is any communication, it may be to simply notify one another that the packet has been received. In this way, resources required to relay the packets and/or listen for the packets may be conserved. Alternatively, the primary bud and/or the secondary bud may unconditionally relay the packet. This alternative can simplify the operation of the primary and/or the secondary earbuds while ensuring that situations (2) and (3) are addressed.

Situation (4) is the most undesirable outcome. In situation (4), the communication may be geared towards reducing wasting of resources required to listen for packet relays that will never arrive.

Regarding the sniffing criterion, the secondary bud may sniff the host piconet for the phone's voice packet. For example, the secondary bud may sniff the reserved slots (slots of reserved window(s)) and the retransmission slots (slots of retransmission window(s)) for the voice packets. In an aspect, the retransmission slots may be sniffed when the secondary bud does not correctly receive the voice packet in the reserved slots.

Regarding the exit criterion from the eSCO window, the secondary bud may exit from further processing within the interval if the secondary bud successfully sniffs the voice packet from the phone within the eSCO window (master slots 0, 2, 4, . . . ). The secondary bud may also exit by listening to the phone's NULL/POLL. It should be noted that this ACK may depend on the phone's implementation. Also, it may be that the secondary bud sniffs in retransmission slots (e.g., slots 2, 4, . . . ) for the NULL/POLL.

Figure 9:
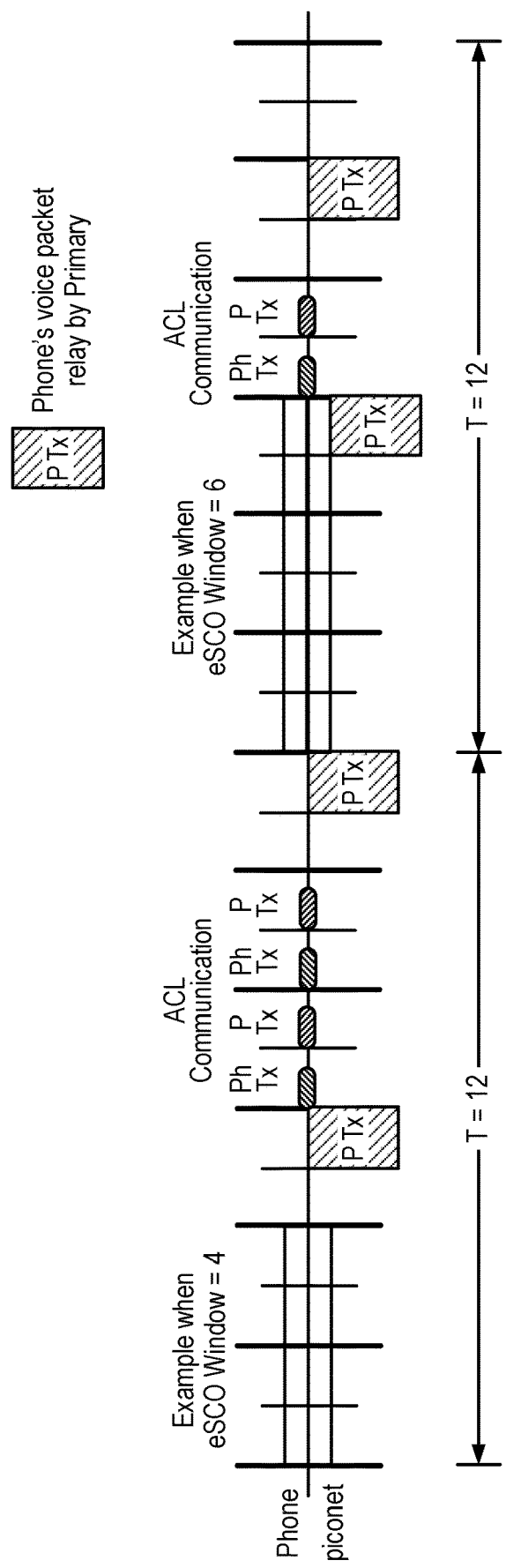
FIG. 9 generally illustrates a timing diagram of a host piconet (e.g., phone piconet) shared by a host device (e.g., phone) and a primary device (e.g., primary ear bud) and sniffed by a secondary device (e.g., secondary ear bud) for relaying packets between primary and secondary devices.

This is explained with reference to FIG. 9 which illustrates an example timeline of a host piconet, in which the phone is the master and the primary bud is the slave. The time line illustrates two time intervals of twelve slots (slots 0-11) each, first interval with an eSCO window of four slots (slots 0-3), and a second interval an eSCO window of six slots (slots 0-5). In the first interval, it is assumed that the slots of frame 0 (slots 0 and 1) are reserved slots (i.e., reserved window comprises frame 0), and the slots frame 2 (slots 2 and 3) are retransmission slots (i.e., retransmission window comprises frame 2) indicating that there is one retransmission opportunity (master slot 2) for the host. In the second interval, it is also assumed that the slots of frame 0 (slots 0 and 1) are reserved slots (i.e., reserved window comprises frame 0). However, the slots of frame 1 (slots 2 and 3) and of frame 2 (slots 4 and 5) are retransmission slots (i.e., retransmission window comprises frames 1 and 2) indicating that there are two retransmission opportunities (master slots 2 and 4) for the host.

Before proceeding, the following should be noted. While voice packets have been discussed thus far, this should not be taken to be limiting. The packets may be packets of data in general. To indicate the generic nature, the term "eSCO packets" will be used, of which voice packet is an example. In an aspect, eSCO packets may be distinguished from ACL data in that eSCO packets may be exchanged between the phone (or a host device generally) and the primary bud (or a primary device generally) only within the eSCO window, while the ACL data may be within the eSCO window as well as subsequent to the eSCO window within the interval. Another distinction may be that eSCO packets can be exchanged within the reserved window, but the ACL data are not.

Referring to the first interval, the secondary bud may sniff slot 0 (reserved slot for Tx from phone, i.e., master slot of reserved window) for the eSCO packet from the phone. If the secondary bud does not successfully sniff the packet in slot 0, the secondary bud may then sniff slot 2 (retransmission slot for Tx from phone, i.e., master slot of retransmission window) for the eSCO packet. It should be noted that in an aspect, the retransmission window can comprise zero or more frames. Thus, the secondary bud may sniff master slots of the retransmission window when the number of frames of the retransmission window is greater than zero.

Note that the phone may retransmit in slot 2 only when the primary bud also does not successfully receive the eSCO packet in slot 0, and thus requests for retransmission in slot 1 (reserved slot for Tx by primary bud, i.e., slave slot of reserved window), e.g., by sending a NACK to the phone, or by sending nothing at all in the slave slot of the reserved window. On the other hand, if the primary bud receives the eSCO packet in slot 0 and thus sends an ACK to the phone in slot 1, the phone will not retransmit the eSCO packet within the interval. In this instance, the primary bud may relay the eSCO packet to the secondary bud. In an aspect, ACK may comprise sending the received eSCO packet with an ACK header or may comprise a NULL ACK.

When the eSCO window is larger such as in the second interval, then the number of retransmission opportunities increases correspondingly. This means that the secondary bud may also sniff slot 4 (another master slot of retransmission window) for the eSCO packet from the phone, assuming that the primary bud also has failed twice to receive the eSCO packets in slots 0 and 2 and thus sent NACKs (or sent no responses) in slots 1 and 3.

If the secondary bud does successfully sniff the eSCO packet within the eSCO window (e.g., in slot 0 or 2 when eSCO=4 slots or in slot 0, 2 or 4 when eSCO=6 slots), the secondary bud may exit from processing the remaining slots of the interval, and thereby save power. Also, if the secondary bud recognizes that the phone has no voice data to send (e.g., by detecting NULL/POLL), the secondary bud may also exit. After exiting, the secondary bud may sniff for eSCO packets in subsequent intervals.

As indicated above, after the buds exit from the eSCO window, communication may take place between the primary and secondary buds. For eSCO relay purposes, the primary bud should not miss the phone's Tx slots. The relay may be from the primary to the secondary bud, also referred to as P2S relay, and/or from the secondary to the primary bud, also referred to as S2P relay.

Regarding the P2S relay from the perspective of the primary side, in an aspect, the primary bud may relay the eSCO packet on its own Tx slots of the host piconet—i.e., the slave slots—when it does not hear from the phone in the previous slot. For example, in the first interval of FIG. 9, assume that the primary bud successfully receives the packet (in slot 0 or 2). Also assume that the primary bud does not hear from the phone in slot 4, which the primary bud may interpret as there being no further communication between the phone and the primary bud for remainder of the interval. In this instance, the primary may relay the packet to the secondary bud in slot 5.

While not illustrated, the primary bud may relay the packet even during the eSCO window. For example, assume that the primary bud receives the packet in slot 0, but does not hear from the phone in slot 2. In this instance, the primary bud may start the relay as soon as in slot 3. Thus, it is seen that in one aspect, if the primary bud successfully receives the packet during the eSCO window, the primary bud may wait until the end of the eSCO window to relay or when it does not hear from the phone in the previous slot, whichever is later. In another aspect, the primary bud may start the relay when it does not hear from the phone in the previous slot regardless of whether the eSCO window has passed or not.

Alternatively or in addition thereto, even when the primary bud hears from the phone in a previous slot, the primary bud may still relay the eSCO packet on its own immediately subsequent slot if it does not need to respond back to the phone. For example, in the second interval of FIG. 9, again assume that the primary bud successfully receives the packet (in slot 0 or 2). But this time, assume that the primary bud also hears from the phone in slot 4, but no response is required. In this instance, the primary may relay the packet to the secondary bud in slot 5. Again, the primary bud may or may not take into consideration on whether or not the eSCO window has passed. In general, if there is communication received from the host, the primary bud may respond back to the host. On the other hand, if the response is not useful or is of lesser priority, then the primary bud may relay the packet to the secondary bud or receive a relay of the packet from the secondary bud.

The number of times that the primary bud can relay the packet within any interval may be fixed. In FIG. 9, it is illustrated that the relay occurs two times in both the first and second intervals. The number of retransmissions within an interval may depend on a number of retransmission opportunities (which can be zero or more) for the phone in the eSCO window. In an aspect, the relay may be sent using earbud piconet access code and on frequency determine using earbud BD ADDR and the phone piconet clock. In this way, synchronization may be maintained with the phone, and communication behaviors between the phone and the primary bud may be maintained.

In an aspect, the primary bud may unconditionally relay the eSCO packet to the secondary bud when it successfully receives the packet during the eSCO window, and/or the secondary bud may unconditionally relay the eSCO packet to the primary bud when it successfully sniffs the packet during the eSCO window. This unconditional relay can simplify the relay process performed by the primary and/or the secondary bud. The relayed packet may be ignored by the primary bud and/or the secondary bud if the packet was successfully received and/or sniffed. On the other hand, if the packet is not successfully received or sniffed, the primary bud may schedule to listen to the secondary bud or vice versa.

Alternatively, relay may be optimized so that relay occurs only when necessary. That is, the P2S relay may occur when the secondary bud does not successfully sniff the packet in the eSCO window. Alternatively or in addition thereto, S2P relay may occur when the primary bud does not successfully receive the packet in the eSCO window.

Regarding the PS2 relay from the perspective of the secondary side, if the secondary bud is able to successfully sniff the packet from the phone within the eSCO window (e.g., in reserved slot 0 or in retransmission slots 2, 4, ... ), then it need not schedule listening to the primary bud for the packet relay. However, when the secondary bud is unable to sniff the packet successfully, the secondary bud may schedule to listen to the primary bud to receive the packet relay. As seen in FIG. 9, the secondary bud may schedule listening to the primary bud in one or more slots of the P/S piconet corresponding to the one or more slave slots of the primary bud (e.g., slots 5, 7, 9, etc.) of the host piconet within an interval subsequent to the eSCO window. If the primary bud is configured to relay only after the eSCO window has passed, then scheduling for listening subsequent to the eSCO window would minimize unnecessary listening.

However, in another aspect, recall that the primary bud may start to relay at the first opportunity, e.g., when the primary bud does not hear from the phone in the previous slot. In this aspect, the primary bud may start the relay as soon as in a P/S piconet slot corresponding to slot 3 of the host piconet, which is the first slave slot after the reserved window (slots 0, 1). Thus, in this another aspect, the secondary bud may schedule listening to the primary bud in one or more slots of the P/S piconet corresponding to the one or more slave slots (3, 5, 7, ... ) of the interval of the host piconet when it does not successfully sniff the eSCO packet in the master slot of the reserved window (slot 0), i.e., subsequent to the reserved window.

Note that the secondary bud does not necessarily know beforehand exactly on which slot the primary bud will use to relay the packet. However, there are some slots in which the primary bud will be more likely to be free (i.e., less likely to use the slot to transmit to the phone) for relaying the packet. For example, host piconet slots immediately subsequent to the eSCO window (e.g., the asynchronous connection-less (ACL) window slots) are more likely to be used between the primary bud and the phone to exchange control and/or configuration information.

Therefore, at least one slot scheduled for listening may be a host piconet slot that corresponds to a fixed number of host piconet slots after the end of the eSCO window. For example, it may be likely that the phone and the primary bud are likely to use two slots (e.g., slots 6 and 7 in the second interval of FIG. 9) after the eSCO window for exchanging control information. In this instance, the secondary bud may schedule to listen at least during a P/S piconet slot corresponding to a fourth host piconet slot subsequent to the eSCO window (listen during slot 9 which is fourth slot after slot 5).

In general, the secondary bud may receive the eSCO packet in any of the following slots within an interval of the host piconet: master slot(s) of the reserved window (e.g., by sniffing), master slot(s) of the retransmission window (e.g., by sniffing), and P/S piconet slots corresponding to the host piconet slave slots of the interval subsequent to the eSCO window (e.g., for relays from the primary bud). If the primary bud is configured to relay at the earliest opportunity, then P/S piconet slots corresponding to the host piconet slave slots of the retransmission window may also be possible slots to receive the voice (e.g., for relays from the primary bud).

It is mentioned above that one or both of the P2S and S2P relays may occur unconditionally. FIGS. 10A-10F illustrate different unconditional P2S and S2P relay scenarios. In particular, timelines of host (e.g., phone), and primary and secondary devices (e.g., ear buds) are illustrated. In these figures, it is assumed that the interval T is twelve slots (0-11) or six frames (0-5) in length with eSCO window being six slots (0-5) long. The reserved window comprises two slots (0,1) and the retransmission window comprises four slots (2, 3, 4, 5). The remaining slots (also referred to as ACL window) comprises six slots (6-11). Again, even slots are assumed to be master slots (slots in which the host may transmit) and odd slots are assumed to be slave slots (slots in which the primary device may transmit).

Regarding the P/S piconet, there can be a master (e.g., primary device) and slave (e.g., secondary device) of the P/S piconet. However, in another aspect, the P/S piconet need not have master or slave. In this perspective, the P/S piconet may be viewed as unilateral communication link, and the transmitter does NOT necessarily seek any acknowledgment of the reception from the receiver. Both devices—the primary and secondary devices—may be viewed as communicating in the backdrop of a front piconet, which in this instance is the host piconet.

In FIGS. 10A-10F, packets of the host piconet traffic are illustrated as vertically hashed boxes, and packets of the P/S piconet traffic are illustrated as horizontally hashed boxes. For further clarification, for each time line, traffic above the middle horizontal line represent host piconet traffic (between host and primary device), and traffic below the horizontal line represent P/S piconet traffic (between primary and secondary devices). There are also "sync timeout" boxes, which are in the figures to indicate that a device (e.g., primary and/or secondary) is listening or sniffing in that slot for possible traffic.

Figure 10A:
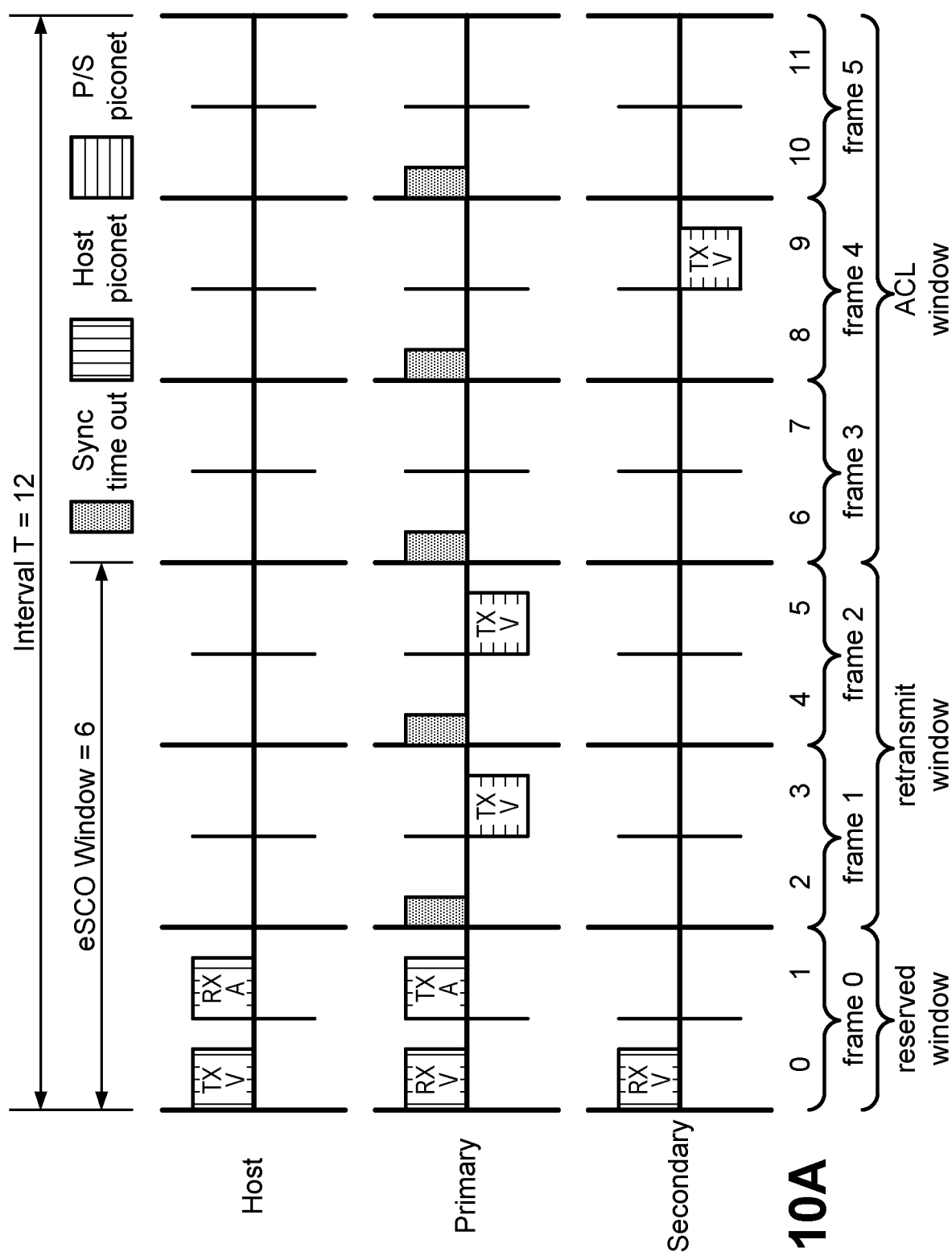
FIGS. 10A-10F illustrate scenarios in which packets are unconditionally relayed.

FIG. 10A illustrates a scenario in which both the primary and second devices receive the eSCO packet (situation (1)) in the master slot of the reserved window, i.e., in slot 0. As seen, the host transmits eSCO packet (indicated with vertically hashed box "TX V") in slot 0 and the primary device receives the eSCO packet (indicated with vertically hashed box "RX V") also in slot 0. The secondary device may also receive the same eSCO packet (also indicated with vertically hashed box "RX V") in slot 0, e.g., by sniffing.

The primary device, upon receiving the eSCO packet in slot 0, transmits an ACK (indicated with vertically hashed box "TX A") in corresponding slave slot (slot 1) of the reserved window, which is received by the host (indicated with vertically hashed box "RX A"). In an aspect, the ACK may simply be an acknowledgment packet (e.g., NULL ACK). Alternatively, the ACK may be a packet that includes the received eSCO packet along with an ACK header. Having received the ACK indicating that the primary device has successfully received the eSCO packet, the host need not retransmit the packet in the retransmission window.

In slot 2 (master slot of retransmission window), the primary device may listen for other data from the host, but does not receive any data or receives data that requires no response or of lesser priority (indicated with "sync timeout" box). For example, the host may transmit NULL packets. Therefore, the primary device can determine that no transmission to the phone is required in the corresponding slave slot (slot 3). Thus, slot 3 is a relay opportunity. As such, the primary device unconditionally relays the received eSCO packet to the slave device in slot 3 (indicated with horizontally hashed box "TX V"). By "unconditional", the primary device relays the eSCO packet without knowing whether or not the secondary device needs the relayed packet. That is, the primary device relays without determining whether or not the secondary device has sniffed the eSCO packet from the host. The primary device unconditionally relays the eSCO packet to the secondary device a first predefined number of times within the interval. In this instance, the first predefined number is assumed to be two. Thus, it is seen that the primary device relays the eSCO packet in slot 5, after determining that host did not transmit data in slot 4.

Before proceeding further, recall that the communication between the primary and secondary devices occurs over the P/S piconet. Thus, when it is indicated that primary device relays the received eSCO packet in slot 3, this should be understood as the primary device relaying the received eSCO packet in a slot of the P/S piconet that corresponds to slot 3 of the host piconet. In general, unless specifically stated otherwise, communication (e.g., relay) between the primary and secondary devices in some slot or slots should be understood as communication over slot or slots of the P/S piconet corresponding to the slot or slots of the host piconet.

While not shown, in an alternative, the primary device may be configured to relay the packets the predefined number of time subsequent to the eSCO window. That is, the primary device may be configured to relay the packet only within the ACL window. For example, the primary device may relay the packets in slots 7 and 9.

The secondary device, having successfully sniffed the eSCO packet in slot 0, can ignore the relay transmissions from the primary device. That is, the secondary device need not schedule listening or sniffing for the remainder of the interval, and thereby save power. However, the secondary device unconditionally relays the received packet to the primary device a second predefined number of times within the interval. That is, the secondary device relays without determining whether or not the primary device has received the eSCO packet from the host. In this instance, the second predefined number is assumed to be 1. For efficiency reasons, the secondary device should transmit the relay when the primary device is likely to listen to the secondary device. This means that the retransmission window can be avoided since, from the secondary device perspective, the primary device is likely to be busy with the host device during the retransmission window. Thus, in an aspect, the secondary device may unconditionally relay the eSCO packet to the primary packet in slave slots subsequent to the eSCO window, e.g., in slot 7 (not shown). In another aspect, there may be a gap of one gap pair after the eSCO window considering that the host and the primary device may be busy exchanging ACL data, e.g., relay may take place in slot 9. The primary device is free to ignore the relay from the secondary device since it has acquired the eSCO packet from the host.

Figure 10B:
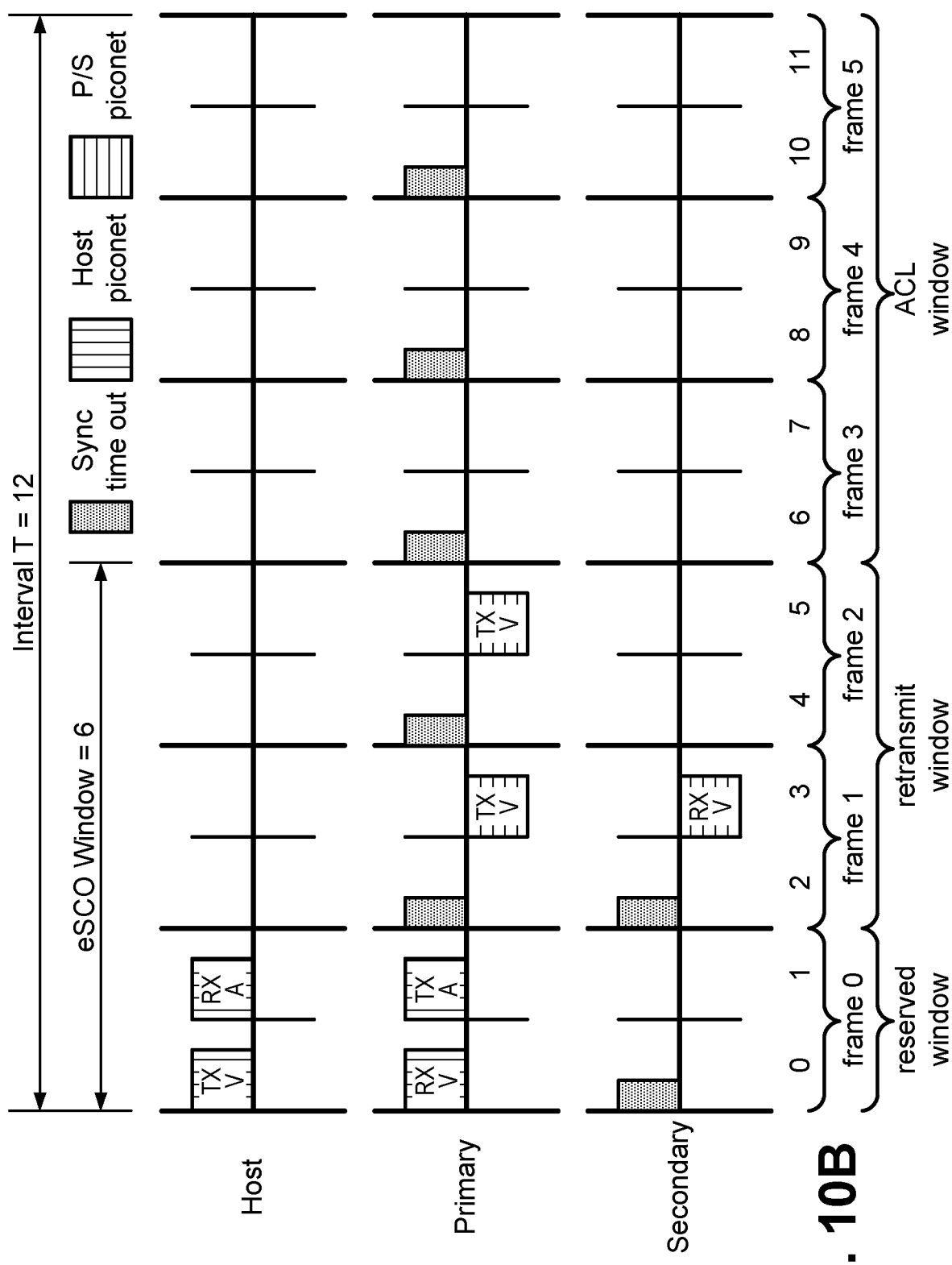

FIG. 10B illustrates a scenario in which the primary device receives the packet from the host in the reserved window, but the secondary device does not (situation (2)). In this instance, the behavior of the host and the primary device can be the same as in FIG. 10A, i.e., the primary device unconditionally relays the packet to the secondary device in slots 3 and 5.

The secondary device does attempt to sniff the eSCO packet in slot 0 (indicated with sync timeout box) but fails. The next opportunity to acquire the voice is slot 2, which is the first master slot of the retransmission window. Thus, the secondary device attempts to sniff for the packet from the host in slot 2 (indicated with sync timeout box). Since the host does not retransmit the packet, this sniffing attempt also fails. The next opportunity to acquire the packet is the slave slot 3 since this represents the first relay opportunity for the primary device. Thus, the secondary listens for the relay in slot 3, and succeeds in receiving the relayed eSCO packet. Upon successfully receiving the relayed packet, the secondary device need not devote anymore resources to receive the packet within the remainder of the interval. The secondary device need not relay the packet primary device since it acquired the packet from the packet device.

Recall that alternatively, the primary device may be configured to relay only within the ACL window (not shown). In this instance, the primary device may relay, and the secondary device may likewise listen for the relay in slave slots subsequent to the eSCO window, e.g., in slots 7, 9.

Figure 10C:
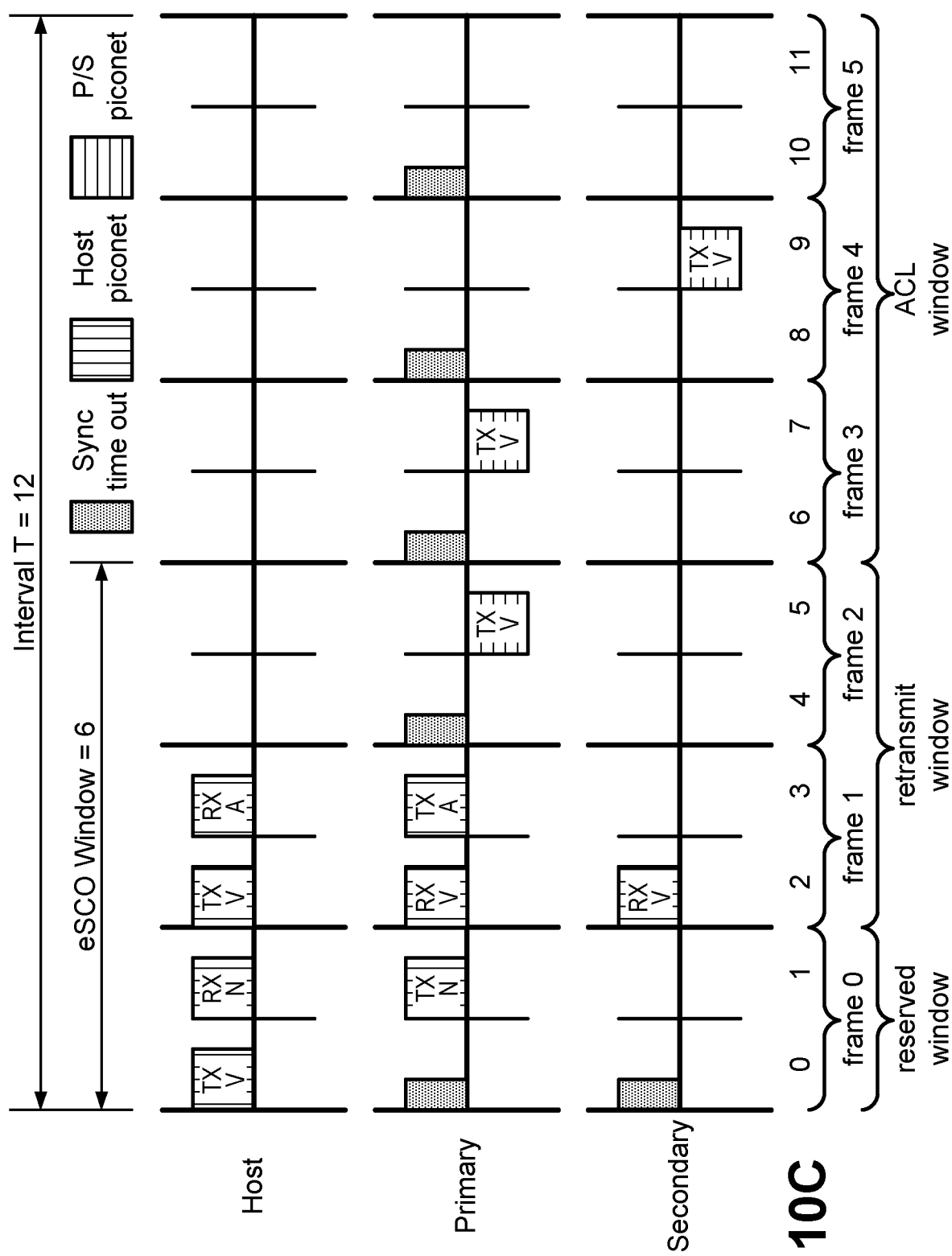

FIG. 10C illustrates a scenario in which both the primary and secondary devices receive the packet from the host in the retransmission window (situation (1)). As seen, the host transmits the eSCO packet in slot 0. Both the primary and the secondary devices are listening in master slot 0 (indicated with the sync timeout boxes) of the reserved window. However, the primary device fails to receive and the secondary device fails to sniff (indicated with sync timeout boxes).

The primary device responds by sending a NACK (indicated with vertically has box "TX N") in corresponding slave slot 1 of the reserved window, which is received by the host (indicated with vertically has box "RX N"). The NACK may be a NULL NACK. Alternatively, the primary may not respond at all, i.e., send nothing to in slot 1 (not shown).

Upon receiving the NACK (or receiving no response) in slot 1, the host retransmits the eSCO packet and the primary device receives the packet in master slot 2 of the retransmission window. The secondary device, upon failing to sniff in master slot 0, successfully sniffs for the eSCO packet in the same master slot 2.

The primary device responds to receiving the packet by sending the ACK in corresponding slave slot 3. Thereafter, the primary device unconditionally relays the packet in slave slots 5 and 7. Alternatively, the primary device may wait and relay packets subsequent to the eSCO window (e.g., in slots 7, 9 of the ACL window) (not shown).

The secondary device, having successfully sniffed the eSCO packet in slot 2 from the host, can ignore the relay transmissions from the primary device. Also, since the packet was sniffed from the host, the secondary device relays the packet to the primary device unconditionally in slot 9, which the primary device is free to ignore.

Figure 10D:
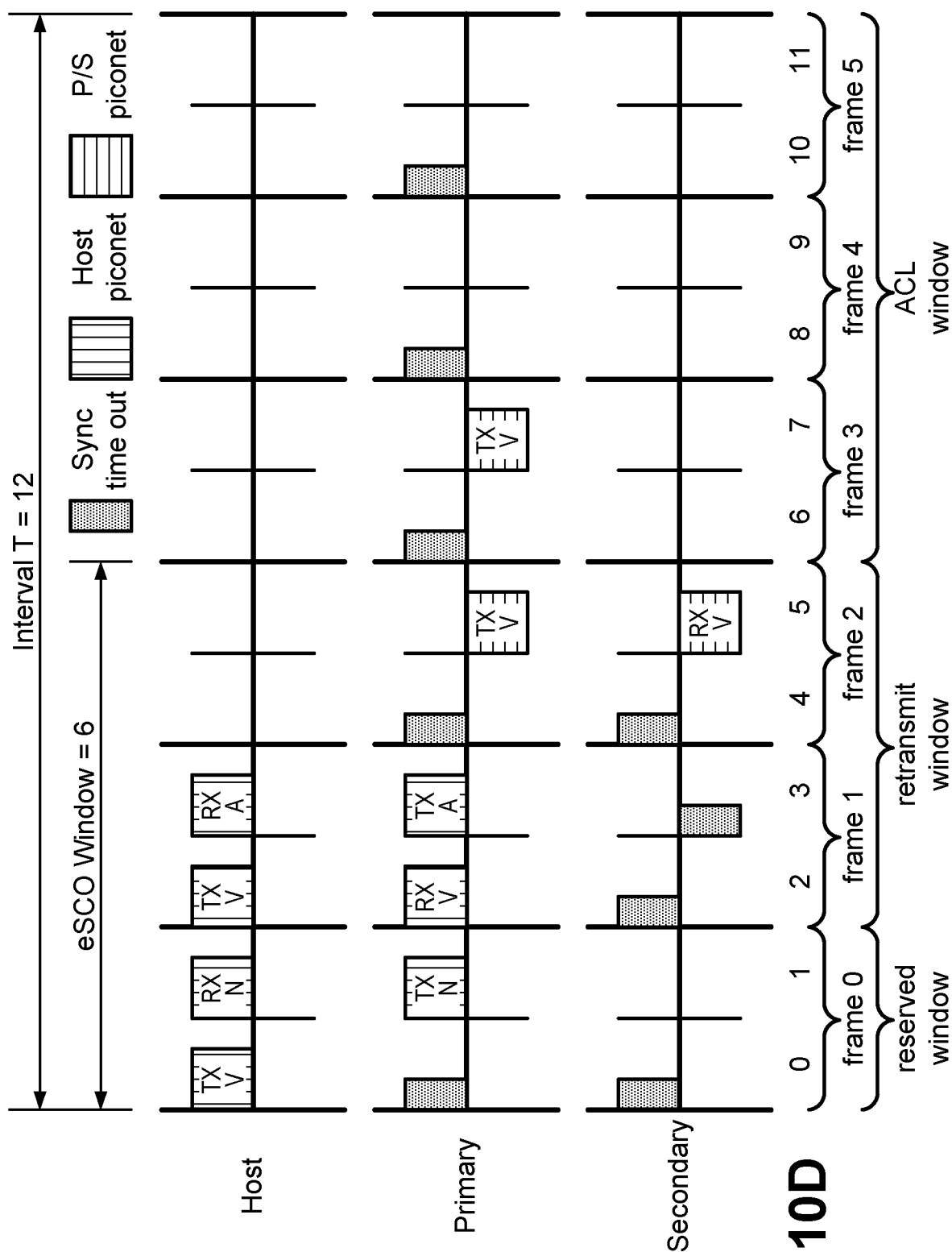

FIG. 10D illustrates a scenario in which the primary device receives the packet from the host in the retransmission window, and the secondary device receives the relay from the primary device (situation (2)). In this instance, the behavior of the host and the primary device may be the same as in FIG. 10C, i.e., the primary device unconditionally relays the packet to the secondary device in slots 5, 7 (or slots 7, 9 if configured to relay only in the ACL window).

The secondary device fails to sniff the packet first transmitted by the host in master slot 0. The secondary device also fails to sniff packet retransmitted by the host in master slot 2. It then listens for the relay in slave slot 3 (denoted with the sync timeout box in slot 3 below the middle horizontal line) since that is the first opportunity to receive the relay from the primary device. The listening fails since there is no relay in slot 3 from the primary device. The next opportunity is the master slot 4 within the retransmission window, but the sniffing fails since the host is no longer retransmitting the eSCO packet (due to receiving the ACK from the primary device in previous slave slot 3). Finally, the secondary device successfully receives the relayed packet in slave slot 5 of the retransmission window. Alternatively, if the primary device waits until after the eSCO window to relay the packet (not shown), the secondary device can schedule listening for the relay in slots 7, 9. Having received the packet from the primary device, the secondary device does not relay the packet back to the primary device.

Figure 10E:
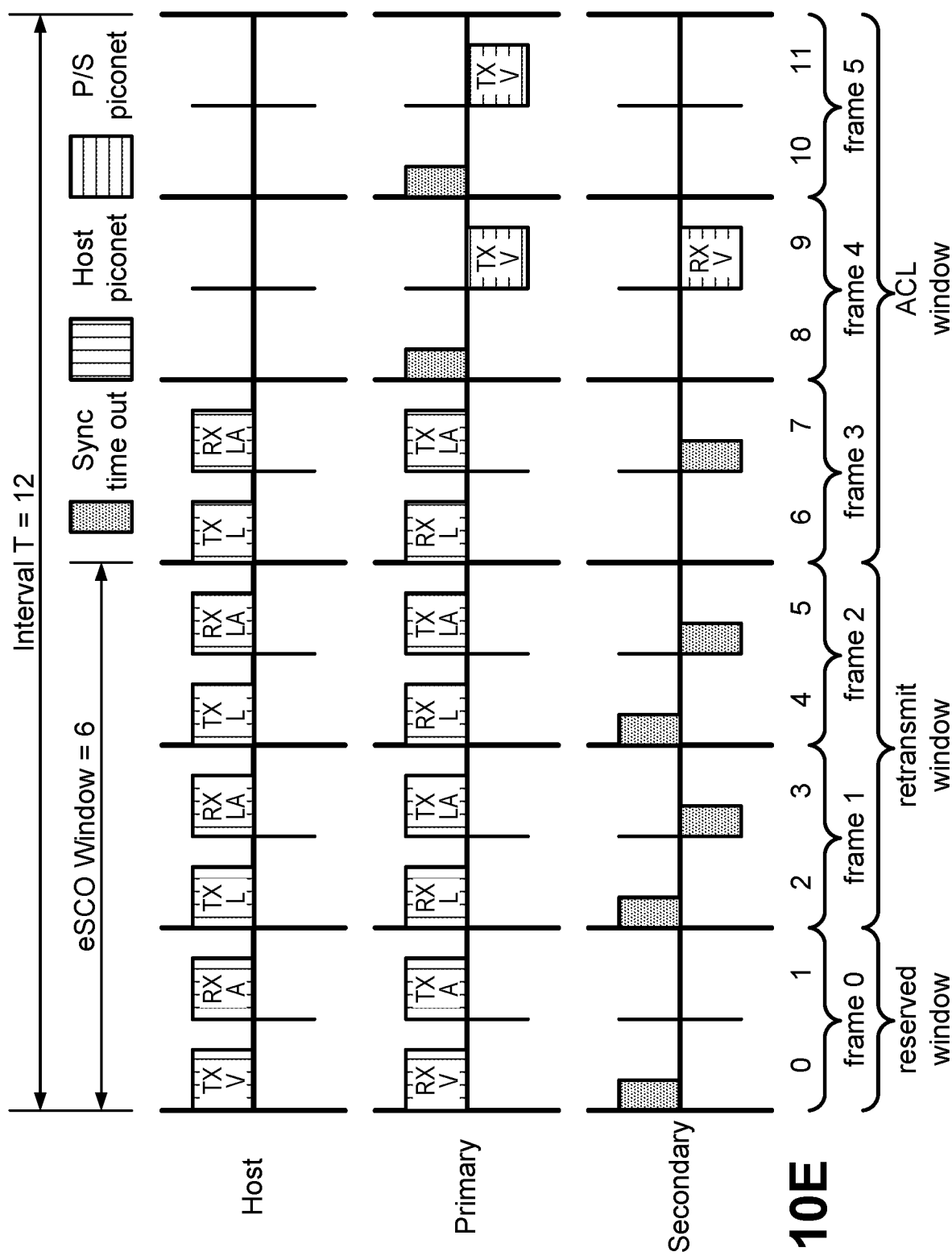

FIG. 10E illustrates a scenario in which the primary device receives the packet from the host in the reserved window, but the secondary device does not (situation (2)). Also, the phone and the primary device exchange other data (e.g., ACL data), and the phone relays the eSCO packet after the ACL data finishes. As seen, the host transmits the eSCO packet and the primary device receives the eSCO packet in slot 0. The primary device sends the ACK and the host receives the ACK in slot 1.

The host thereafter sends other data (ACL packets) in next three master slots 2, 4, 6 (indicated with vertically hashed boxes "TX L"), which are received by the primary device (indicated with vertically hashed boxes "RX L") in the same master slots. The primary devices sends ACKs in slave slots 3, 5, 7 (indicated with vertically hashed boxes "TX LA") and received by the host in the same slave slots (indicated with vertically hashed boxes "RX LA"). The primary device then relays the eSCO packets in slave slots 9, 11 after determining that no data is received from the phone in master slots 8 and 10.

The secondary device listens for the eSCO packet at possible opportunities until it successfully acquires the packet or until all opportunities are exhausted. For example, in FIG. 10, the secondary device sniffs master slots 0, 2, 4 of the eSCO window, slave slots 3, 5 of the retransmission window, and slave slots 7, 9 of the ACL window (i.e., subsequent to the eSCO window). Alternatively, if the primary device is configured to relay only within the ACL window (not shown), the secondary device can forego listening in slots 3, 5 of the retransmission window, and thereby save power. Having received the packet from the primary device, the secondary device does not relay the packet back to the primary device.

Note that the secondary device does not sniff master slots 6, 8, 10 outside of the eSCO window. In an aspect, this is because the host transmits and retransmits the eSCO packet only within the eSCO window. More generally, the host may be configured to transmit/retransmit eSCO data (need not be limited to voice) only during the eSCO window, in which instance, the secondary device need not sniff for the eSCO data outside of the eSCO window. Of course, if a protocol is defined that allows the host to transmit the eSCO data in any master slot, the secondary device can likewise be configured to sniff in the same master slots.

Figure 10F:
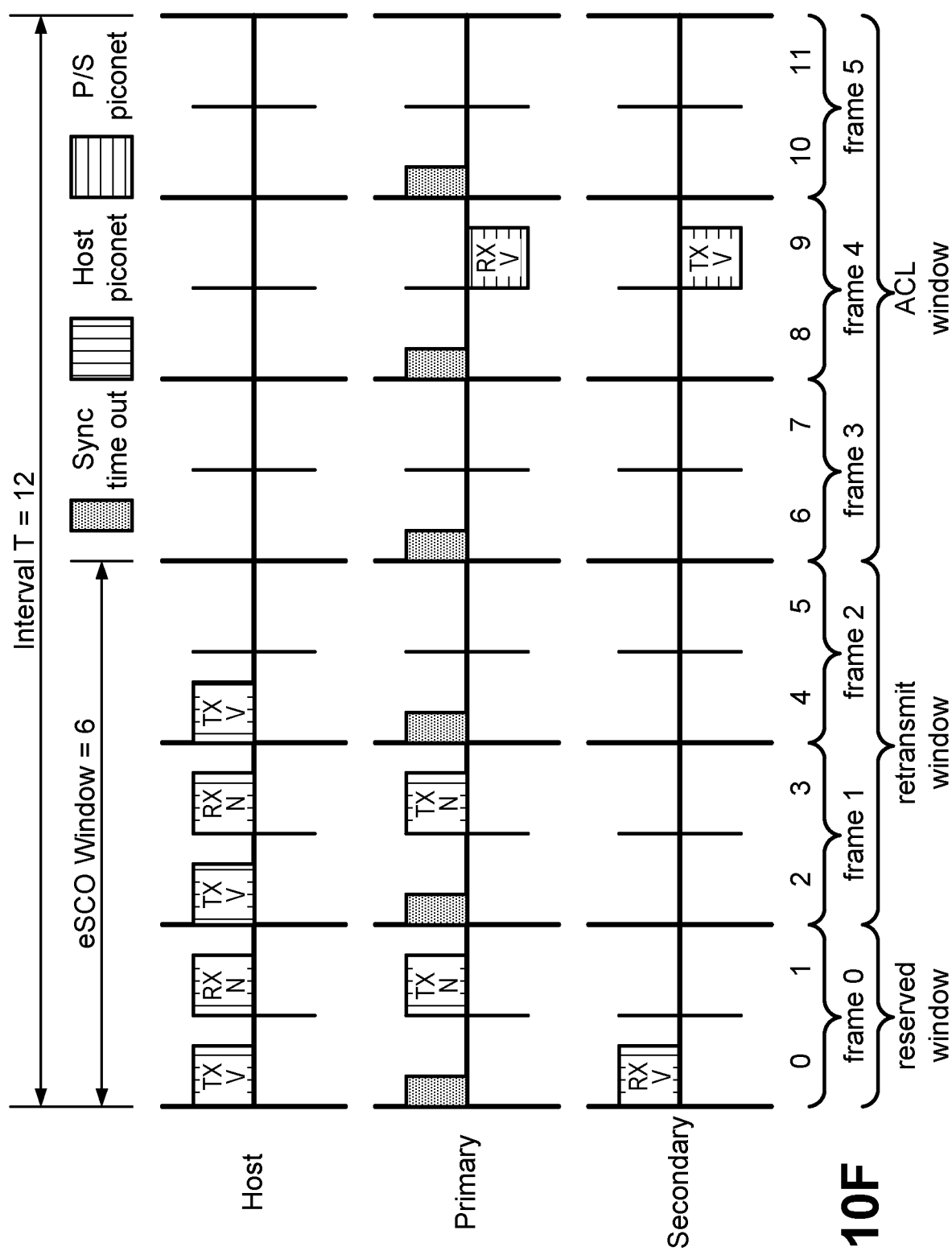

FIG. 10F illustrates a scenario in which the secondary device successfully sniffs the packet from the host in the reserved window, but the primary device does not receive the packet in the eSCO window (situation (3)). In this instance, the behavior of the secondary device can be the same as in FIG. 10A, i.e., the secondary device unconditionally relays the packet to the primary device in slot 9.

The host initially transmits the eSCO packet in master slots 0, and retransmits in master slots 2, 4 due to NACKs from the primary device in slave slots 1, 3. Since the primary device failed to receive the packet from the host during the eSCO window, the primary device listens for the relay in slot 9. Note that there is no need to for the primary device to transmit a reply (ACK/NACK) to the host in the last slot of the eSCO window (slot 5) since the host will no longer retransmit the eSCO packet outside of the eSCO window within the interval.

Some of the rationale regarding the unconditional approaches described above is as follows. Preferably, the primary device should not miss any master slot of the host piconet, e.g., for relay purposes. Also, the ACL data between the host and the primary device should take priority over the relay of eSCO data. In that case, the relay may be performed in a free opportunity when it is determined that the slave slot is free for use by the primary device. Therefore, it may be sensible to unconditionally relay the packet a number of times (e.g., twice), rather than to collects Acks/Nacks to determine whether relay is needed, and then relaying the packets after making the determination. This is because it may be more costly (e.g., resources, time, etc.) to make the determination and then taking remedial action, than to take the remedial action always.

However, this does not mean that the unconditional relay is the only approach. There can be some optimizations that may be made to reduce unnecessary relay transmissions and/or receptions. FIGS. 11A-11G illustrate examples of relay scenarios with optimizations.

Figure 11A:
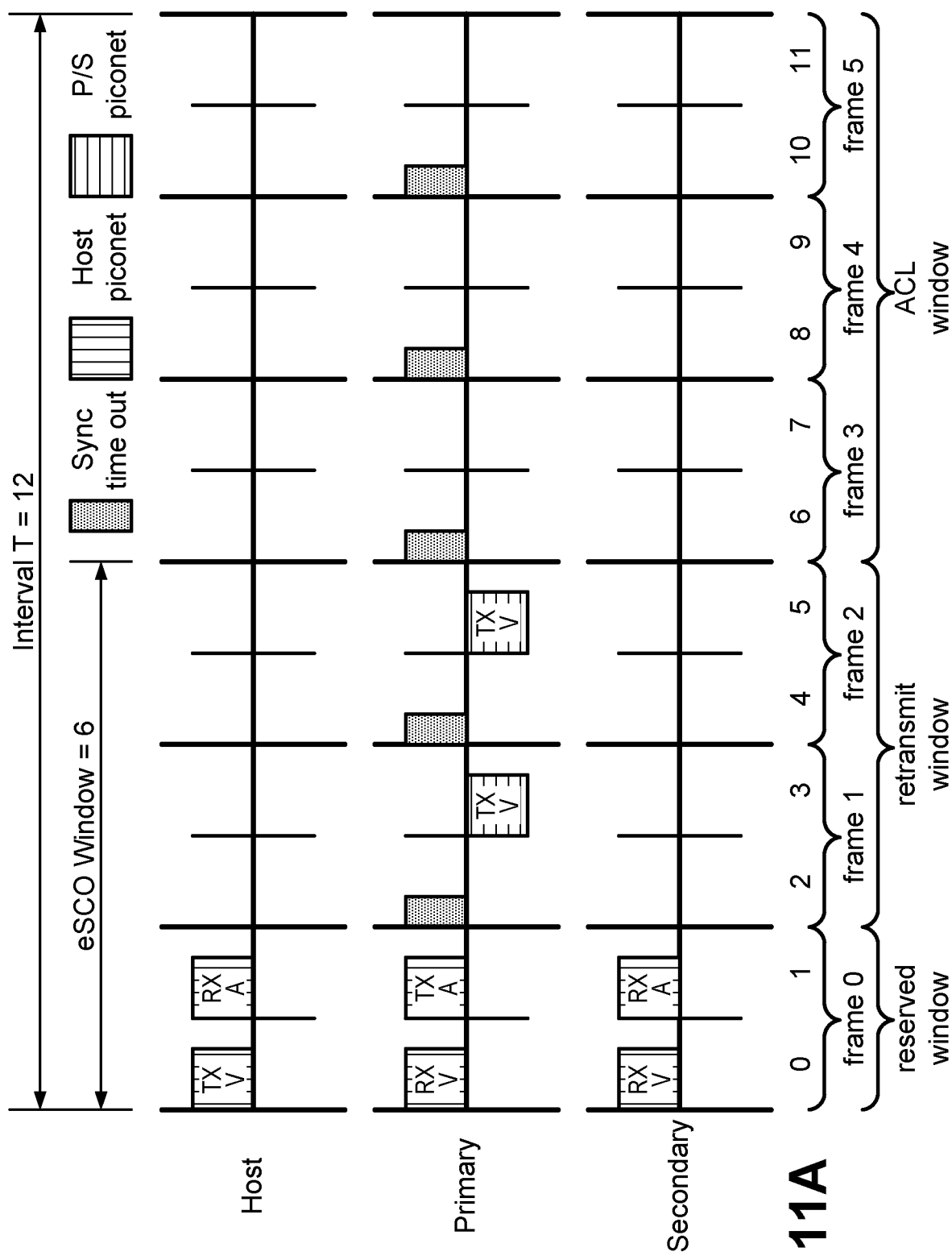
FIGS. 11A-11D illustrate scenarios in which packets are conditionally relayed.

One very simple optimization is shown in FIG. 11A, which illustrates a scenario in which both the primary and second devices receive the eSCO packet (situation (1)) in the master slot of the reserved window. The optimization in this scenario is that the secondary device, in addition to sniffing the master slots of the eSCO window, can also monitor the slave slots of the eSCO window. That is, the secondary device may be configured to monitor the responses of the primary device in slave slots 1, 3, 5. By monitoring the slave slots, the secondary can avoid unnecessary relay transmission to the primary device.

In this instance, the behavior of the host and the primary device can be the same as in FIG. 10A. As seen, the primary and the secondary device successfully acquire the eSCO packet from the host in reserved master slot 0. However, the secondary device behaves differently. In particular, the secondary device monitors the primary device's response in the slave slot 1 of the reserved window (indicated with vertically hashed box "RX A"). Based on the response, the secondary device recognizes that the primary device also has the eSCO packet. Therefore, the secondary need not relay the packet to the primary device (there is no packet transmitted in slot 9 of the secondary device time line). While not shown, note that saving unnecessary relay transmissions from the secondary device may also apply to the scenario of FIG. 10A.

Alternatively or in addition thereto, the secondary device may sniff the master slots of the retransmission window (when the retransmission window size is greater than zero) to determine whether the primary device has received the eSCO packet from the host. Recall that when the primary device successfully receives the eSCO packet in the master slot of the reserved window, the primary responds with an ACK in the slave slot of the reserved window. This means that the host need not retransmit the eSCO packet in any of the master slots of the retransmission window. Thus, if the secondary device sniffs a packet other than the eSCO packet in the master slots of the retransmission window, the secondary device may determine that the primary device did receive eSCO packet from the host. For example, when the secondary device sniffs a NULL packet in one or more master slots of the retransmission window, the secondary device may determine that the primary device did receive eSCO packet from the host.

The following should be noted. Both techniques—monitoring of the primary device responses is slave slots of the eSCO window, and sniffing the master slots transmission window—can be used to definitively determine that the primary device has the eSCO packet.

However, the reverse is not necessarily true. That is, the techniques may not definitively determine that the primary device does not have the eSCO packet. Note that the last opportunity within the interval for the primary device to receive the eSCO packet from the host is the last master slot of the eSCO window. If non-zero retransmission window is assumed, then the last opportunity is the last master slot of the retransmission window. Since this is the last time the host is expected transmit the eSCO packet within the window, the primary device need not respond to the host in the last slave slot of the retransmission window. Regarding the technique of monitoring the responses of the primary device, this implies that lack of detecting ACK responses from the primary device to the host within the retransmission window is not determinative of whether the primary device has or does not have the eSCO packet.

Regarding the technique of sniffing master slots of the retransmission window, if the eSCO packet is sniffed in the last master slot, this only informs the secondary device that the primary device has not yet successfully received the eSCO packet. Unfortunately, it does not tell the secondary device on whether the primary device successfully receives the eSCO packet provided in the last master slot.

Figure 11B:
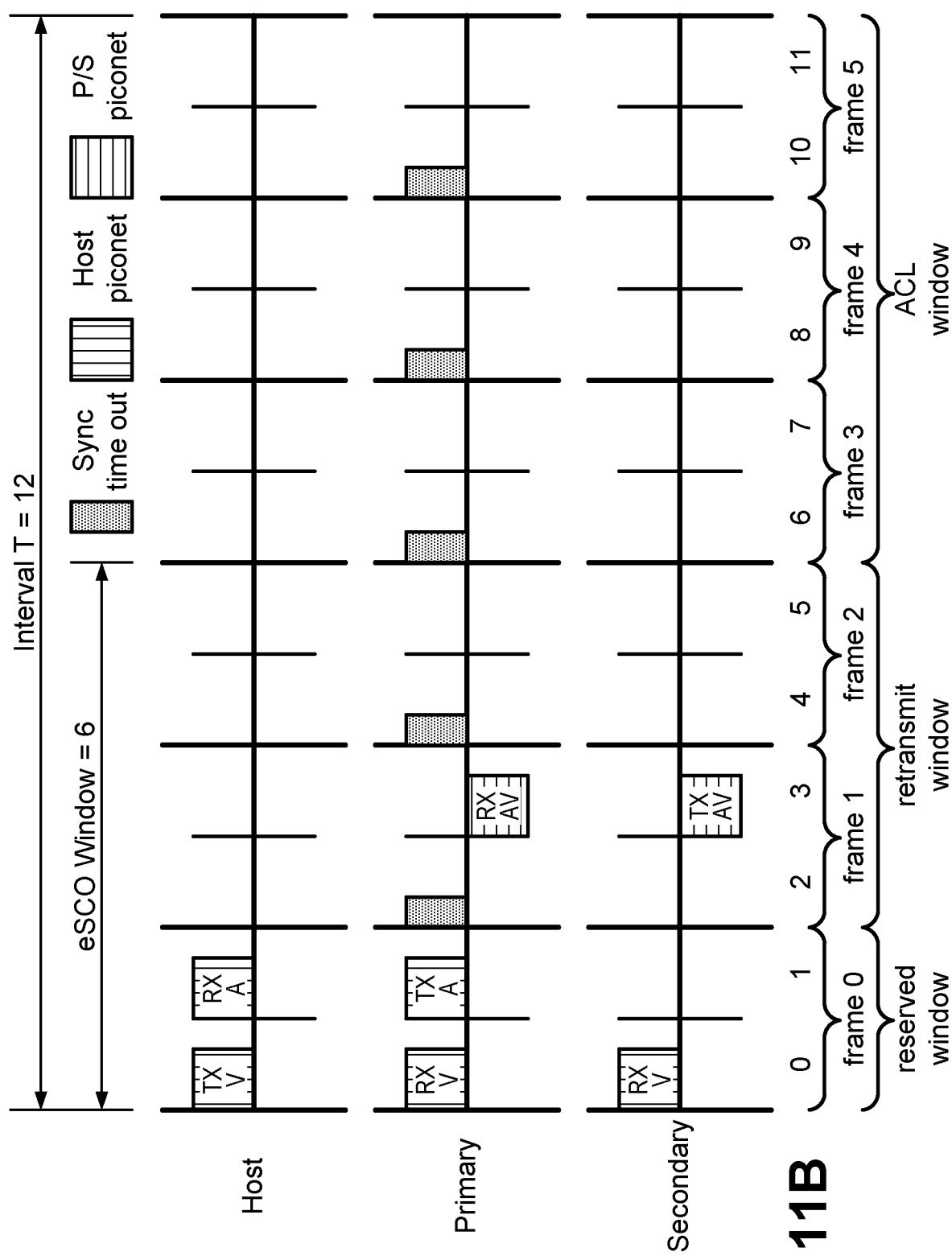

FIG. 11B illustrates an optimization scenario in which both the primary and second devices receive the eSCO packet (situation (1)) in the master slot of the reserved window. The optimization implemented in FIG. 11B saves unnecessary relays from the primary device. Relays from the primary device are unnecessary if the secondary device acquires the packet from the host. This, it is proposed that the secondary device inform the primary device that it has successfully sniffed the packet from the host. As seen, the host transmits eSCO packet in slot 0 and the primary device receives the eSCO packet also in slot 0.

The secondary device also receives the same eSCO packet in slot 0, e.g., by sniffing. This time, having successfully sniffed the packet from the host, the secondary device notifies the primary device (indicated with a horizontally hashed box "TX AV") in slot 3, and the primary device receives the notification in the same slot (indicated with a horizontally hashed box "RX AV"). The notification may be a "have packet" message.

In an aspect, the Bluetooth basic rate/enhanced data rate (BD/EDR) protocol NULL-ACK may be used as the "have packet" message. If the primary device is free in slot 3, it may listen for the notification. Note that slot 3 is the first available slave slot within the retransmit window after the secondary device receives the packet from the host. Alternatively or in addition thereto, the secondary device may notify the primary device in other slave slots of the interval. The primary device, having received the "have packet" message, need not relay the packet.

While not shown, the secondary device may unconditionally relay the packet to the primary device since it may not know whether or not the primary device has acquired the packet from the host during the eSCO window. However, if FIG. 11B is combined with FIG. 11A (secondary device monitoring primary device response in slave slots of the eSCO window), the secondary device may also avoid unnecessary relay transmissions.

Figure 11C:
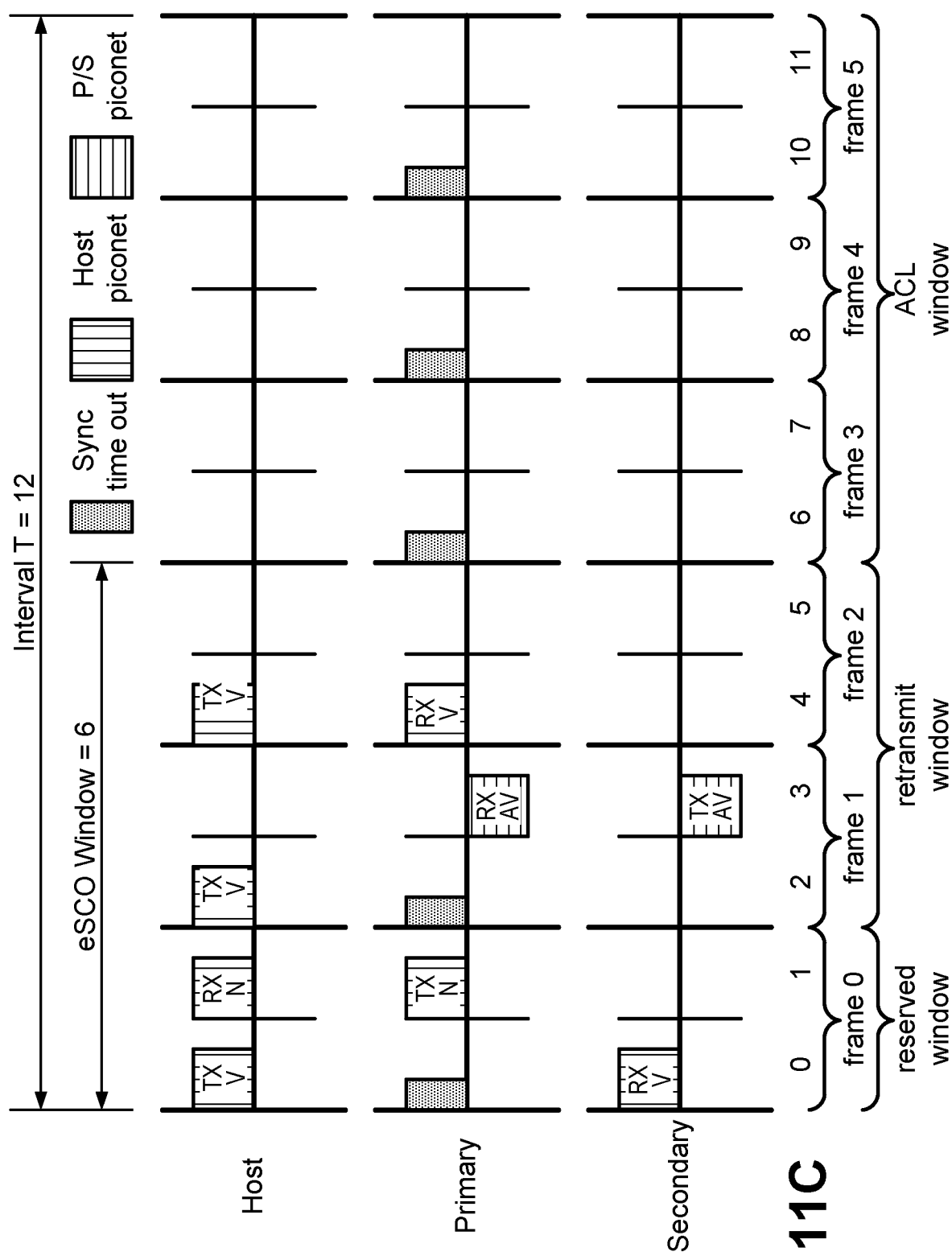

FIG. 11C illustrates a scenario in which both the primary and second devices receive the eSCO packet from the host during the eSCO window (situation (1)), but at different times. In particular, the secondary device successfully sniffs the packet in master slot 0 of the reserved window. But the primary device receives the eSCO packet later in master slot 4 of the retransmission window. The host may be configured to retransmit the eSCO packet if it receives NACK or receives no response from the primary device. Again, note that the primary device need not respond to the host in slot 5 of the eSCO window.

FIGS. 11B and 11C may be grouped together in that the same optimization scheme is utilized. That is, the primary device listens for a "have packet" message from the secondary device in the first slave slot of the retransmission window (slot 3). Having received the "have packet" message from the secondary device, the primary device again need not relay the packet, i.e., can avoid unnecessary relay transmissions to the secondary device. The secondary device may unconditionally relay the packet, or may avoid unnecessary relay transmissions to the primary device if combined with FIG. 11A for example.

While not shown, for both FIGS. 11B and 11C, the primary device may be configured to relay the packet to the secondary device if the primary device does not receive any "have packet" message from the secondary device in any one or more slave slots of the eSCO window.

Figure 11D:
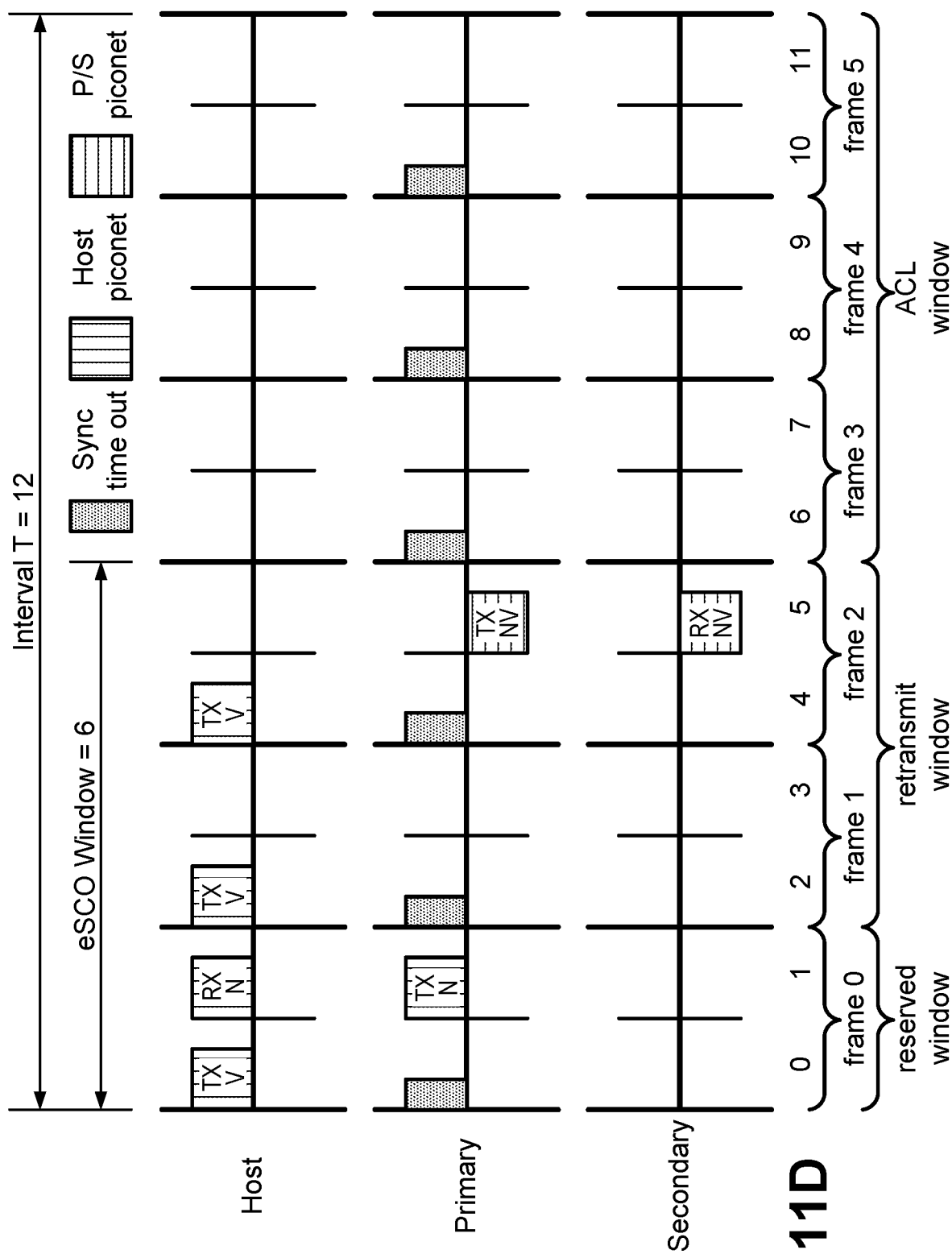

FIG. 11D illustrates a scenario in which both the primary and secondary devices fail to collect the eSCO packet from the host during the eSCO window (situation (4)). In this scenario, under the unconditional relay approach, the secondary device will unnecessary listen for relay from the primary device that will not come. In this instance, it is proposed for the primary device to notify the secondary device that it did not receive the packet from the host. In particular, once the primary device has exhausted all possibilities to receive the packet from the host (e.g., all master slots of the eSCO window), the primary device may send "have no packet" message to the secondary device in the next available slave slot. In an aspect, the Bluetooth BD/EDR protocol NULL-NACK may be used as the "have no packet" message.

In FIG. 11D, the primary device fails to receive the eSCO packet from the host in any of the master slots 0, 2, 4 within the eSCO window. Thus, at the first free opportunity (slave slot 5 in this instance), the primary device informs the secondary device that it does not have the eSCO packet from the host (indicated with vertical hashed box "TX NV") and is received by the secondary device (indicated with vertical hashed box "TX NV"). The primary device does not relay since it has nothing to relay, and the secondary device does not listen since it knows that the primary device does not have the eSCO packet.

While not shown, optimizations of FIGS. 11C and 11D may be combined. For example, in situation (1) (both primary and second acquire eSCO packet from host), no relay need to take place. The primary device does not need to relay since it knows that the secondary has the packet (receives "have packet" in slot 3). Also, the secondary device may not need to relay if it can determine that the primary device has the packet, e.g., by monitoring the primary device's response to the host device and/or by monitoring the host device's transmissions during the retransmission window as indicated above with regard to FIG. 11A.

In situation (2), (primary receives eSCO packet, secondary does not), the primary device can relay since it can assume that the secondary device does not have the packet (does not receive "have packet" in slot 3). Also, the secondary device can schedule listening for the relay since it can assume that the primary device has the packet (does not receive "have no packet" in slot 5).

In situation (3), (primary does not receive eSCO packet, secondary does), the primary device can schedule listening for the relay. Also, the secondary device can relay since it knows that the primary device does not have the packet (receive "have no packet" in slot 5).

Finally, in situation (4) (neither primary nor secondary receives eSCO packet), neither will relay. The secondary device need not listen since it knows that the primary device does not have the packet (receive "have no packet" in slot 5).

When FIGS. 11C and 11D are combined, the relays in situations (3), (4) may take place during slave slots of the ACL window, i.e., in free opportunities subsequent to the eSCO window.

Figure 12:
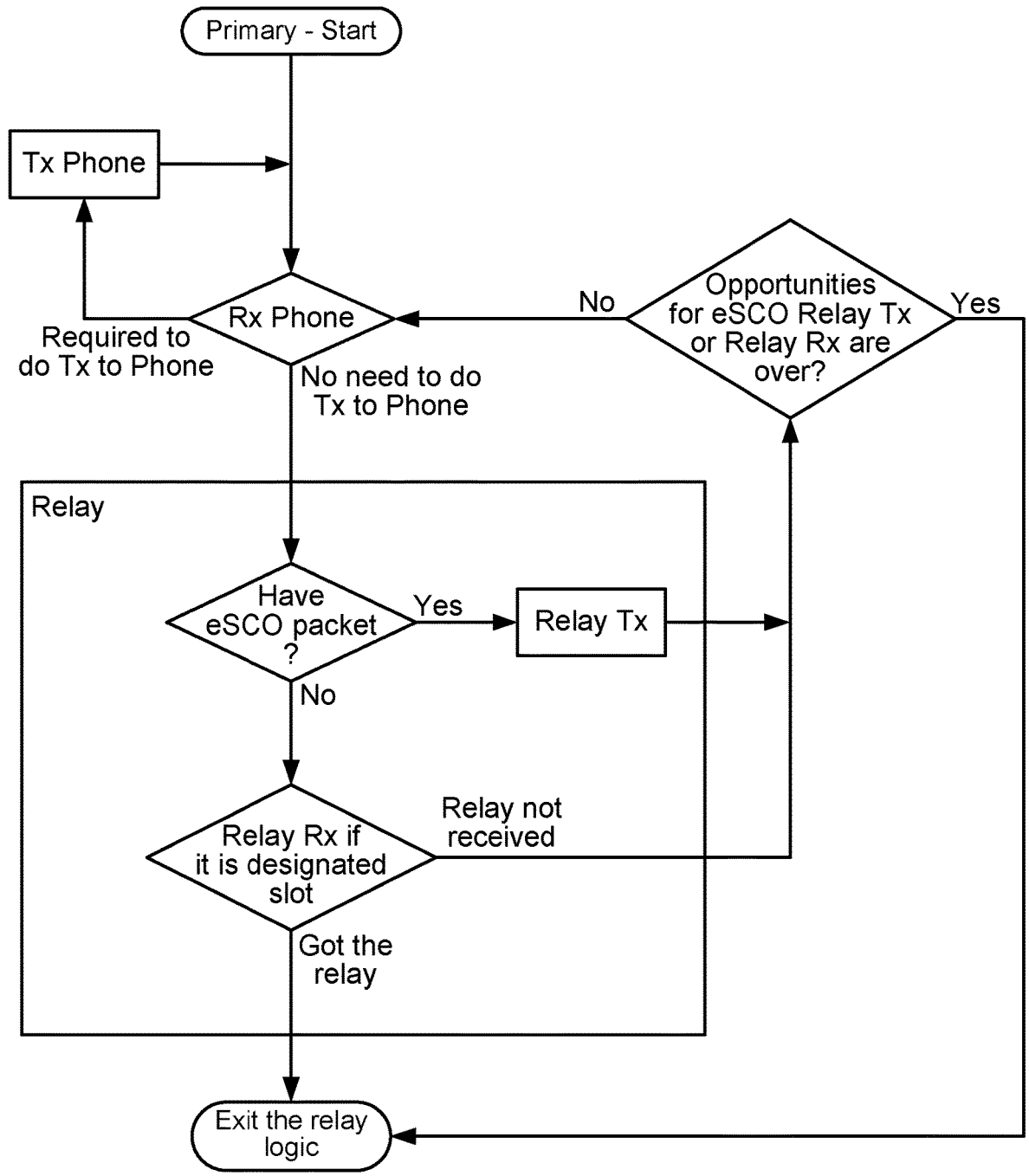
FIG. 12 generally illustrates a flow chart of an example method performed by a primary device for relaying packets between the primary and secondary devices.

FIG. 12 illustrates a method performed by the primary device (e.g., primary bud) for unconditionally relaying packets in an interval. The "Rx Phone" diamond and "Tx Phone" block reflect communications that may occur during the eSCO window. That is, the primary bud may receive the eSCO packet ("Rx Phone") from the phone in reserved slot 0 or in retransmit slots 2, 4, etc. Also, the primary bud may send ACK/NACK ("Tx Phone") in reserved slot 1 or in retransmit slots 3, 5, etc.

The primary bud may then enter the "Relay" block. In this block, if the primary bud does have the packet, i.e., successfully received the packet during the eSCO window, then it may unconditionally relay the packet ("Relay Tx" block) to the secondary bud during a relay opportunity, e.g., during one or more slave slots of the host piconet as indicated above. If there are further opportunities to relay the packet during the interval, then the primary bud may enter the Relay block again. If there are no further opportunities, the method may end for the primary bud for the interval.

On the other hand, if the primary bud enters the Relay block without having successfully received the packet from the phone, then the primary bud may listen for the relay from the second bud in designated slots. For example, the primary bud may listen in one or more slave slots of the host piconet. Recall this relay may be received using earbud piconet access code and on frequency determine using earbud BD ADDR and the phone piconet clock. In an aspect, the primary bud may listen to a slave slot after the eSCO window+one slot pair.

If the relay is received from the secondary bud, then the method may end for the primary bud for the interval. Otherwise, it may be checked whether there are further opportunities to receive the relay from the second bud. If so, then the primary bud may enter the Relay Block again. If there are no further opportunities, the method may end for the primary bud for the interval.

Figure 13:
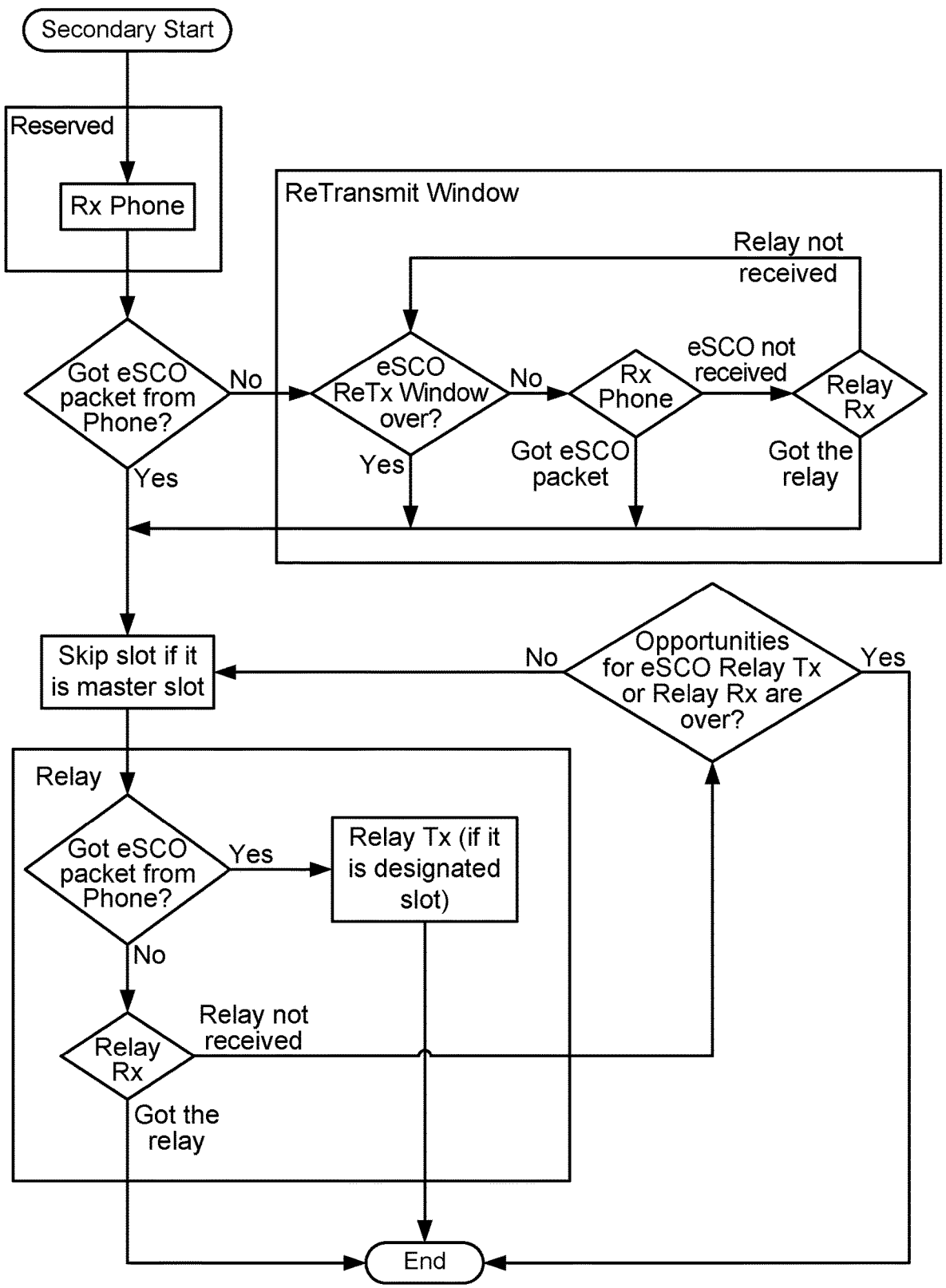
FIG. 13 generally illustrates a flow chart of an example method performed by a secondary device for relaying packets between the primary and secondary devices.

FIG. 13 illustrates a method performed by the secondary device (e.g., secondary bud) for unconditionally relaying packets in an interval. In the "Reserved" block, secondary bud may sniff the reserved slot 0 for the packet from the phone. If the reserved slot 0 has not been successfully sniffed, the secondary bud may enter the "Retransmit Window" block in which it may sniff the packet in the master slots of the retransmission slots (e.g., slots 2, 4, etc.).

After the eSCO window, the secondary bud need not listen in or sniff the master slots of the host piconet. Subsequent to the eSCO window, the secondary bud may then enter the "Relay" block. In this block, if the secondary bud does have the packet, i.e., successfully sniffed the packet during the eSCO window, then it may unconditionally relay the packet ("Relay Tx" block) to the primary bud during a relay opportunity, e.g., during one or more slave slots of the host piconet. For example, the secondary bud may relay the packet in a slave slot after the eSCO window+one slot pair. If there are further opportunities to relay the packet during the interval, then the secondary bud may enter the Relay block again. If there are no further opportunities, the method may end for the secondary bud for the interval.

On the other hand, if the secondary bud enters the Relay block without having successfully sniffed the packet, then the secondary bud may listen for the relay from the primary bud in designated slots. For example, the secondary bud may listen in one or more slave slot(s) of the host piconet. If the relay is received from the primary bud, then the method may end for the secondary bud for the interval. Otherwise, it may be checked whether there are further opportunities to receive the relay from the primary bud. If so, then the secondary bud may enter the Relay block again. If there are no further opportunities, the method may end for the secondary bud for the interval.

It is also mentioned that alternative to unconditional relays, relay may be optimized so that relay occurs only when necessary. Depending on the situation, the optimization may take different forms. In this regard, possible optimizations for each of the four situations (1)-(4) will be described. It should be noted that described optimizations are examples and are not meant to be exhaustive.

In situation (1), both the primary bud and the secondary bud have successfully received and sniffed the packet from the phone in slot 0, which is the reserved master slot. Therefore, there is no need for relay to occur between the primary and the secondary buds. However, in order to prevent unnecessary relays from occurring, the primary bud should know that the secondary bud has the packet, and vice versa. In other words, each of the primary and secondary buds should be aware of the other's circumstance.

In one aspect, the secondary bud may recognize circumstance of the primary bud by sniffing or otherwise monitoring slot 1, which is the reserved slave slot. Recall that if the primary bud successfully receives the packet in slot 0, it will respond with an ACK to the phone in slot 1. If the secondary recognizes that the primary bud has responded with an ACK in slot 1, then the secondary bud would know that the primary bud has successfully received the packet. Therefore, the secondary bud need not relay the sniffed packet.

However, the secondary bud may explicitly inform the primary bud that it has successfully sniffed the packet from the phone. The secondary bud may inform the primary bud in a slave slot subsequent to the reserved slots within the interval. In particular, the secondary bud may transmit a "have packet" message (e.g., NULL ACK) to the primary bud in slot 3 (i.e., in fourth slot) of the eSCO window if it successfully sniffs the packet in slot 0. If the primary bud is free in that slot, it may listen for the message. Of course, alternatively or in addition thereto, the secondary bud may transmit the have packet message in other slave slots of the interval. The primary bud, having received the "have packet" message, need not relay the packet. Again, the message may be sent using the earbud piconet access code and on frequency determine using earbud BD ADDR and the phone piconet clock.

In situation (2), the primary bud has successfully received the packet in slot 0, but the secondary bud has not successfully sniffed the same packet. Again, by sniffing or monitoring slot 1, the secondary bud will be aware that the primary bud has the packet. In this instance, the secondary bud may inform the primary bud that it needs the relay. This "need relay" message may also be transmitted in the fourth slot and/or other slave slots of the host piconet. Once made aware, the primary bud may relay the packet, e.g., in one or more slave slots of the host piconet.

In situation (3), the secondary bud has successfully sniffed the packet in slot 0, but the primary bud has not successfully received the same packet. Again, by sniffing or monitoring slot 1, the secondary bud will be aware that the primary bud does not have the packet. In this instance, the secondary bud may inform the primary bud that it has the packet. This "have packet" message may also be transmitted in the fourth slot. Thereafter, the secondary bud may relay the packet in slave slots of the host piconet, and the primary bud may schedule to listen.

In situation (4), neither the primary bud nor the secondary but has successfully received or sniffed the packet in slot 0. In this circumstance, the secondary bud may unnecessarily keep listening for the relay from the primary bud. To address this issue, whenever the primary bud does not have the packet, it may announce in the fourth slot that it does not have the packet. Being made aware, the secondary bud may then refrain from listening for relays.

Note that primary bud not having the packet also applies to situation (3). This means that in the fourth slot, it can happen that the primary bud announces that it does not have the packet and the secondary bud announces that it does have the packet. However, this does not create any problem.

Figure 14:
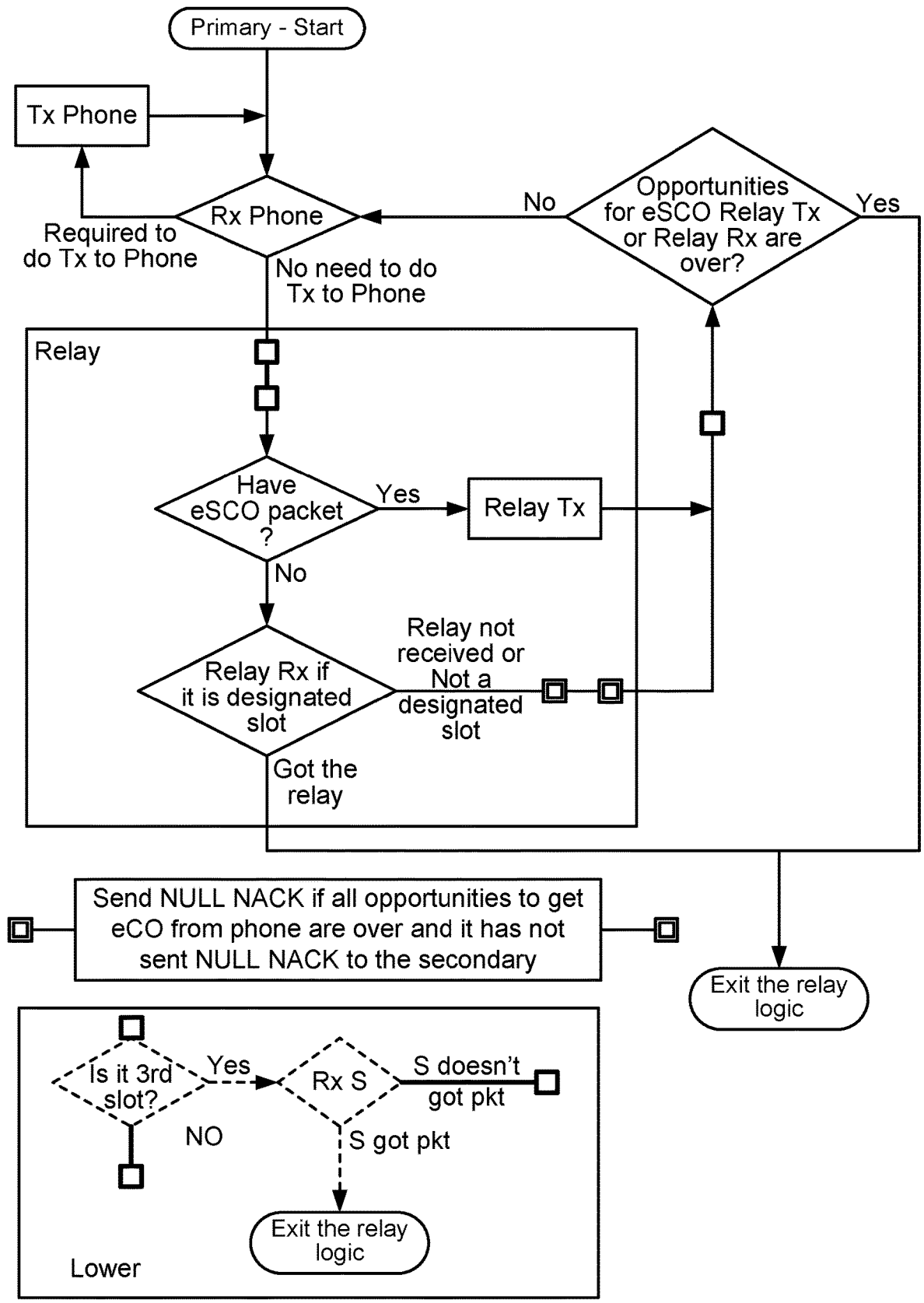
FIG. 14 generally illustrates a flow chart of another example method performed by a primary device for relaying packets between the primary and secondary devices.

FIG. 14 illustrates a method performed by the primary bud to optimize the relaying of packets within an interval by conditionally relaying the packets. Similar to FIG. 12, the primary bud may receive the eSCO packet ("Rx Phone") from the phone in reserved slot 0 or in retransmit slots 2, 4, etc. Also, the primary bud may send ACK/NACK ("Tx Phone") in reserved slot 1 or in retransmit slots 3, 5, etc.

The primary bud may then enter the "Relay" block, which may be optimized according to the "Lower" block. If the slot is the third slot indicating that the primary bud has successfully received the packet in slot 0, it may be determined whether the secondary bud has successfully sniffed the packet, e.g., by determining whether the "have packet" message has been received in the third slot. If so (situation (1)), the method may end for the primary bud for the interval.

If the message indicates that the secondary bud does not have the packet (situation (2)), then it may relay the packet ("Relay Tx" block) to the secondary bud during one or more relay opportunities, e.g., during one or more slave slots of the host piconet. If there are further opportunities to relay the packet during the interval, then the primary bud may enter the Relay Block again. If there are no further opportunities, the method may end for the primary bud for the interval.

On the other hand, if the primary bud enters the Relay block without having successfully received the packet from the phone, then the primary bud may listen for the relay from the second bud in designated slots such as the slave slots of the host piconet. If the relay is received from the secondary bud, then the method may end for the primary bud for the interval. Otherwise, it may be checked whether there are further opportunities to receive the relay from the second bud. If so, then the primary bud may enter the Relay block again. If there are no further opportunities, the method may end for the primary bud for the interval. Alternatively in addition thereto, the primary bud may send a NULL NACK to the secondary but to indicate that it did not receive the packet from the host during the eSCO window.

In an aspect, the primary bud may listen for the relay when the secondary bud indicates in the fourth slot that it has the packet (situation (3)). Otherwise (situation (4)), the primary bud may refrain from listening for the relay from the secondary bud.

Figure 15:
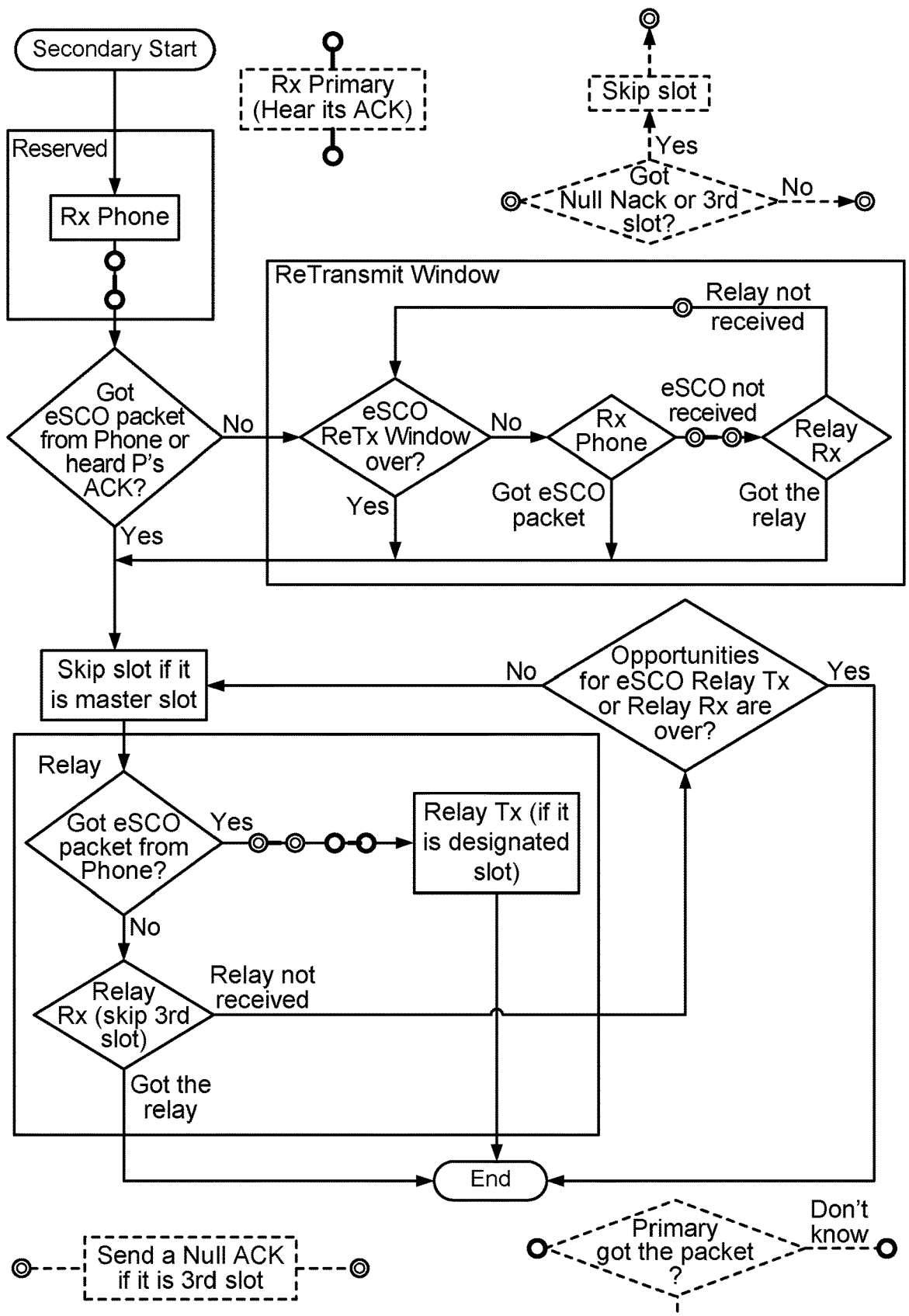
FIG. 15 generally illustrates a flow chart of another example method performed by a secondary device for relaying packets between the primary and secondary devices.

FIG. 15 illustrates a method performed by the secondary bud to optimize the relaying of packets within an interval by conditionally relaying the packets. In FIG. 15, the "Retransmit Window" and the "Relay" blocks of FIG. 13 may be optimized as shown in FIG. 15. In the "Reserved" block, secondary bud may sniff the reserved slot 0 for the packet from the phone. In addition to sniffing slot 0, the secondary bud may also sniff the reserved slot 1 to hear the ACK/NACK from the primary bud to the phone. Note that if the sniffing indicates that the phone transmitted a NULL/POLL, then the method may end for the secondary bud for the interval. Otherwise, the method may proceed.

Recall that if the secondary bud does not hear any ACK in slot 1, this indicates that the primary bud did not successfully receive the packet in slot 0. Therefore, the phone will retransmit the packet in the retransmission slots. If the reserved slot 0 has not been successfully sniffed, then NACK (or more broadly, lack of ACK) in slot 1 means that the secondary bud has additional opportunities to sniff the packet. When this occurs (no successful sniffing of slot 0 and no ACK in slot 1), the secondary bud may enter the "Retransmit Window" block in which it may sniff the packet in the master slots of the retransmission slots (e.g., slots 2, 4, etc.).

But if the secondary bud successfully sniffed the packet (situation (1) or (3)) or it has heard ACK in slot 1 (situation (1) or (2)), the secondary bud may then enter the Relay Block. Again, the secondary bud need not listen to the master slots in the interval after entering the Relay Block. In this block, if the secondary bud does have the packet, i.e., successfully sniffed the packet during the eSCO window, then it may send the "have packet" message (e.g., NULL ACK) if it is the fourth slot. If the primary also has the packet (situation (1)), the method may end for the secondary bud for the interval.

If it is not known whether the primary also has the packet (situation (3)), the secondary bud may relay the packet ("Relay Tx" block) to the primary bud during a relay opportunity, e.g., during one or more slave slots of the host piconet. If there are further opportunities to relay the packet during the interval, then the secondary bud may enter the Relay Block again. If there are no further opportunities, the method may end for the secondary bud for the interval.

On the other hand, if the secondary bud enters the Relay Block without having successfully sniffed the packet, but knows that the primary bud has the packet (situation (2)), then the secondary bud may send the "need relay" message in the fourth slot and listen for the relay from the primary bud in other designated slots (e.g., one or more slave slot(s) of the host piconet). If the relay is received from the primary bud, then the method may end for the secondary bud for the interval. Otherwise, it may be checked whether there are further opportunities to receive the relay from the primary bud. If so, then the secondary bud may enter the Relay Block again. If there are no further opportunities, the method may end for the secondary bud for the interval.

Finally, if the secondary bud enters the Relay Block without having successfully sniffed the packet, and also knows that the primary does not have the packet (situation (4)), the method may end for the secondary bud for the interval.

In FIGS. 12-15, the communication between the primary and secondary buds took place on the host piconet, but on earbud piconet access code and on frequency based on earbud BD ADDR. But in an alternative, the communication between the primary and secondary buds may take place on a different piconet, such as the P/S piconet. The secondary bud may still sniff the phone piconet, but the P/S piconet may be used to relay the packets and for other communications between the primary and secondary buds.

In an aspect, the P/S piconet may be used for unconditional relaying of packets. In this aspect, the relay on the P/S piconet should take placed within some short threshold time of receiving/sniffing the packet on the phone piconet so that user's experience is not compromised. This short threshold may also apply to FIGS. 12-15.

In another aspect, the P/S piconet may be used to conditionally relay the packets. The short threshold may also apply in this situation. For efficiency, the host and P/S piconets may be structured that the primary bud transmission slots of the host piconet are aligned with the primary bud transmission slots of the P/S piconet. For example, assume that the primary bud is the slave of the host piconet and is the master of the P/S piconet. Then it would be desirable to align the slave slots (e.g., slots 1, 3, 5, etc.) of the host piconet with the master slots (e.g., slots 0, 2, 4, etc.) of the P/S piconet. In this way, the primary bud may transmit to the phone or to the secondary bud without having to make alignment adjustments. While a perfect alignment may not be required, there should be some level of overlap.

An attachment to this document describes details of various aspects related to shadowing of Bluetooth voice links. In the attachment and above, individual slots are used as examples. However, the described aspects may be expanded to incorporate slot groups. For example, reserved slots may be expanded to reserved slot groups, retransmission slots may be expanded to retransmission slot groups, slave slots may be expanded to slave slot groups, master slots may be expanded to master slot groups, and so on. Also, in the above-examples, it was assumed that the phone (primary bud) was the master (slave) of the host piconet. But it should be noted that described aspects can be readily adapted to circumstances in which the master/slave roles are reversed.

Figure 16:
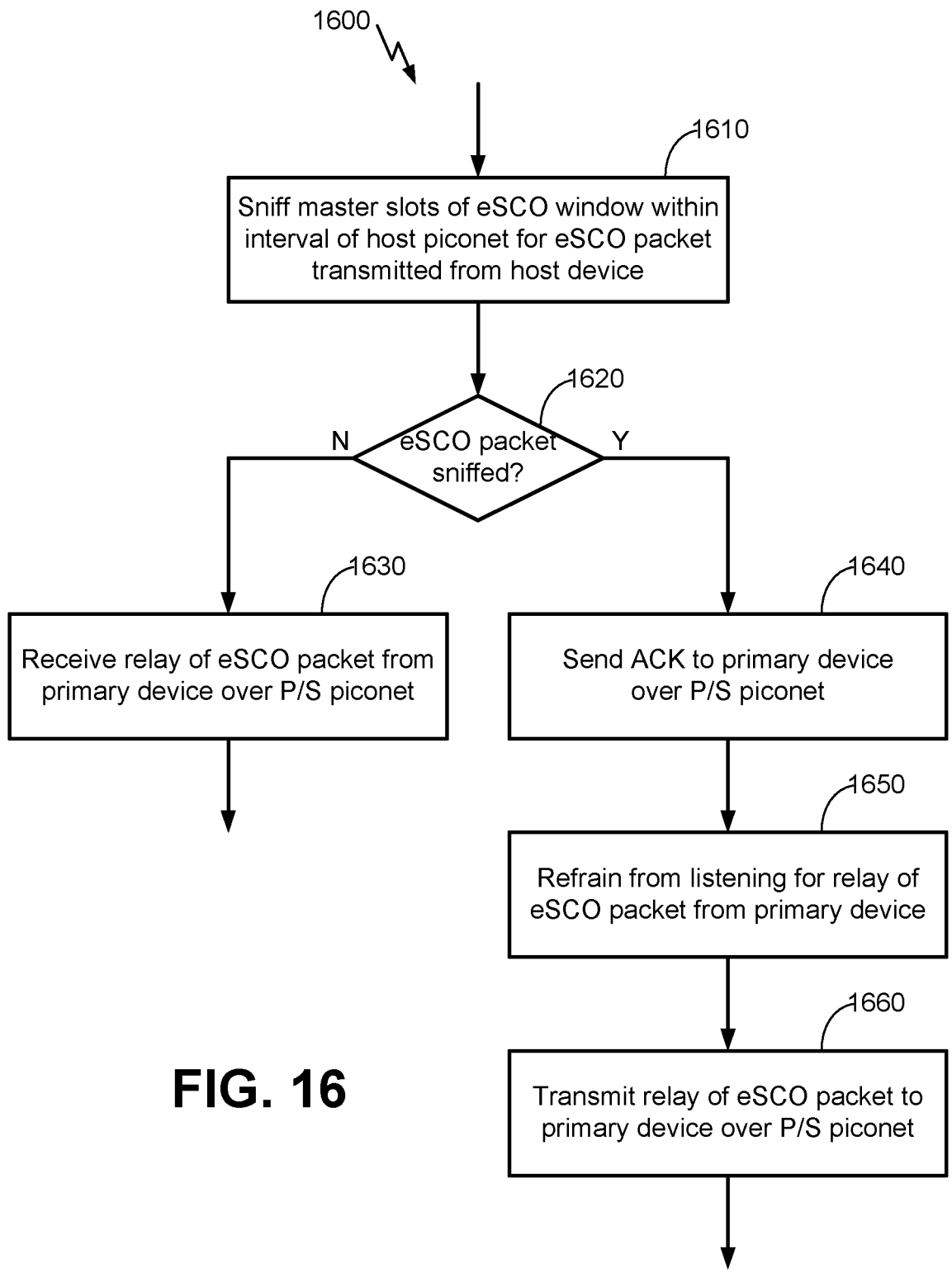
FIGS. 16-23 illustrate example flow charts of a further example method performed by a secondary device for relaying packets between the primary and secondary devices.

FIG. 16 illustrates a flow chart of an example method 1600 performed by a secondary device. In block 1610, the secondary device may sniff one or more master slots of an eSCO window within an interval of a host piconet for an eSCO packet (e.g., a voice packet) transmitted from a host device. The host piconet may be shared between the host and primary devices. The host device may be the master and the primary device may be the slave of the host piconet. The primary device may be configured to receive the eSCO packet over the same one or more master slots of the eSCO window. The eSCO window may comprise a reserved window and a retransmission window.

In block 1620, the secondary device may determine whether or not the eSCO packet has been sniffed. If not (N branch from block 1620), then in block 1630, the secondary device may receive the relay of the eSCO packet from the primary device over one or more slots of a primary/secondary (P/S) piconet shared between the primary and secondary devices. That is, the secondary device may perform a primary-secondary (P-S) relay reception.

Figure 17:
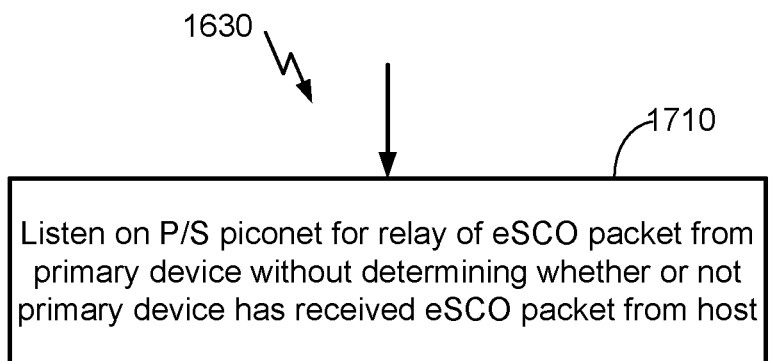

FIG. 17 illustrates a flow chart of an example process to implement block 1630. FIG. 17 illustrates an example of an unconditional P-S relay reception. As seen, in block 1710, the secondary device may listen for the eSCO packet from the primary device without determining whether or not the primary device has actually received the eSCO packet from the host device. In particular, the secondary device may listen for the relay of the eSCO packet over one or more slots of the P/S piconet corresponding to one or more slave slots of the host piconet subsequent to the reserved window.

Figure 18:
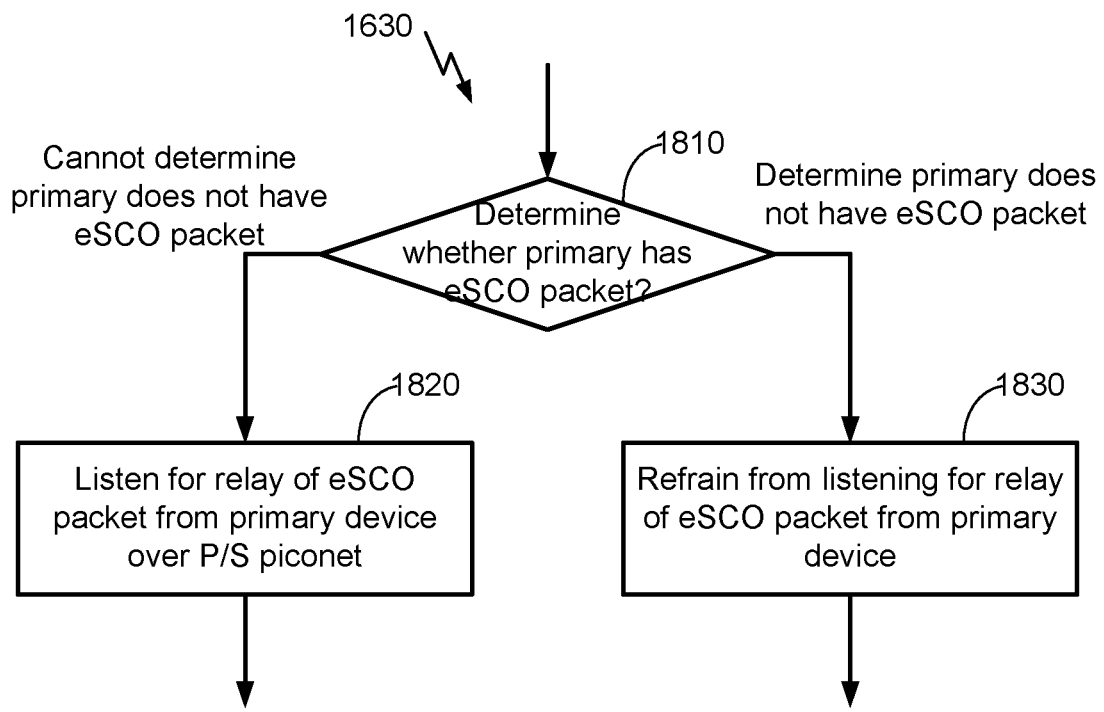

FIG. 18 illustrates a flow chart of another example process to implement block 1630. FIG. 18 illustrates an example of a conditional P-S relay reception. As seen, in block 1810, the secondary device may determine whether the primary device has received the eSCO packet from the host device within the eSCO window.

Figure 19:
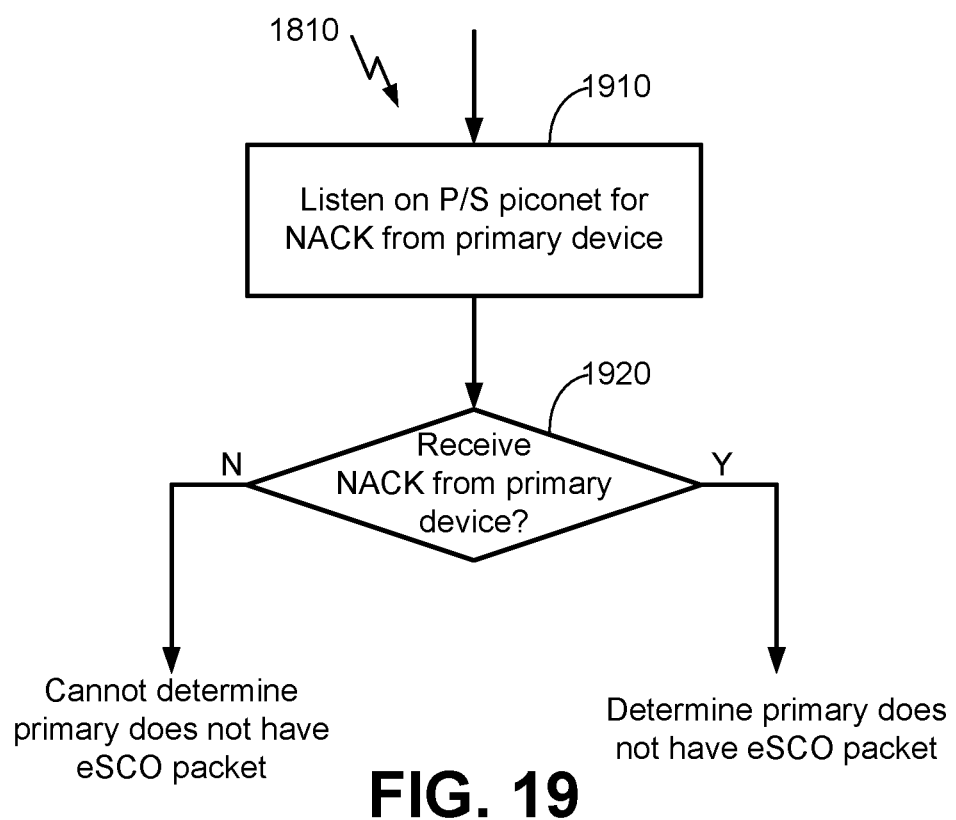

FIG. 19 illustrates a flow chart of an example process to implement block 1810. In block 1910, the secondary device may listen on the P/S piconet for a NACK notification (e.g., as a "have no packet" message) from the primary device. The NACK notification may indicate that the primary device did not receive the eSCO packet from the host device. In an aspect, the secondary device may listen on a slot of the P/S piconet that corresponds to a last slave slot of the eSCO window (e.g., the slave slot of the reserved window if the retransmission window size is zero, or the last slave slot of the retransmission window) of the host piconet.

In block 1920, if the secondary device does receive the NACK from the primary device (Y branch from block 1920), then it may be determined that the primary device does not have the eSCO packet. However, if the secondary device does not receive the NACK from the primary device (Y branch from block 1920), this does not necessarily mean that the primary device has the eSCO packet. For example, the primary device may send the NACK, but the secondary device may fail to receive. Thus, in an aspect, if the secondary device does not receive the NACK from the primary device, it may be said that whether the primary device does or does not have the eSCO packet is not determined.

Referring back to FIG. 18, at block 1810, if it is not determined that the primary device does not have the eSCO packet, then in block 1820, the secondary device may listen for the eSCO packet relayed from the primary device over the P/S piconet. In particular, the secondary device may listen on the one or more slots of the P/S piconet corresponding to the one or more slave slots of the host piconet subsequent to the reserved window within the interval. The listening takes place since there is a possibility of receiving the eSCO packet relay. Recall that the secondary device may determine whether or not the primary device has the eSCO packet by monitoring the primary device's responses to the host device in slave slots of the eSCO window and/or by sniffing transmissions by the host device for packets other than eSCO packets (e.g., NULL packets) in master slots of the retransmission window. In an aspect, determining that the primary device does have the eSCO packet may be included within the scope of not determining that the primary device does not have the eSCO packet.

On the other hand, at block 1810, if the secondary device does determine that the primary device does not have the eSCO packet, then in block 1830, the secondary device may refrain from listening for the relay. Since the secondary device knows that the primary device cannot relay the eSCO packet, there is no need to waste resources (e.g., battery power) to listen for the relay that will not take place.

Referring back to FIG. 16, when the eSCO packet has been successfully sniffed (Y branch from block 1620), then in block 1640, the secondary device may send an ACK notification (e.g., as a "have packet" message) to the primary device. The ACK notification may be sent over the one or more slots of the P/S piconet that correspond to the one or more slave slots of the host piconet subsequent to the reserved window within the interval. The ACK notification may indicate to the primary device that the secondary device successfully sniffed eSCO packet from the host device.

Note that the ACK notification may be useful if the primary device performs conditional P-S relay transmission. Thus, if the secondary device is aware that the primary device performs P-S relay transmission unconditionally, then the secondary device need not perform block 1640. In block 1650, the secondary device may refrain from listening for the relay since it is in possession of the eSCO packet.

Figure 20:
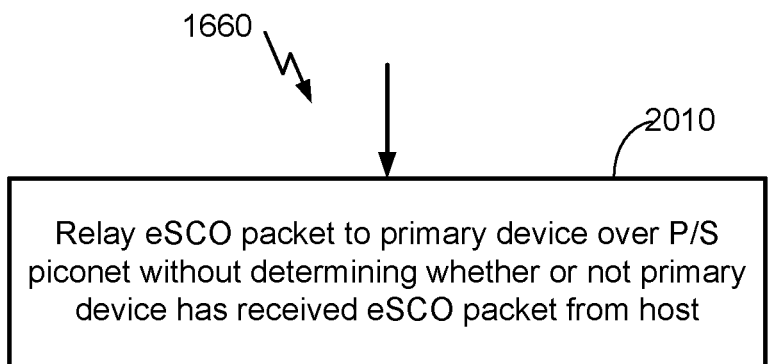

In block 1660, may relay the sniffed eSCO packet to the primary device. In other words, the secondary device may perform secondary-primary (S-P) relay transmission. FIG. 20 illustrates a flow chart of an example process to implement block 1660. FIG. 20 illustrates an example of an unconditional S-P relay transmission. As seen, in block 2110, the secondary device may relay the eSCO packet to the primary device without determining whether or not the primary device has actually received the eSCO packet from the host device. In particular, the secondary device may relay the eSCO packet over one or more slots of the P/S piconet corresponding to one or more slave slots of the host piconet subsequent to the reserved window.

Figure 21:
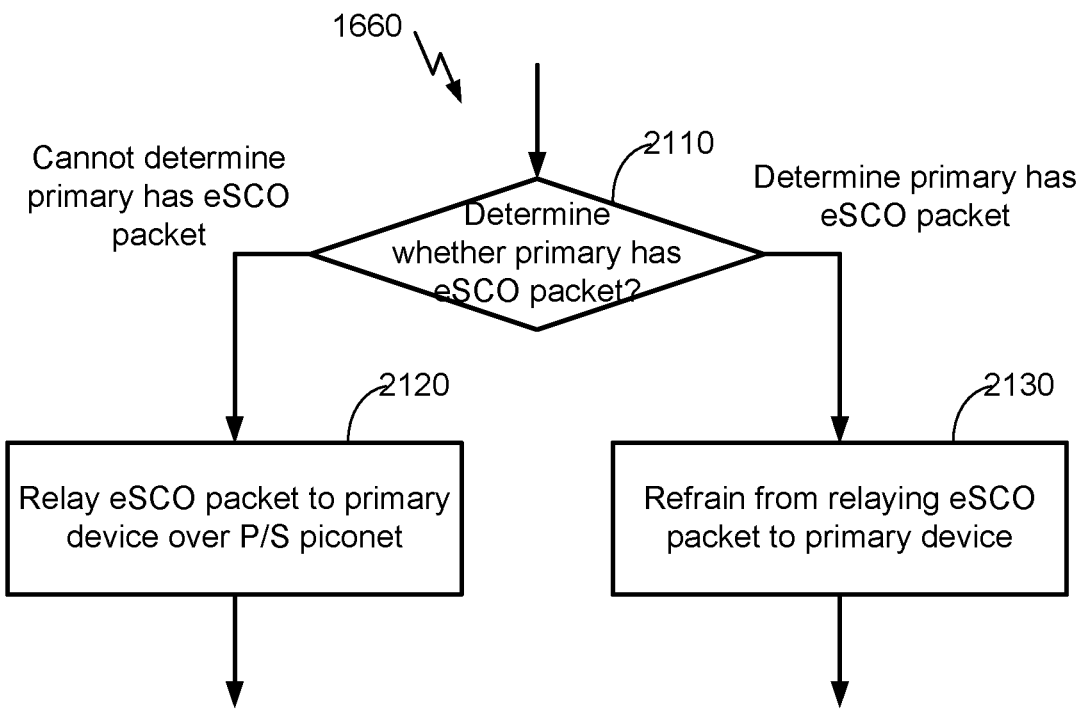

FIG. 21 illustrates a flow chart of another example process to implement block 1660. FIG. 21 illustrates an example of a conditional S-P relay transmission. As seen, in block 2110, the secondary device may determine whether the primary device has received the eSCO packet from the host device within the eSCO window.

Figure 22:
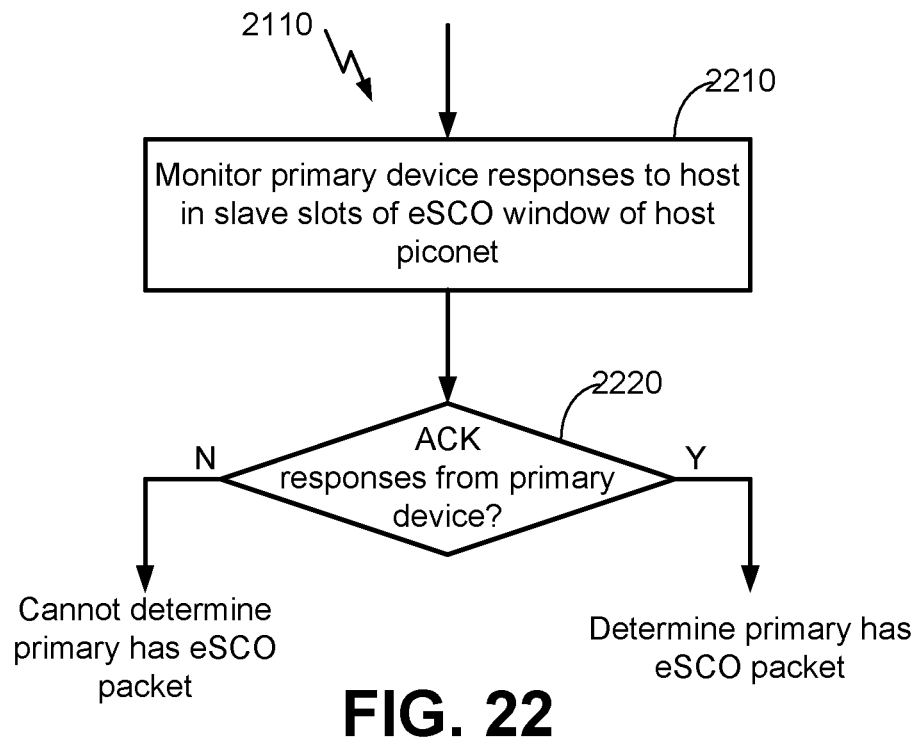

FIG. 22 illustrates a flow chart of an example process to implement block 2110. In block 2210, the secondary device may monitor the primary device's responses to the host device on the slave slots of the eSCO window (reserved window, retransmission window) of the host piconet.

In block 2220, the secondary device may determine whether the primary device has received the eSCO packet from the host device based on the monitoring. For example, if the secondary device detects an ACK response in any of the slave slots of the eSCO window (Y branch from block 2220), then the secondary device may determine that the primary device has received the eSCO packet. If no ACK response is detected (N branch from block 2220), then no definite determination is made since, as indicated multiple times above, lack of ACK detection may be due to the primary device not sending the ACK or the secondary device missing the ACK that was sent.

Figure 23:
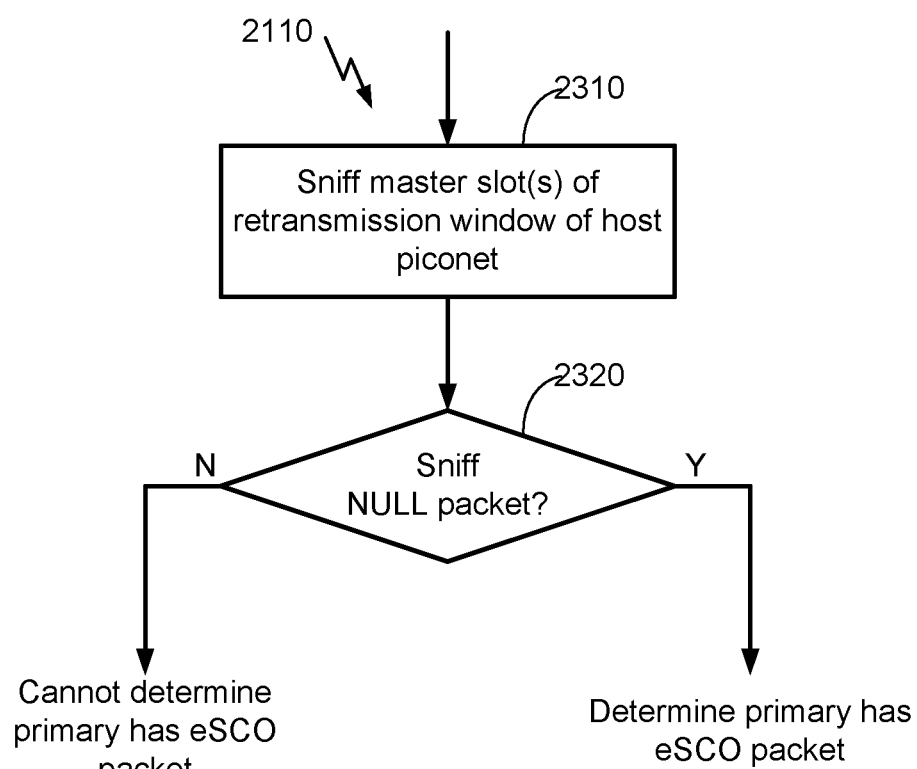

FIG. 23 illustrates a flow chart of another example process to implement block 2110. In block 2310, the secondary device may sniff the master slots of the retransmission window of the host piconet. Recall these are the slots that can be used by the host device to retransmit the eSCO packet to the primary device.

In block 2320, if the secondary device sniffs packets other than the eSCO packet (such as NULL packets) in these slots (Y branch from block 2230), the secondary device may determine that the primary device has received the eSCO packet from the host device. On the other hand, if no packets other than the eSCO packet are sniffed (N branch from block 2230), then again no definite determination is made.

Referring back to FIG. 21, if it is determined in block 2110 that the primary device does have the eSCO packet, then in block 2130, the secondary device may refrain from relaying the eSCO packet to the primary device, i.e., refrain from performing the S-P relay transmission. On the other hand, if no determination is made in block 2110, then in block 2120, the secondary device may perform the S-P relay transmission. That is, the secondary device may transmit the eSCO packet to the primary device, e.g., over the one or more slots of the P/S piconet that correspond to the one or more slave slots of the host piconet subsequent to the eSCO window within the interval.

Figure 24:
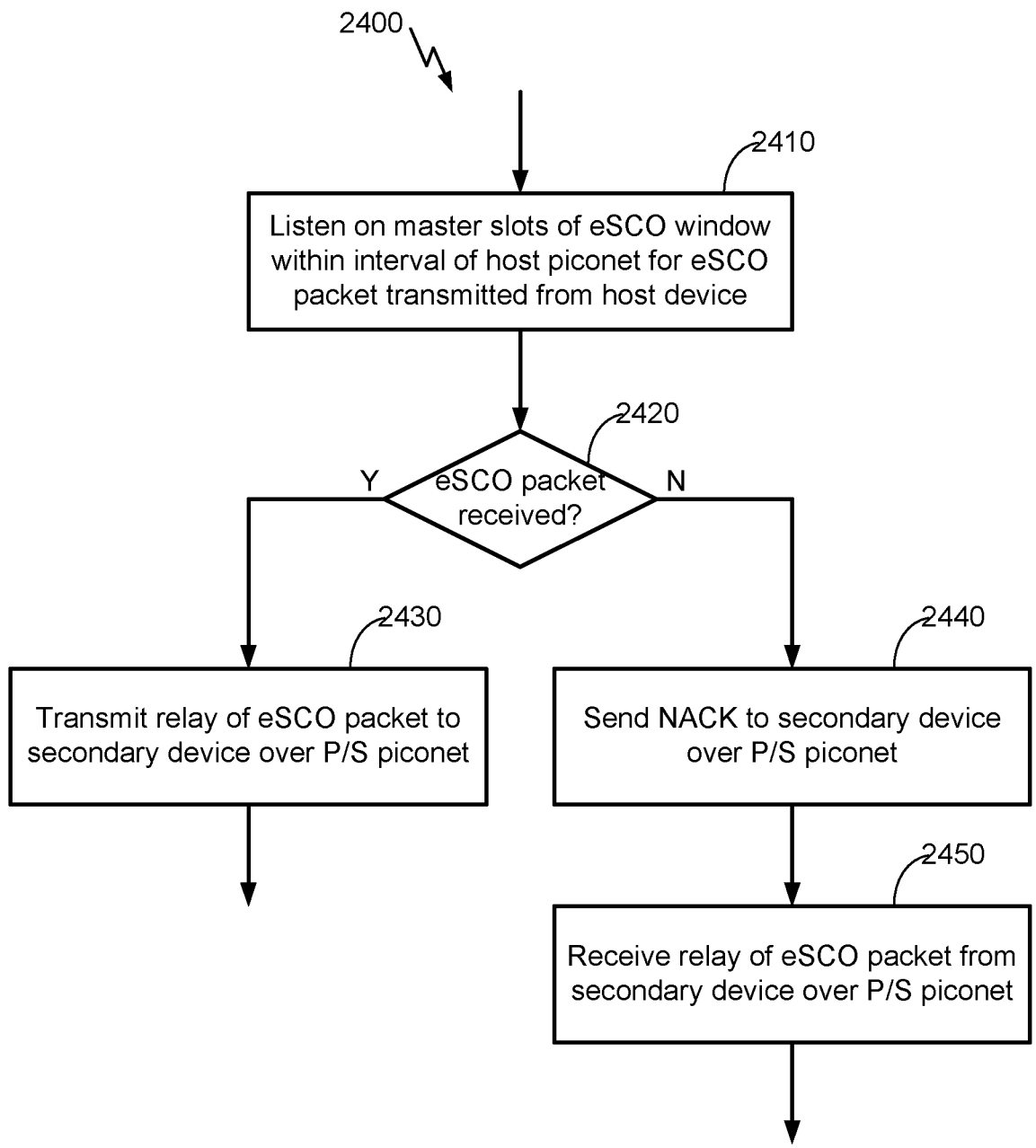
FIGS. 24-28 illustrate example flow charts of a further example method performed by a primary device for relaying packets between the primary and secondary devices.

FIG. 24 illustrates a flow chart of an example method 2400 performed by a primary device. In block 2410, the primary device may listen on the one or more master slots of an eSCO window within the interval of the host piconet for the eSCO packet (e.g., a voice packet) transmitted from the host device. In block 2420, the primary device may determine whether or not the eSCO packet has been received. If so (Y branch from block 2420), then in block 2430, the primary device may transmit the relay of the eSCO packet to the secondary device over the one or more slots of P/S piconet shared between the primary and secondary devices. That is, the primary device may perform a primary-secondary (P-S) relay transmission.

Figure 25:
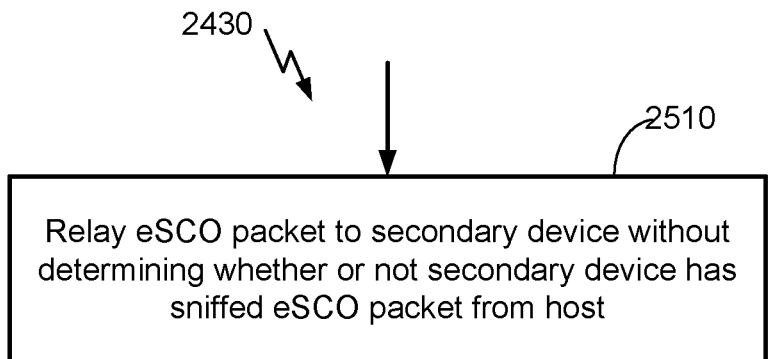

FIG. 25 illustrates a flow chart of an example process to implement block 2430. FIG. 25 illustrates an example of an unconditional P-S relay transmission. As seen, in block 2510, the primary device may relay the eSCO packet to the secondary device without determining whether or not the secondary device has actually sniffed the eSCO packet from the host device. The primary device may relay the eSCO packet over the one or more slots of the P/S piconet corresponding to one or more slave slots of the host piconet subsequent to the reserved window.

Figure 26:
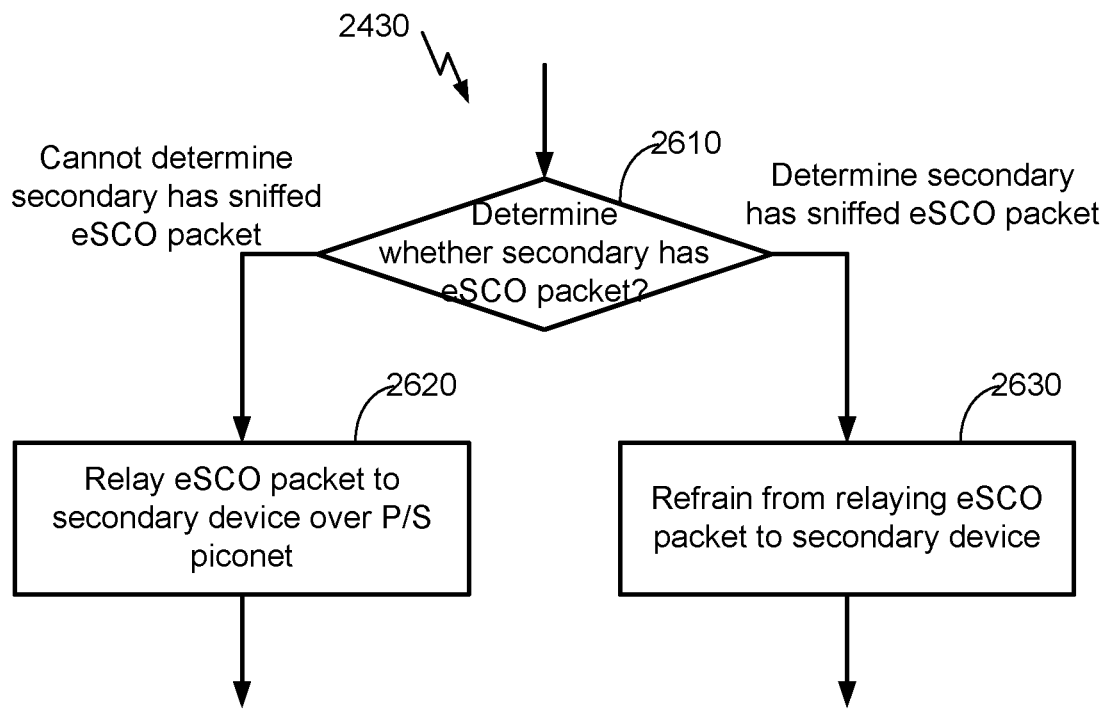

FIG. 26 illustrates a flow chart of another example process to implement block 2430. FIG. 26 illustrates an example of a conditional P-S relay transmission. As seen, in block 2610, the primary device may determine whether the secondary device has sniffed the eSCO packet from the host device within the eSCO window.

Figure 27:
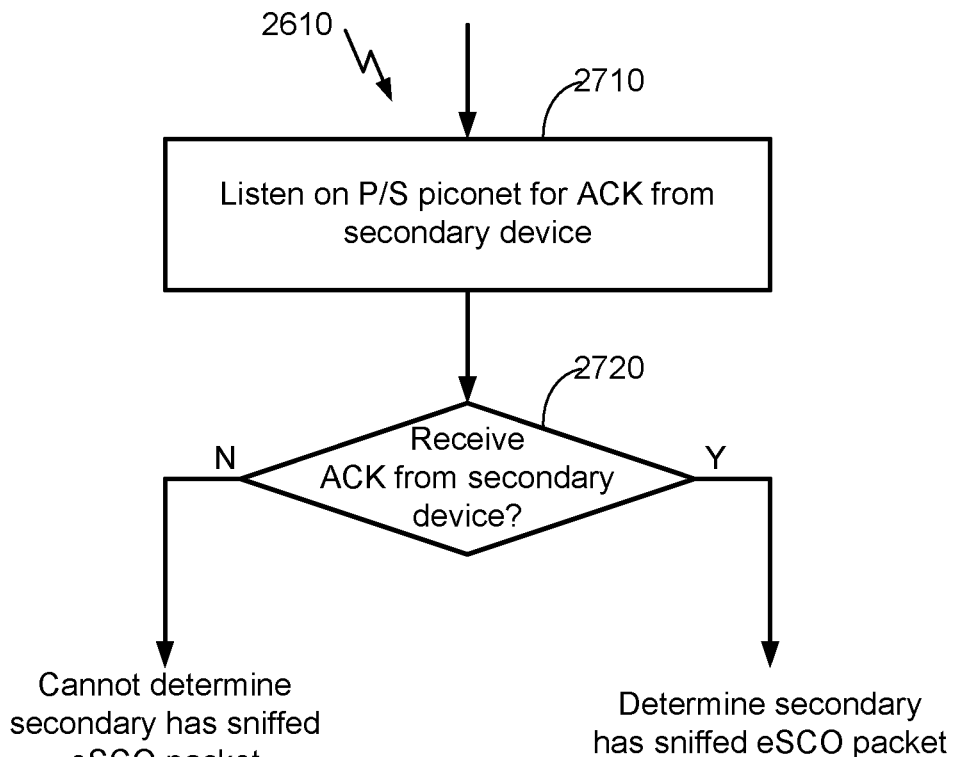

FIG. 27 illustrates a flow chart of an example process to implement block 2610. In block 2710, the primary device may listen on the P/S piconet for an ACK notification (e.g., as a "have packet" message) from the secondary device. The ACK notification may indicate that the secondary device did sniff the eSCO packet from the host device. The primary device may listen on the slots of the P/S piconet corresponding to the one or more slave slots of the host piconet subsequent to the reserved window. But in particular, the primary device may listen on a slot of the P/S piconet corresponding to a first slave slot of the host piconet subsequent to the eSCO window.

In block 2720, if the primary device does receive the ACK from the secondary device (Y branch from block 2720), then it may be determined that the secondary device did sniff the eSCO packet. However, if the primary device does not receive the ACK from the secondary device (N branch from block 2720), this does not necessarily mean that the secondary device did not sniff eSCO packet. For example, the secondary device may send the ACK, but the primary device may fail to receive. Thus, in an aspect, if the primary device does not receive the ACK from the secondary device, it may be said that whether the secondary device has or has not sniffed the eSCO packet is not determined.

Referring back to FIG. 26, at block 2610, if no determination is made of whether the secondary device has or has not sniffed the eSCO packet, then in block 2620, the primary relay the eSCO packet to the secondary device over the P/S piconet, e.g., over the one or more slots of the P/S piconet corresponding to the one or more slave slots of the host piconet subsequent to the reserved window within the interval. The P-S relay transmission takes place since there is a possibility that the secondary device did not sniff the eSCO packet.

On the other hand, at block 2610, if the primary device does determine that the secondary did sniff the eSCO packet, then in block 2630, the primary device may refrain from relaying the eSCO packet to the secondary device. Since the primary device knows that the secondary device already has the eSCO packet, there is no need to waste resources (e.g., battery power) to perform the unnecessary P-S relay transmission.

Referring back to FIG. 24, when the eSCO packet has not been successfully received (N branch from block 2420), then in block 2440, the primary device may send a NACK notification (e.g., as a "have no packet" message) to the secondary device. The NACK notification may be sent over the one or more slots of the P/S piconet that correspond to the one or more slave slots of the host piconet subsequent to the reserved window within the interval. In particular, the NACK notification may be sent on a slot of the P/S piconet that corresponds to the last slave slot of the retransmission window. The NACK notification may indicate to the secondary device that the primary device did not receive the eSCO packet from the host device.

Note that the NACK notification may be useful if the secondary device performs conditional S-P relay transmission. Thus, if the primary device is aware that the secondary device performs S-P relay transmission unconditionally, then the primary device need not perform block 2440.

Figure 28:
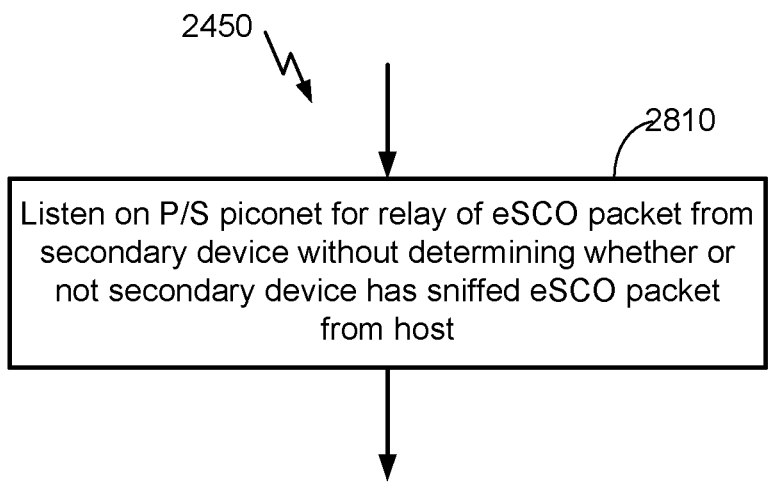

In block 2450, may receive the relay of eSCO packet from the secondary device. In other words, the primary device may perform secondary-primary (S-P) relay reception. FIG. 28 illustrates a flow chart of an example process to implement block 2450. FIG. 28 illustrates an example of an unconditional S-P relay reception. As seen, in block 2810, the primary device may listen for the relay of the eSCO packet from the secondary device without determining whether or not the secondary device has sniffed the eSCO packet from the host device. The primary device may listen for the eSCO packet over the one or more slots of the P/S piconet corresponding to one or more slave slots of the host piconet subsequent to the reserved window.

It should be noted that not all illustrated blocks of FIGS. 16-28 need be performed, i.e., some blocks may be optional. Also, the numerical references to the blocks in these figures should not be taken as requiring that the blocks should be performed in a certain order. Indeed, some blocks may be performed concurrently.

The terminology used herein is for the purpose of describing particular embodiments only and not to limit any embodiments disclosed herein. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof. Similarly, the phrase "based on" as used herein does not necessarily preclude influence of other factors and should be interpreted in all cases as "based at least in part on" rather than, for example, "based solely on". Moreover, the phrase "coupled to" in electrical contexts encompasses any suitable method for delivering an electrical signal from a first node to a second node. As such, "coupled to" may encompass "coupled directly to" (for example, by direct conductive connection, such as with a copper wire, a solder ball, etc.) as well as "coupled indirectly to" (for example, having one or more intervening structures therebetween, such as a switch, a buffer, a filter, etc.). It will be further understood that terms such as "top" and "bottom", "left" and "right", "vertical" and "horizontal", etc., are relative terms used strictly in relation to one another, and do not express or imply any relation with respect to gravity, a manufacturing device used to manufacture the components described herein, or to some other device to which the components described herein are coupled, mounted, etc. It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not imply that there are only two elements and further does not imply that the first and second elements are consecutive or that the first element precedes the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements."

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code for providing the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of non-transitory storage medium known in the art. As used herein the term "non-transitory" does not exclude any physical storage medium or memory and particularly does not exclude dynamic memory (e.g., RAM) but rather excludes only the interpretation that the medium can be construed as a transitory propagating signal. An example storage medium is coupled to the processor such that the processor can read information from, and write information to, the storage medium. In the alternative, the storage medium may be integral to the processor (e.g., cache memory).

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method performed by a secondary device, the method comprising:

sniffing one or more master slots of an enhanced synchronization connection oriented (eSCO) window within an interval of a host piconet for an eSCO packet transmitted from a host device, the host piconet being shared between the host and primary devices, the host and primary devices respectively being master and slave of the host piconet, the eSCO window comprising a reserved window and a retransmission window; and upon being unable to sniff the eSCO packet, receiving a relay of the eSCO packet from the primary device over one or more slots of a primary/secondary (P/S) piconet shared between the primary and secondary devices, wherein the primary device is configured to receive the eSCO packet over the one or more master slots of the eSCO window, and wherein the relay of the eSCO packet is received from the primary device over the one or more slots of the P/S piconet corresponding to one or more slave slots of the host piconet subsequent to the reserved window within the interval.

2. The method of claim 1, wherein the eSCO packet is a voice packet.

3. The method of claim 1, wherein receiving the relay of the eSCO packet from the primary device comprises unconditionally listening for the eSCO packet from the primary device over the P/S piconet.

4. The method of claim 1, further comprising:
upon sniffing the eSCO packet, sending an ACK notification to the primary device over the P/S piconet, the ACK notification indicating that the secondary device has sniffed the eSCO packet.

5. The method of claim 4, wherein sending the ACK notification to the primary device over the P/S piconet comprises sending the ACK notification to the primary device over the one or more slots of the P/S piconet corresponding to one or more slave slots of the host piconet subsequent to the reserved window within the interval.

6. The method of claim 1, further comprising:
upon sniffing the eSCO packet, refraining from listening for the eSCO packet from the primary device.

7. The method of claim 1, further comprising:
upon being unable to sniff the eSCO packet, determining whether the primary device has received the eSCO packet from the host device within the eSCO window;
upon determining that the primary device has not received the eSCO packet from the host device, refraining from listening for the eSCO packet from the primary device; and
upon being unable to determine that the primary device has not received the eSCO packet from the host device, listening for the eSCO packet from the primary device over the P/S piconet.

8. The method of claim 7, wherein determining whether the primary device has received the eSCO packet from the host device comprises:
determining whether a NACK notification is received from the primary device; and
determining that the primary device has not received the eSCO packet upon determining that the NACK notification is received.

9. The method of claim 8, further comprising:
listening for the NACK notification from the primary device on a slot of the P/S piconet corresponding to a last slave slot of the eSCO window of the host piconet.

10. The method of claim 1, further comprising:
upon sniffing the eSCO packet, unconditionally relaying the eSCO packet to the primary device.

11. The method of claim 10, wherein relaying the eSCO packet to the primary device comprises relaying the eSCO packet to the primary device over one or more slots of the P/S piconet corresponding to one or more slave slots of the host piconet subsequent to the eSCO window within the interval.

12. The method of claim 1, further comprising:
upon sniffing the eSCO packet, determining whether the primary device has received the eSCO packet from the host device within the eSCO window;
upon determining that the primary device has received the eSCO packet from the host device, refraining from relaying the eSCO packet to the primary device; and
upon being unable to determine that the primary device has received the eSCO packet from the host device, relaying the eSCO packet to the primary device over the P/S piconet.

13. The method of claim 12, wherein relaying the eSCO packet to the primary device over the P/S piconet comprises relaying the eSCO packet to the primary device over the one or more slots of the P/S piconet corresponding to one or more slave slots of the host piconet subsequent to the eSCO window within the interval.

14. The method of claim 12, wherein determining whether the primary device has received the eSCO packet from the host device comprises:
monitoring one or more responses of the primary device to the host device on one or more slave slots of the eSCO window of the interval; and
determining whether the primary device has received the eSCO packet from the host device based on the monitoring.

15. The method of claim 12, wherein determining whether the primary device has received the eSCO packet from the host device comprises:
sniffing one or more master slots of the retransmission window of the host piconet; and
determining that the primary device has received the eSCO packet from the host device upon sniffing a NULL packet in the one or more master slots of the retransmission window.

16. A method performed by a primary device, the method comprising:
listening on one or more master slots of an enhanced synchronization connection oriented (eSCO) window within an interval of a host piconet to receive an eSCO packet transmitted from a host device, the host piconet being shared between the host and primary devices, the host and primary devices respectively being master and slave of the host piconet, the eSCO window comprising a reserved window and a retransmission window; and
upon receiving the eSCO packet, relaying the eSCO packet to a secondary device over one or more slots of a primary/secondary (P/S) piconet shared between the primary and secondary devices,
wherein the secondary device is configured to sniff for the eSCO packet over the one or more master slots of the eSCO window, and
wherein the eSCO packet is relayed to the secondary device over the one or more slots of the P/S piconet corresponding to one or more slave slots of the host piconet subsequent to the reserved window within the interval.

17. The method of claim 16, wherein the eSCO packet is a voice packet.

18. The method of claim 16, wherein relaying the eSCO packet to the secondary device comprises unconditionally relaying the eSCO packet to the secondary device over the one or more slots of the P/S piconet corresponding to one or more slave slots of the host piconet subsequent to the reserved window within the interval.

19. The method of claim 16, further comprising:
upon being unable to receive the eSCO packet, sending a NACK notification to the secondary device over the one or more slots of the P/S piconet corresponding to one or more slaves slot of the host piconet subsequent to the reserved window within the interval, the NACK notification indicating that the primary device has not received the eSCO packet.

20. The method of claim 19, wherein the NACK notification is sent to the secondary device over a slave slot of the P/S piconet corresponding to a last slave slot of the retransmission window.

21. The method of claim 16, further comprising:
upon receiving the eSCO packet, determining whether the secondary device has sniffed the eSCO packet from the host device within the eSCO window;
upon determining that the secondary device has sniffed the eSCO packet from the host device, refraining from relaying the eSCO packet to the secondary device; and
upon being unable to determine that the secondary device has sniffed the eSCO packet from the host device, relaying the eSCO packet to the secondary device over the P/S piconet.

22. The method of claim 21, wherein determining whether the secondary device has sniffed the eSCO packet comprises:
determining whether an ACK notification is received from the secondary device over the P/S piconet; and
determining that the secondary device has sniffed the eSCO packet upon receiving the ACK notification.

23. The method of claim 22, wherein determining whether the ACK notification is received over the P/S piconet comprises determining whether the ACK notification is received from the secondary device over a slot of the P/S piconet corresponding to a first slave slot of the host piconet subsequent to the eSCO window.

24. The method of claim 16, further comprising:
upon being unable to receive the eSCO packet, unconditionally listening for the eSCO packet from the secondary device over the P/S piconet.

25. The method of claim 24, wherein listening for the eSCO packet from the secondary device over the P/S piconet comprises listening for the eSCO packet from the secondary device over the one or more slots of the P/S piconet corresponding to one or more slave slots of the host piconet subsequent to the reserved window within the interval.

26. A secondary device, comprising:
a transceiver system;
a memory system; and
a processing system communicably coupled to the transceiver system and/or the memory system,
wherein the transceiver system, the memory system, and/or the processing system are configured to:
sniff one or more master slots of an enhanced synchronization connection oriented (eSCO) window within an interval of a host piconet for an eSCO packet transmitted from a host device, the host piconet being shared between the host and primary devices, the host and primary devices respectively being master and slave of the host piconet, the eSCO window comprising a reserved window and a retransmission window; and
upon being unable to sniff the eSCO packet, receive a relay of the eSCO packet from the primary device over one or more slots of a primary/secondary (P/S) piconet shared between the primary and secondary devices,
wherein the primary device is configured to receive the eSCO packet over the one or more master slots of the eSCO window, and
wherein the relay of the eSCO packet is received from the primary device over the one or more slots of the P/S piconet corresponding to one or more slave slots of the host piconet subsequent to the reserved window within the interval.

27. A primary device, comprising:
a transceiver system;
a memory system; and
a processing system communicably coupled to the transceiver system and/or the memory system,
wherein the transceiver system, the memory system, and/or the processing system are configured to:
listen on one or more master slots of an enhanced synchronization connection oriented (eSCO) window within an interval of a host piconet to receive an eSCO packet transmitted from a host device, the host piconet being shared between the host and primary devices, the host and primary devices respectively being master and slave of the host piconet, the eSCO window comprising a reserved window and a retransmission window; and
upon receiving the eSCO packet, relay the eSCO packet to a secondary device over one or more slots of a primary/secondary (P/S) piconet shared between the primary and secondary devices,
wherein the secondary device is configured to sniff for the eSCO packet over the one or more master slots of the eSCO window, and
wherein the eSCO packet is relayed to the secondary device over the one or more slots of the P/S piconet corresponding to one or more slave slots of the host piconet subsequent to the reserved window within the interval.

* * * * *